US011579881B2

(12) United States Patent
Haber et al.

(10) Patent No.: US 11,579,881 B2
(45) Date of Patent: Feb. 14, 2023

(54) INSTRUCTIONS FOR VECTOR OPERATIONS WITH CONSTANT VALUES

(71) Applicant: Intel Corporation, Santa Clara, CA (US)

(72) Inventors: Gadi Haber, Nesher (IL); Robert Valentine, Kiryat Tivon (IL); Ayal Zaks, Misgav (IL); Jesus Corbal San Adrian, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 237 days.

(21) Appl. No.: 15/638,074

(22) Filed: Jun. 29, 2017

(65) Prior Publication Data

US 2019/0004801 A1    Jan. 3, 2019

(51) Int. Cl.
*G06F 9/30* (2018.01)
*G06F 9/345* (2018.01)

(52) U.S. Cl.
CPC ...... *G06F 9/30167* (2013.01); *G06F 9/30018* (2013.01); *G06F 9/30032* (2013.01); *G06F 9/30036* (2013.01); *G06F 9/3001* (2013.01); *G06F 9/3455* (2013.01)

(58) Field of Classification Search
CPC ............. G06F 9/30036; G06F 9/30018; G06F 9/30167
USPC ........................................................ 712/205
See application file for complete search history.

(56) References Cited

U.S. PATENT DOCUMENTS

| 9,600,281 | B2 * | 3/2017 | Eichenberger | ...... G06F 9/30112 |
| 2007/0150697 | A1 * | 6/2007 | Sachs | ................... G06F 9/30014 712/2 |
| 2014/0059322 | A1 * | 2/2014 | Ould-Ahmed-Vall | ...................... G06F 15/8084 712/5 |
| 2014/0189295 | A1 * | 7/2014 | Uliel | ................... G06F 9/30032 712/8 |
| 2016/0011873 | A1 * | 1/2016 | Plotnikov | ........... G06F 9/30145 712/205 |
| 2016/0224514 | A1 * | 8/2016 | Moudgill | ............ G06F 15/8076 |

* cited by examiner

*Primary Examiner* — William B Partridge
(74) *Attorney, Agent, or Firm* — Nicholson De Vos Webster & Elliott LLP

(57) ABSTRACT

Disclosed embodiments relate to instructions for vector operations with immediate values. In one example, a system includes a memory and a processor that includes fetch circuitry to fetch the instruction from a code storage, the instruction including an opcode, a destination identifier to specify a destination vector register, a first immediate, and a write mask identifier to specify a write mask register, the write mask register including at least one bit corresponding to each destination vector register element, the at least one bit to specify whether the destination vector register element is masked or unmasked, decode circuitry to decode the fetched instruction, and execution circuitry to execute the decoded instruction, to, use the write mask register to determine unmasked elements of the destination vector register, and, when the opcode specifies to broadcast, broadcast the first immediate to one or more unmasked vector elements of the destination vector register.

21 Claims, 45 Drawing Sheets

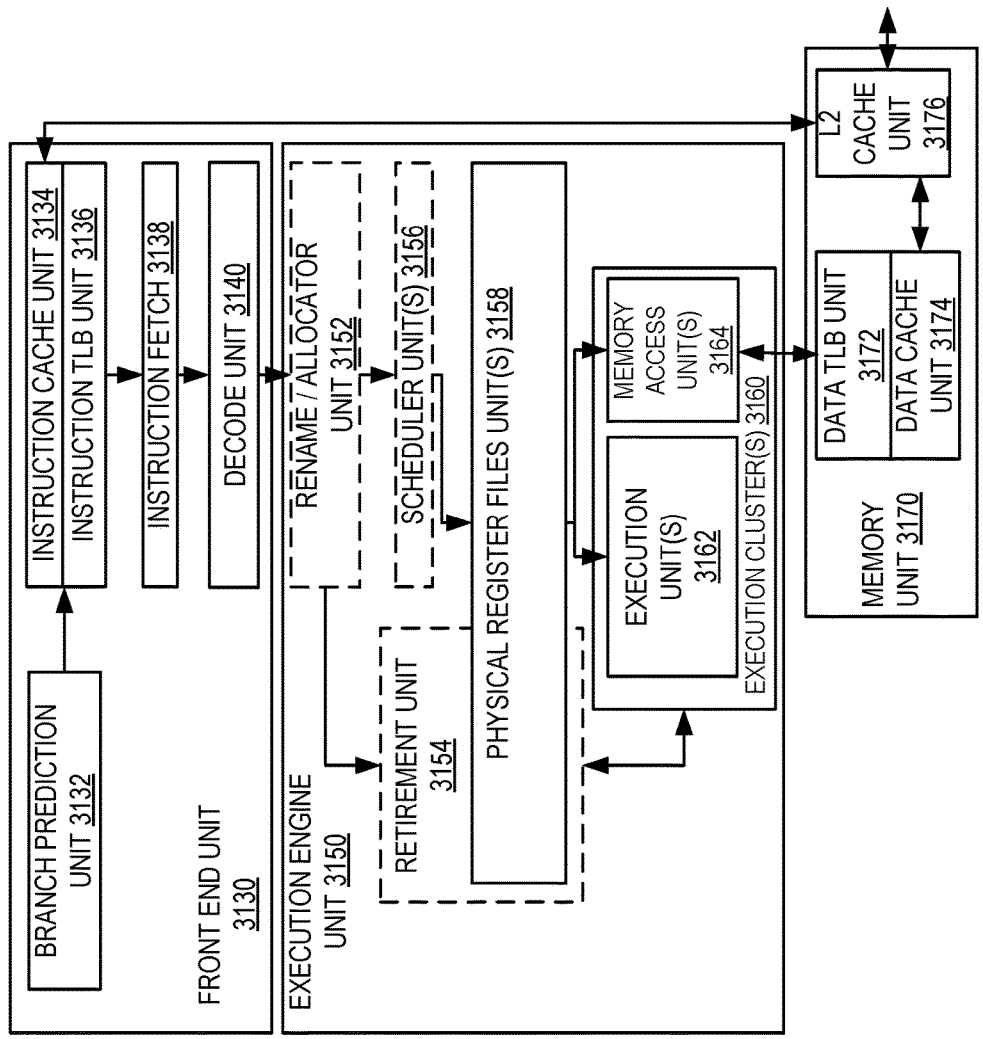
FIG. 31A
FIG. 31B

INSTRUCTIONS FOR VECTOR OPERATIONS WITH CONSTANT VALUES

FIELD OF INVENTION

The field of invention relates generally to computer processor architecture, and, more specifically, to instructions for vector operations with constant values.

BACKGROUND

For applications that use vector operations for computation at runtime, the compiler or assembly programmer must try to allocate the required vector registers for the vector operations in a loop. Failing to allocate registers to all vector operations may result in vector register spillage causing performance degradation and inefficient power consumption.

In graphics applications, for example, a translation transformation is the movement of a graphical object to a new location by adding a constant value to each coordinate point. The more graphical objects exist in an image, the more vector registers will be used to move them. And if different graphical objects are to be translated by different amounts, the more registers will be used to store the different constants.

BRIEF DESCRIPTION OF THE DRAWINGS

The present invention is illustrated by way of example and not limitation in the figures of the accompanying drawings, in which like references indicate similar elements and in which:

Figures 29A, 29B, 29C:
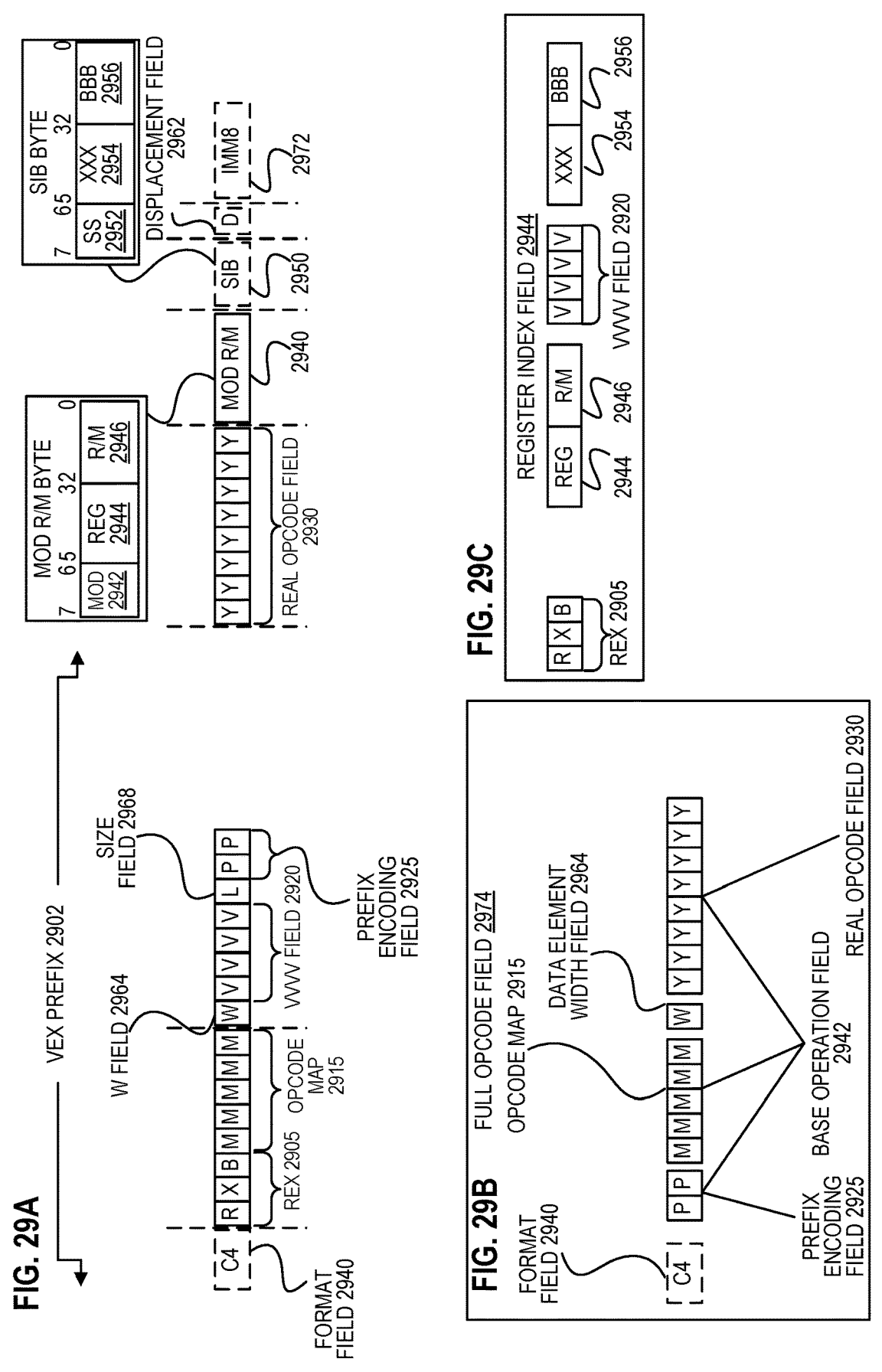

FIGS. 29A-29C are block diagrams illustrating a generic vector friendly instruction format and instruction templates thereof according to embodiments of the invention;

FIG. 29A is a block diagram illustrating a generic vector friendly instruction format and class A instruction templates thereof according to embodiments of the invention;

FIG. 29B is a block diagram illustrating the generic vector friendly instruction format and class B instruction templates thereof according to embodiments of the invention;

FIG. 29C is a block diagram illustrating the generic vector friendly instruction format and class B instruction templates thereof according to embodiments of the invention;

FIG. 31A is a block diagram illustrating both an exemplary in-order pipeline and an exemplary register renaming, out-of-order issue/execution pipeline according to embodiments of the invention;

FIG. 31B is a block diagram illustrating both an exemplary embodiment of an in-order architecture core and an exemplary register renaming, out-of-order issue/execution architecture core to be included in a processor according to embodiments of the invention;

FIG. 32A is a block diagram of a single processor core, along with its connection to the on-die interconnect network and with its local subset of the Level 2 (L2) cache, according to embodiments of the invention;

FIG. 32B is an expanded view of part of the processor core in FIG. 32A according to embodiments of the invention;

DETAILED DESCRIPTION

Figure 1:
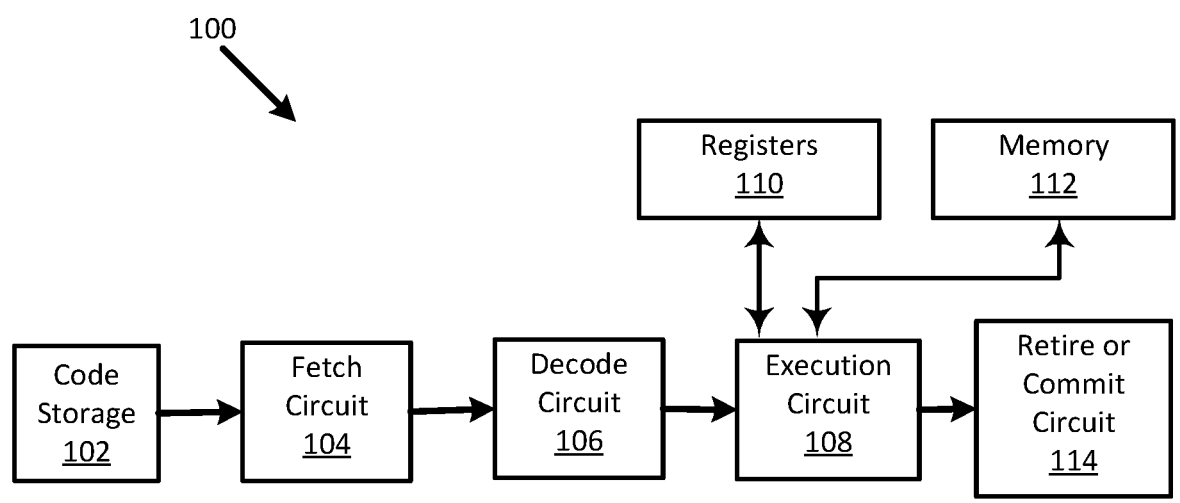
FIG. 1 is a block diagram illustrating processing components for executing instructions for vector operations with constant values, according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In order to reduce the pressure on vector registers, it is possible to extend the instruction set of the architecture hardware, as accomplished by embodiments disclosed herein, to enable vector operations with immediate (constant) values.

For example, in many video and image processing algorithms, for improved performance there is a need for the architecture to support instructions operating on the entire vector with the same value.

For example, going to the next row of pixels (Y coordinate) requires adding 1 to the vector register containing Y coordinate of the current row.

As a further example, moving to the next 8 pixels in the row requires adding 8 to the vector register containing current X coordinates.

For a further example, some approaches in other instruction set architectures (ISAs) require extra registers to hold the constant values and/or to read them directly from memory, resulting in cumbersome code that also consumes registers.

Embodiments disclosed herein provide efficient ways of (re)constructing (rematerializing) constant vectors, thereby freeing such registers for other usages elsewhere (e.g., in a hot loop, which, as used herein, refers to a frequently-executed loop).

Currently, constant values in vectors can be assigned/populated from memory either by using, for example, a VBROADCAST instruction that populates every unmasked element of a vector register with a constant value stored in a memory location. This is useful for simple, repetitive cases such as {m32, m32, . . . , m32}, or else by spilling to (constant) memory (spilling occurs whenever a register allocator runs out of registers, and therefore must "spill" values by saving and restoring them from memory). In some embodiments, a VBROADCAST instruction is an instruction used to broadcast floating-point data to a vector location.

Embodiments disclosed herein modify a processor instruction set architecture to extend the capabilities of a VBROADCAST instruction. Using embodiments herein has an advantage of allowing an immediate value to be used in the instruction, rather than requiring the value to be stored in a register.

Disclosed embodiments of vector operations allow more sources than a current VBROADCAST instruction.

Disclosed embodiments of vector operations also allow immediate (constant) operands.

Disclosed embodiments of vector operations further can handle non-repetitive, frequently occurring vector constants involving constant values (immediates).

Disclosed embodiments extend the capabilities of setting every partition or element of a multi-element destination register in at least two directions:

More sources from which to broadcast: immediates, any vector element; and

Handle non-repetitive, frequently-occurring vector constants involving constant values (immediates).

In some embodiments, extended versions of the "VBROADCAST" and other instructions allow multiple sources, multiple destinations, and immediates.

FIG. 1 is a block diagram illustrating processing components for executing instructions for vector operations with constant values (immediates), according to some embodiments. As shown, computing system 100 includes code storage 102, fetch circuit 104, decode circuit 106, execution circuit 108, registers 110, memory 112, and retire or commit circuit 114. In operation, an instruction is fetched by fetch circuit 104 from code storage 102, which may comprise a cache memory, an on-chip memory, a memory on the same die as the processor, an instruction register, a general register, or system memory, without limitation. In one embodiment, the instruction has a format similar to that of FIG. 3 and FIGS. 29A-29C. After fetching the instruction from code storage 102, decode circuit 106 decodes the fetched instruction, including by parsing the various fields of the instruction. After decoding the fetched instruction, execution circuit 108 executes the decoded instruction. Several exemplary embodiments of execution using execution circuit 108 are illustrated and described with respect to FIGS. 4A-4H. In executing the instruction, execution circuit 108 may read data from and write data to registers 110 and memory 112. Registers 110 may include a data register, an instruction register, a vector register, a mask register, a general register, an on-chip memory, a memory on the same die as the processor, or a memory in the same package as the processor, without limitation. Memory 112 may include an on-chip memory, a memory on the same die as the processor, a memory in the same package as the processor, a cache memory, or system memory, without limitation. After the execution circuit executes the instruction, retire or commit circuit 114 may retire the instruction, ensuring that execution results are written to or have been written to their destinations, and freeing up or releasing resources for later use.

Figure 2:
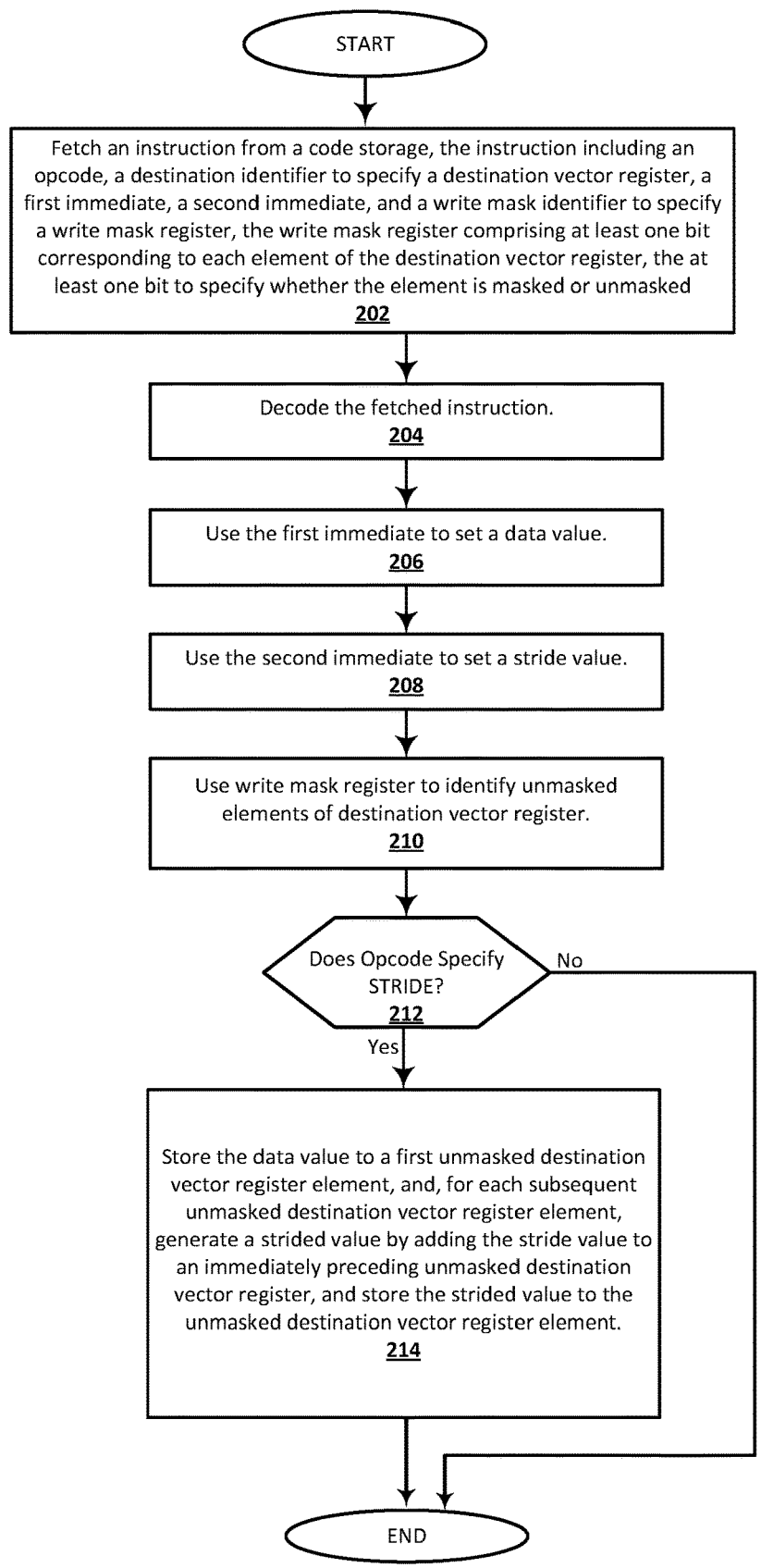
FIG. 2 is a flow diagram of a process to be performed by a processor to execute an instruction for a vector operation with constant values, according to some embodiments.

FIG. 2 is a method to be performed by a processor to execute an instruction for an operation with constant values (immediates). After starting the process, a fetch circuit at 202 fetches the instruction from a code storage, the instruction including an opcode, a destination identifier to specify a destination vector register, a first immediate, a second immediate, and a write mask identifier to specify a write mask register, the write mask register comprising at least one bit corresponding to each element of the destination vector register, the at least one bit to specify whether the element is masked or unmasked. The destination vector register is sometimes referred to as a packed destination register.

At 204, the fetched instruction is decoded by decode circuitry.

At 206, an execution circuit uses the first immediate to set a data value.

At 208, the execution circuit uses the second immediate to set a stride value.

At 210, the execution circuit uses the write mask register to identify unmasked elements of the destination vector register.

At 212, the execution circuit determines whether the opcode specifies stride. If not, the process ends. But if so, at 214, the execution circuit stores the data value to a first unmasked destination vector register element, and, for each subsequent unmasked destination vector register element, generates a strided value by adding the stride value to an immediately preceding unmasked destination vector register, and stores the strided value to the unmasked destination vector register element. In some embodiments, the execution circuit zeroes masked elements of the destination vector register. In some embodiments, masked elements of the destination vector register retain their previous values. The process then ends.

Figure 3:
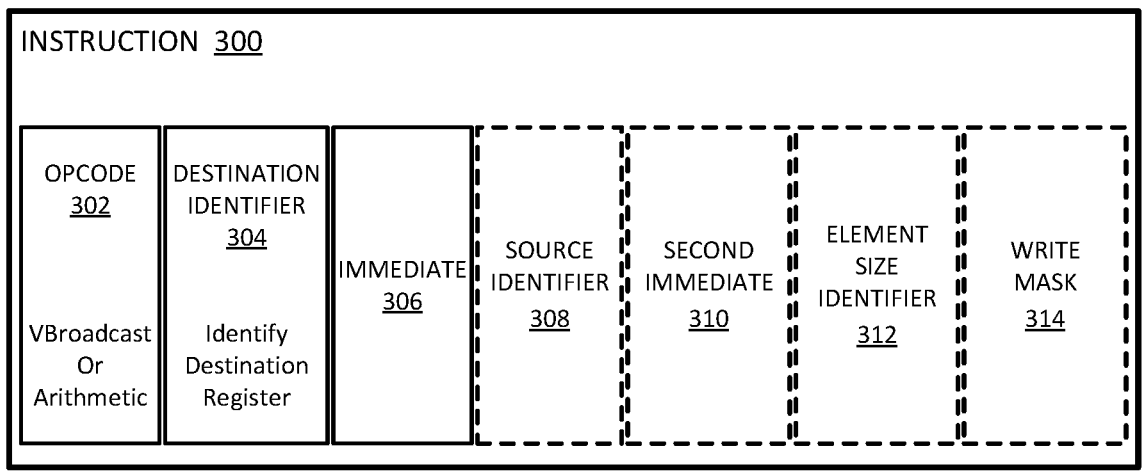
FIG. 3 is a block diagram illustrating a format for instructions for vector operations with constant values, according to some embodiments.

FIG. 3 is a block diagram illustrating a format for instructions for an operation with constant values (immediates) according to some embodiments. As shown, instruction 300 includes opcode 302, destination identifier 304, immediate 306, optional source identifier 308 (optional instruction fields are shown in boxes with dashed outlines), optional second immediate 310, optional element size identifier 312, and optional write mask 314.

Opcode 302 in some embodiments is VBROADCAST*. As shown, opcode 302 includes an asterisk ("*"), which represents optional suffixes or prefixes that may be added to the opcode to control operations of the instruction. In some embodiments, opcode 302 is an arithmetic operation, such as ADD, SUB, DIV, MUL, MOD, etc., in which case the asterisk would be replaced by a corresponding suffix. In some embodiments, for example, opcode 302 includes an "IM" or "STR" control suffix to specify whether an immediate operand be broadcasted to every fixed-size partition of the destination register (as in FIG. 4A, below), or if a stride value is added to successive fixed-size partitions of the destination register (as in FIGS. 4C, 4D, and 4E, below). Some examples of different opcodes are discussed and illustrated below with respect to FIGS. 4A-4H.

Some examples of vector-friendly instruction formats are described below with respect to FIGS. 29A-29C, below. Comparing FIG. 3 to FIGS. 29A-29C, in some embodiments, opcode 302 maps to base operation field 542 (FIG. 5), while destination identifier 304, immediate 306, and optional source identifier 308 map to register index field 2944 (FIGS. 29A-29C), which is described below as containing enough bits, N, to identify three sources and one destination register. With further reference to FIGS. 29A-29C, in some embodiments, optional second immediate 310, optional element size identifier 312, and optional write mask 314 map to immediate field 2972, data element width field 2964, and write mask field 2970, respectively.

Destination identifier 304 in some embodiments specifies a vector register, such as one of the vector registers provided in a processor's register file. In some embodiments, destination identifier 304 specifies a mask register, such as one of the mask registers provided in the processor's register file. An exemplary processor register file is described and illustrated below with respect to FIG. 30.

Figure 30:
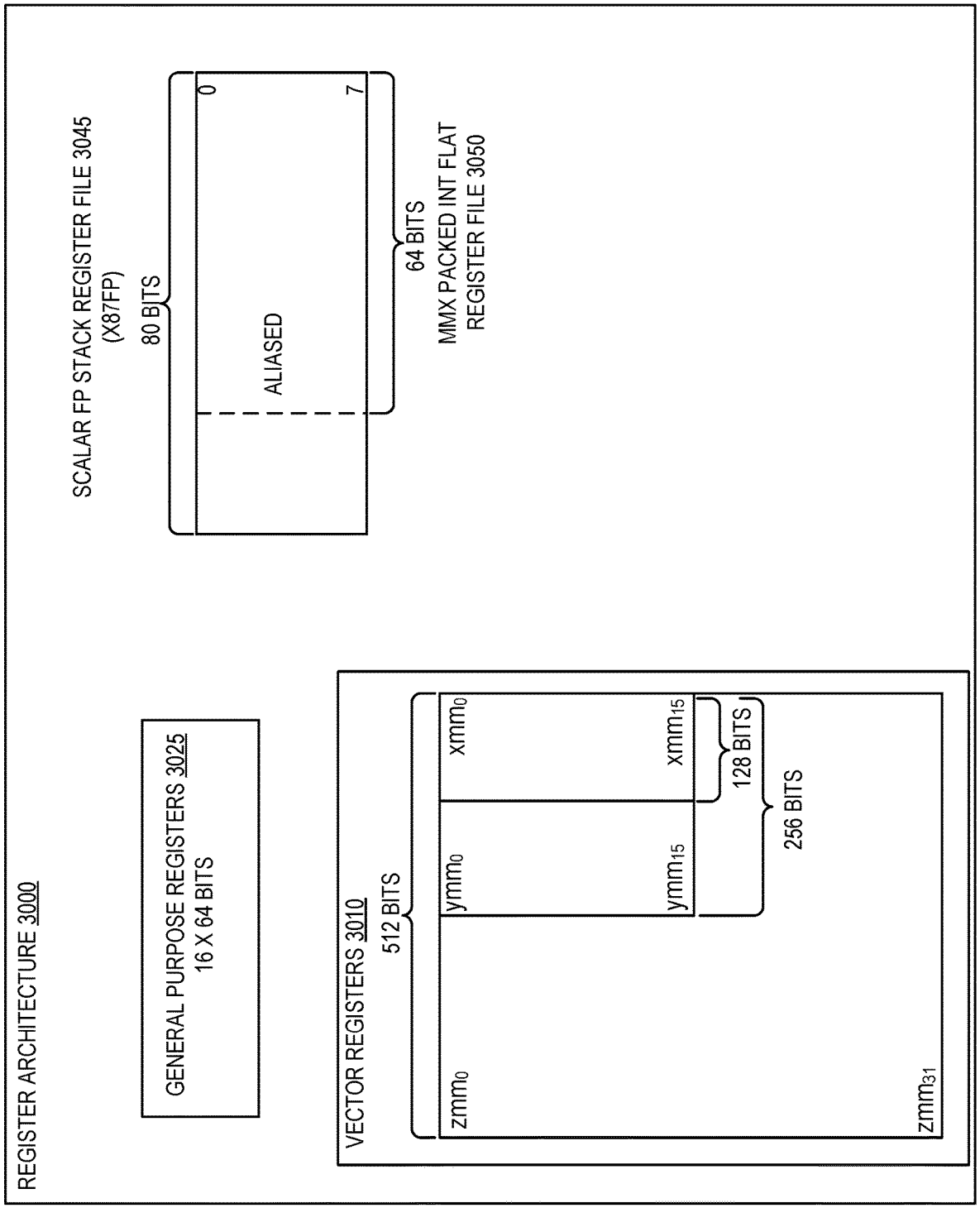
FIG. 30 is a block diagram of a register architecture according to one embodiment of the invention.

Optional source identifier 308, in some embodiments, specifies a source vector register, such as the vector registers included in a processor's register file (see, for example, the illustration and discussion of the embodiments of FIG. 4C, below). In some embodiments, optional source identifier 308 identifies a general purpose register included in the processor's register file, for example, as illustrated and discussed with respect to the embodiment of FIG. 4C, below. FIG. 30 and its associated description further below describe an embodiment of a processor's register file. In some embodiments, optional source identifier 308 identifies a memory location.

Optional second immediate 310 is included in some embodiments of vector operations with immediate values, for example, as illustrated and discussed with respect to the embodiments of FIG. 4D and FIG. 4E, below.

Optional element size identifier 312, in some embodiments, is included in the opcode, such as a prefix or suffix, "B," "W," "D," and "Q," corresponding to a size-1 byte, 2 bytes, 4 bytes, or 8 bytes, respectively—of each destination vector element. In some embodiments, optional element size identifier 312 is included in the opcode, such as a prefix or suffix, "H," "5," "D," "Q," and "E," corresponding to precision levels—Half precision (2 bytes), Single precision (4 bytes), Double precision (8 bytes), and Quadruple precision (16 bytes), respectively—of each destination vector element. In other embodiments, optional element size identifier 312 is an instruction parameter or operand specifying the destination vector elements' size and/or precision level.

In some embodiments, optional write mask 314 is a multi-bit operand, with each bit controlling whether a corresponding element of the destination vector is masked. In some embodiments, optional write mask 314 identifies a write mask register among the processor's register file. In some embodiments, if an element of the destination vector is masked, it retains the value it had before execution of the instruction, while, in other embodiments, if an element of the destination vector is masked, it is set to zero when the instruction is executed. In some embodiments, whether the value in the element of the destination vector retains its value or to be zeroed is specified by a masked element control field to be included in the instruction for a vector operation with an immediate. If an element of the destination vector is not masked, it is set to the value resulting from execution of the instruction.

In some embodiments, the behavior of optional write mask 314 is specified by use of a particular choice of opcode 302, or by a suffix or a prefix to the opcode 302. For example, a "SZ" suffix or prefix could be added to the opcode to indicate that masked vector elements are to be "Set to Zero." Or, a "ODD" prefix or suffix could be added to the opcode to indicate that odd-numbered elements of the destination vector are to be unmasked.

FIGS. 4A-4H illustrate various embodiments of executing instructions for vector operations with constant values.

Figure 4A:
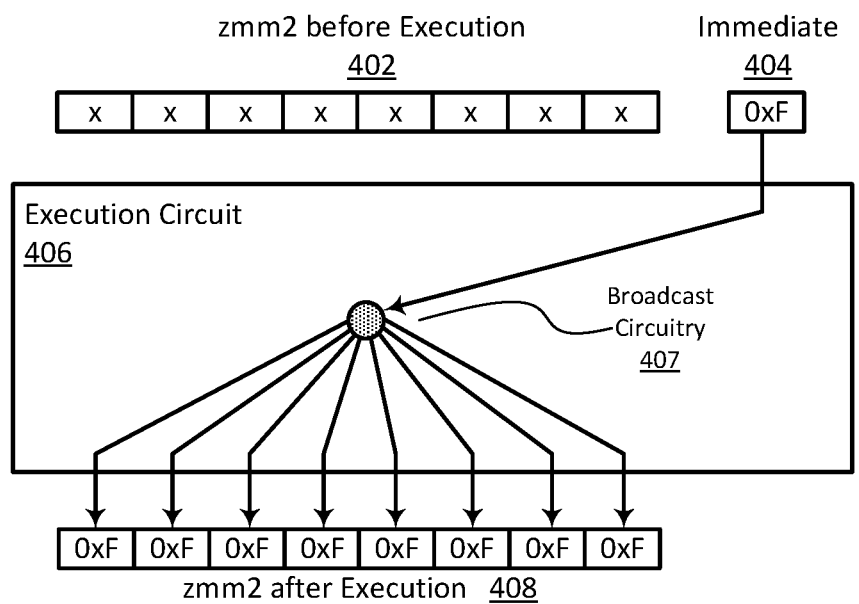
FIG. 4A illustrates an execution of an instruction to broadcast an immediate.

FIG. 4A illustrates an execution of an instruction to broadcast an immediate. The instruction includes an opcode (e.g., mnemonic "VBROADCASTIMM*"), a destination identifier (zmm/ymm/xmm) to specify a packed destination register, and an immediate. (As used herein, the term "mnemonic" refers to an abbreviation for an operation, an instruction, or an opcode.) The execution of this instruction broadcasts the immediate (imm) to all of the vector (packed data) elements of the packed destination register (zmm/ymm/xmm). The example has register zmm2 as the destination and 0×F as the immediate. 0×F is broadcast to every element of zmm2.

Opcode mnemonic VBROADCASTIMM* includes an asterisk, "*," which denotes various controls can be added to control the operation of the instruction. For example, the asterisk here could be replaced with one or more suffixes, such as "B," or "W," or "D,", or "Q" to specify the size of the vector elements of zmm2 as being a Byte, Word, Doubleword, or Quadword.

The elements of the destination vector before execution 402 are illustrated as 'x,' signifying a don't care value. They are not relevant in the discussion of the operation of this instruction. Immediate 404 is shown having a value of 0×F. Execution circuit 406, in response to a decoded instruction 401 to broadcast an immediate, uses broadcast circuitry 407 to broadcast the immediate 404 to every element of the destination vector register. In this illustration, the destination vector register after execution is shown as 408. In some embodiments, broadcast circuitry 407 is a crossbar.

Figure 4B:
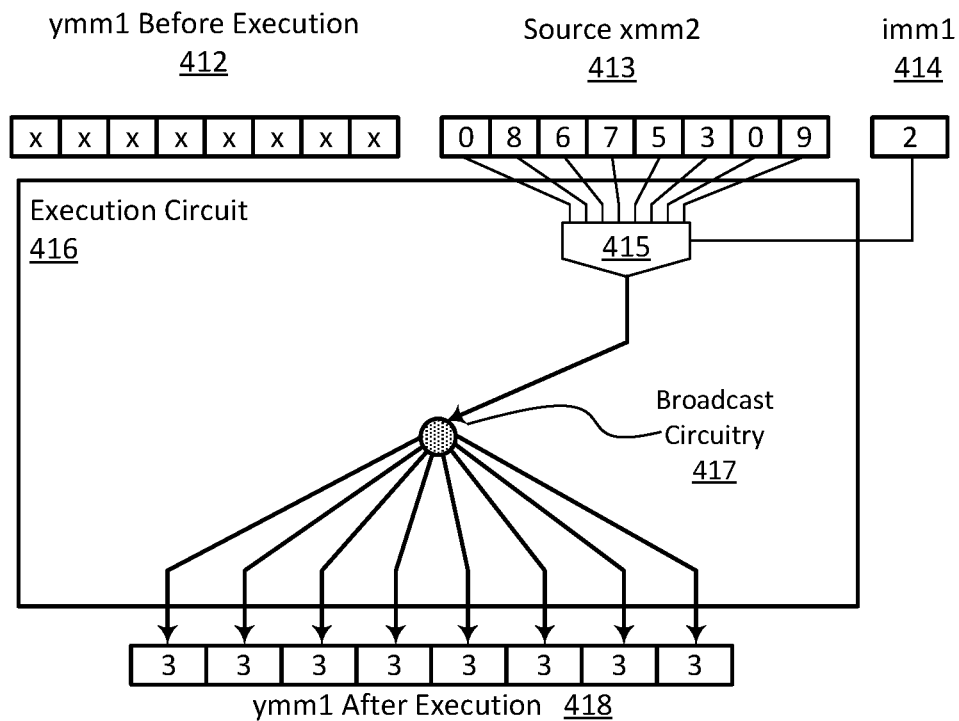
FIG. 4B illustrates an execution of an instruction to broadcast an immediate.

FIG. 4B illustrates an execution of an instruction to broadcast an immediate. The instruction 411 includes an opcode (e.g., mnemonic "VBROADCASTVREG*"), a destination vector (SIMD, packed data) register (zmm1/ymm1/xmm1), a source vector (SIMD, packed data) register (zmm2/ymm2/xmm2), and an immediate (imm1). The execution of this instruction uses the immediate (imm1) to select an element of the source vector register (zmm2/ymm2/xmm2), and broadcasts the selected value to all of the vector (packed data) elements of the destination register (zmm1/ymm1/xmm1).

Opcode mnemonic VBROADCASTVREG* includes an asterisk, "*," which denotes various controls can be added to control the operation of the instruction. For example, the asterisk here could be replaced with one or more suffixes, such as "B," or "W," or "D,", or "Q" to specify the size of the vector elements of zmm2 as being a Byte, Word, Doubleword, or Quadword.

The elements of the destination vector before execution 412 are illustrated as 'x,' signifying a don't care value. They are not relevant in the discussion of the operation of this instruction.

The example shows register ymm1 as the destination, imm1 414 having a value of 2, and source vector register xmm2 having a value of 3 in its third element. The execution circuit 416, in response to a decoded instruction 411 to broadcast an immediate, uses immediate 414 to control multiplexer 415 to select a third element of source vector register xmm2 413 (xmm2[2]), and uses broadcast circuitry 417 to broadcast the selected value to each element of the destination vector register ymm1 418. In some embodiments, broadcast circuitry 417 is a crossbar.

Figure 4C:
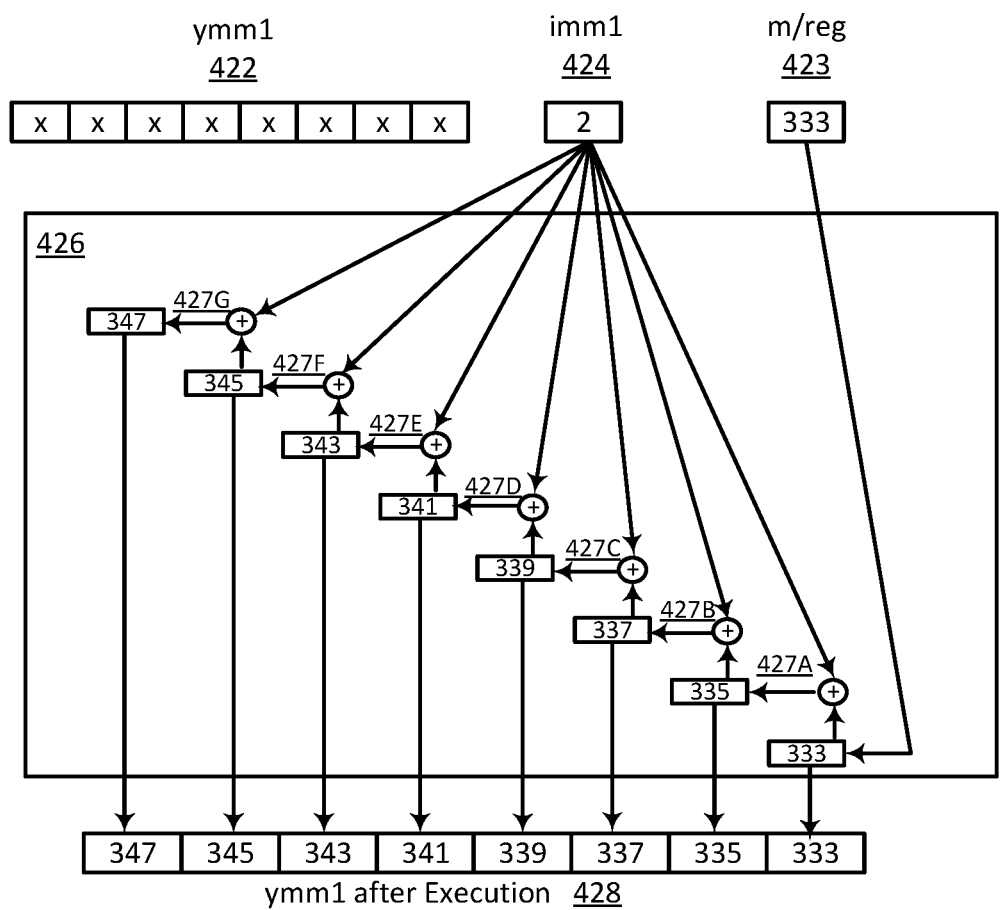
FIG. 4C illustrates an execution of an instruction to broadcast an immediate with a stride.

FIG. 4C illustrates an execution of an instruction to broadcast an immediate with a stride. The instruction includes an opcode (e.g., mnemonic "VBROADCASTSTRIMM*"), a destination vector (SIMD, packed data) register (zmm1/ymm1/xmm1), a source general purpose register (m/reg), and an immediate imm1. The execution of this instruction sets a first element of destination vector register (zmm1/ymm1/xmm1) to the value of the source general purpose register (m/reg 423), and uses adders 427A-427G to add a stride value specified by the immediate imm1 424 to subsequent elements of the destination vector register 428.

Opcode mnemonic VBROADCASTSTRIMM* includes an asterisk, "*," which denotes various controls can be added to control the operation of the instruction. For example, the asterisk here could be replaced with one or more suffixes, such as "B," or "W," or "D,", or "Q" to specify the size of the vector elements of zmm2 as being a Byte, Word, Doubleword, or Quadword.

The elements of the destination vector register ymm1 before execution 422 are illustrated as 'x,' signifying a don't care value. They are not relevant in the discussion of the operation of this instruction. The example has register ymm1 422 as the destination, sets a first element of the destination vector, shown after execution as ymm1 428, to 0x333, the value stored in the general purpose register m/reg, and successively adds a stride value of 2, as specified by imm1, to each of the subsequent elements of ymm1 428. Execution circuit 426, in response to a decoded instruction 421 to broadcast an immediate with a stride, sets a first element of destination vector register ymm1 428 to the value stored in the general purpose register 423, which is 333, and uses adders 427A-427G to successively add a stride value stored in imm1 424, which is 2, to each of the second and subsequent elements.

As illustrated, ymm1 428 is ordered according to Little-Endian ordering, in which the least significant element is shown on the right. In some embodiments, ymm1 428 is ordered according to Big-Endian ordering.

Figure 4D:
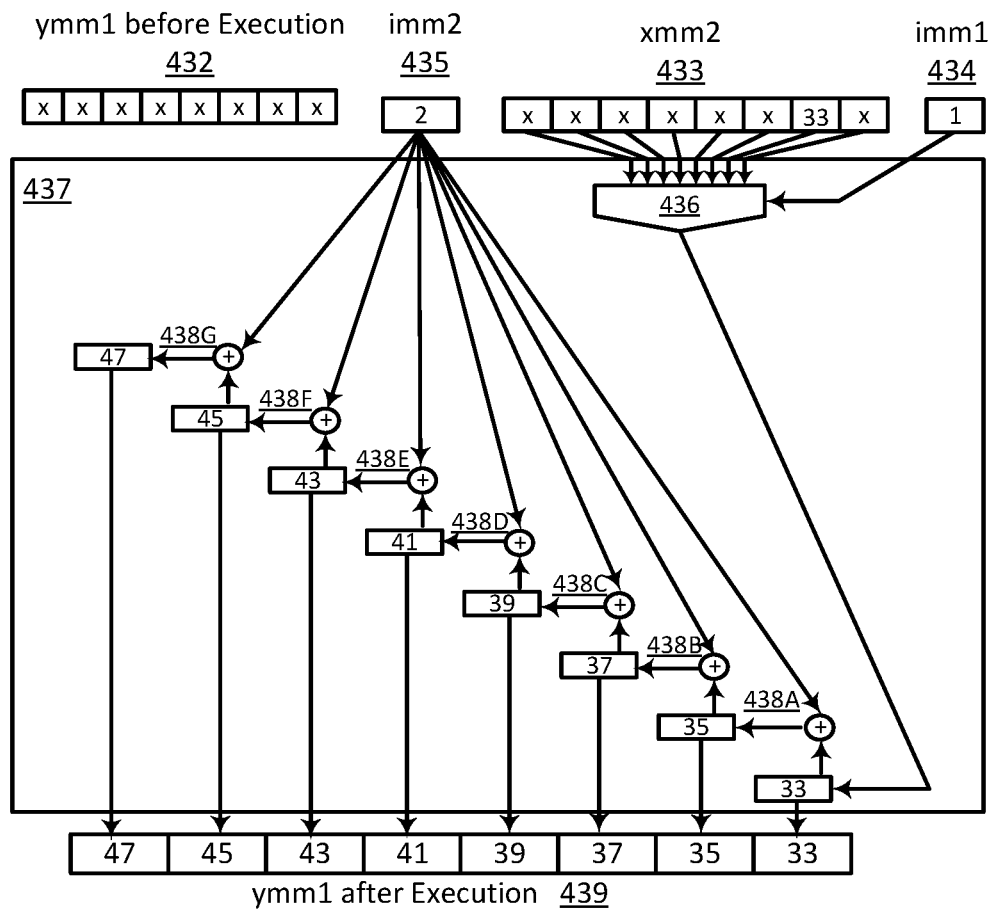
FIG. 4D illustrates an execution of an instruction to broadcast an immediate with a stride.

FIG. 4D illustrates an execution of an instruction to broadcast an immediate with a stride. The instruction includes an opcode (e.g., mnemonic "VBROADCASTSTRVREG"), a destination vector (SIMD, packed data) register (zmm1/ymm1/xmm1), a source vector (SIMD, packed data) register (zmm2/ymm2/xmm2), a first immediate (imm1), and a second immediate (imm2). The execution of this instruction uses the first immediate imm1 to select an element of the source vector (SIMD, packed data) register (zmm2/ymm2/xmm2, sets a first data element of the destination vector (SIMD, packed data) register (zmm1/ymm1/xmm1) to the value of the selected element, and successively adds a stride value specified by the second immediate to the second and subsequent elements of the destination vector (zmm1/ymm1/xmm1) register.

Opcode mnemonic VBROADCASTSTRVREG* includes an asterisk, "*," which denotes various controls can be added to control the operation of the instruction. For example, the asterisk here could be replaced with one or more suffixes, such as "B," or "W," or "D,", or "Q" to specify the size of the vector elements of zmm2 as being a Byte, Word, Doubleword, or Quadword.

The example has register ymm1 as the destination, imm1 434 as the first immediate, source vector xmm2 433, and second immediate imm2 435. The elements of ymm1 before execution 432 and all but element [1] of xmm2 433 are illustrated as 'x,' signifying a don't care value. They are not relevant in the discussion of the operation of this instruction. Execution circuit 437, in response to a decoded instruction 431 to broadcast an immediate with a stride, uses multiplexer 436, controlled by imm1 434, having a value of 1, to select the first (index=1) element of source vector register xmm2 433, having a value of 33, and sets a first element of destination vector register ymm1 439 to the selected element. Execution circuit 437 further uses adders 438A-438G to successively add a stride value of '2,' specified by imm2 435, to the second and subsequent elements of ymm1 439.

Figure 4E:
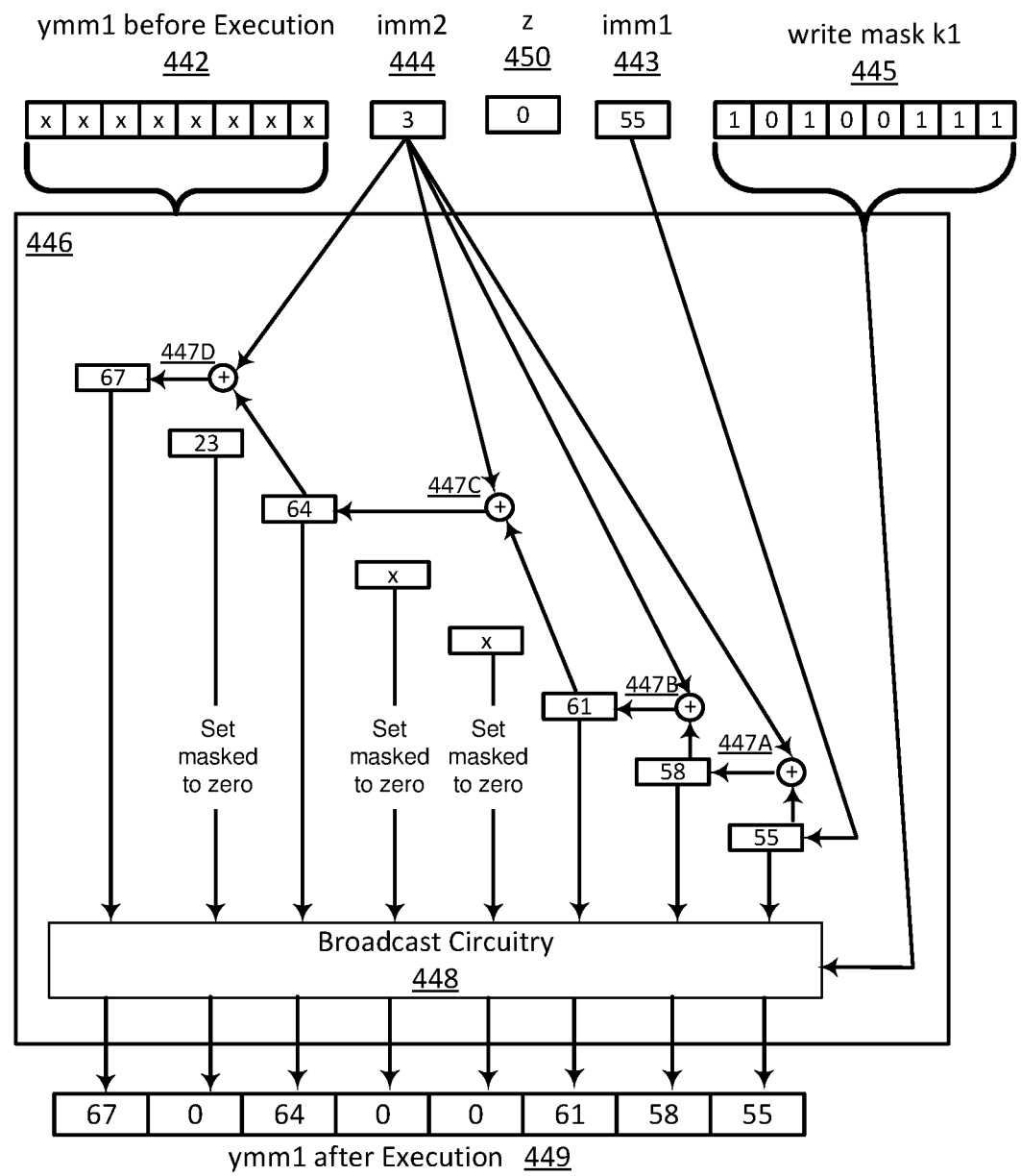
FIG. 4E illustrates an execution of an instruction to broadcast an immediate with a stride.

FIG. 4E illustrates an execution of an instruction to broadcast an immediate with a stride. The instruction 441 includes an opcode (e.g., mnemonic "VBROADCAST-STRIMMMSKED*"), a destination vector (SIMD, packed data) register (zmm1/ymm1/xmm1), a write mask (k1), a masked element control field (z), a first immediate (imm1), and a second immediate (imm2). The execution of this instruction uses the first immediate (imm1) to set a first unmasked element of the destination vector register (zmm1/ymm1/xmm1), and successively adds a stride value specified by the second immediate imm2 to the second and subsequent unmasked elements of the destination vector register (zmm1/ymm1/xmm1). In an embodiment, the masked element control field z, when equal to zero, causes execution of this instruction to zero masked destination vector elements, and when equal to 1, causes execution of this instruction to allow masked destination vector elements to retain their previous values.

Opcode mnemonic VBROADCASTSTRIMMMSKED* includes an asterisk, "*," which denotes various controls can be added to control the operation of the instruction. For example, the asterisk here could be replaced with one or more suffixes, such as "B," or "W," or "D,", or "Q" to specify the size of the vector elements of ymm1 as being a Byte, Word, Doubleword, or Quadword.

The example has ymm1 as the destination, with elements of ymm1 before execution 442 illustrated as 'x,' signifying a don't care value. They are not relevant in the discussion of the operation of this instruction. Execution circuit 446, in response to a decoded instruction 441 to broadcast an immediate with a stride, uses broadcast circuitry 448 under write mask k1 445, to set a first unmasked element of ymm1 449 to 55, specified by imm1 443, and uses adders 447A to 447D to successively add a stride value of 3, specified by imm2 444, to the second and subsequent unmasked elements of ymm1 449. In some embodiments, broadcast circuitry 448 is a cross bar. The example has masked element control field, z 450, equal to zero, which causes the execution circuit to zero masked elements of ymm1 449.

Figure 4F:
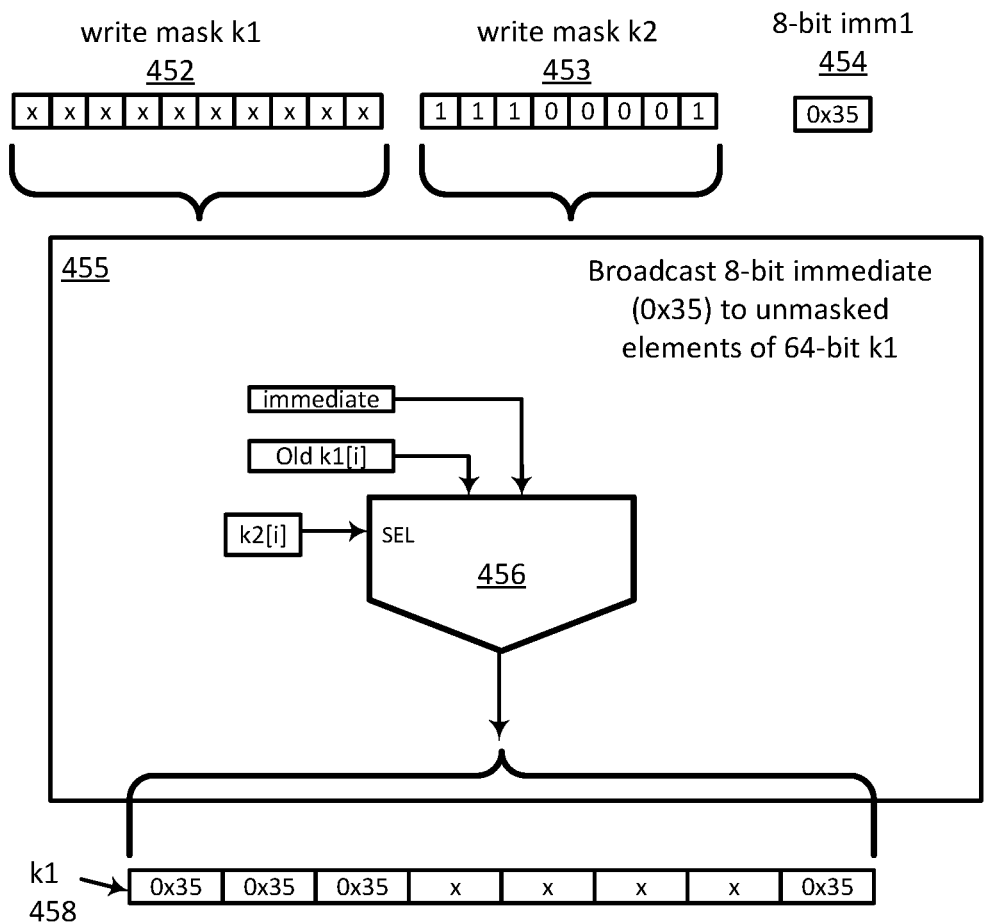
FIG. 4F illustrates an execution of an instruction to broadcast an immediate to a mask register.

FIG. 4F illustrates an execution of an instruction to broadcast an immediate to a write mask. The instruction 451 includes an opcode (e.g., mnemonic "KBROADCASTIMM2MSK*"), a destination write mask k1, a write mask k2, and an immediate (imm1). The execution of this instruction logically partitions write mask k1 into equal-sized logical partitions having the same size as imm1, uses write mask k2 to identify unmasked partitions of destination write mask k1, and broadcasts imm1 to the unmasked logical partitions.

Opcode mnemonic KBROADCASTIMM2MSK* includes an asterisk, "*," which denotes various controls can be added to control the operation of the instruction. For example, the asterisk here could be replaced with one or more suffixes, such as "B," or "W," or "D,", or "Q," to specify the number of least significant bits of destination write mask k1 to write, the size being a Byte, Word, Doubleword, or Quadword.

The example has write mask k1 as the destination, with elements of write mask k1 before execution 452 illustrated as 'x,' signifying a don't care value. They are not relevant in the discussion of the operation of this instruction. Execution circuit 455, in response to a decoded instruction 451 to broadcast an immediate to a write mask, logically partitions destination write mask k1 into equal-sized logical partitions having the same size as 8-bit imm1 454, and uses write mask k2 453 and multiplexer 456 to select a value to be written to each of the elements of k1 458. When masked (e.g., when k2[i] equals 0), the old value of a corresponding k1 element is selected, and when unmasked (e.g., when k2[i] equals 1), immediate imm1 454 is selected and written to the corresponding logical partition of k1; as shown, imm1 454 is written to the first, sixth, seventh, and eighth logical partitions of k1. It should be noted that the write mask k2 is optional, and when no write mask k2 is provided, every logical partition of k1 is set to the immediate.

Some examples of vector-friendly instruction formats are described below with respect to FIGS. 29A-29C. Comparing FIG. 4F to FIGS. 29A-29C, in some embodiments opcode KBROADCASTIMM2MSK* maps to base operation field 2942 (FIG. 29B). In some embodiments, destination write mask identifier k1, source write mask identifier k2, and immediate imm1 map to register index field 2944 (FIG. 29A), which is described below as containing enough bits, N, to identify three sources and one destination register.

Figure 4G:
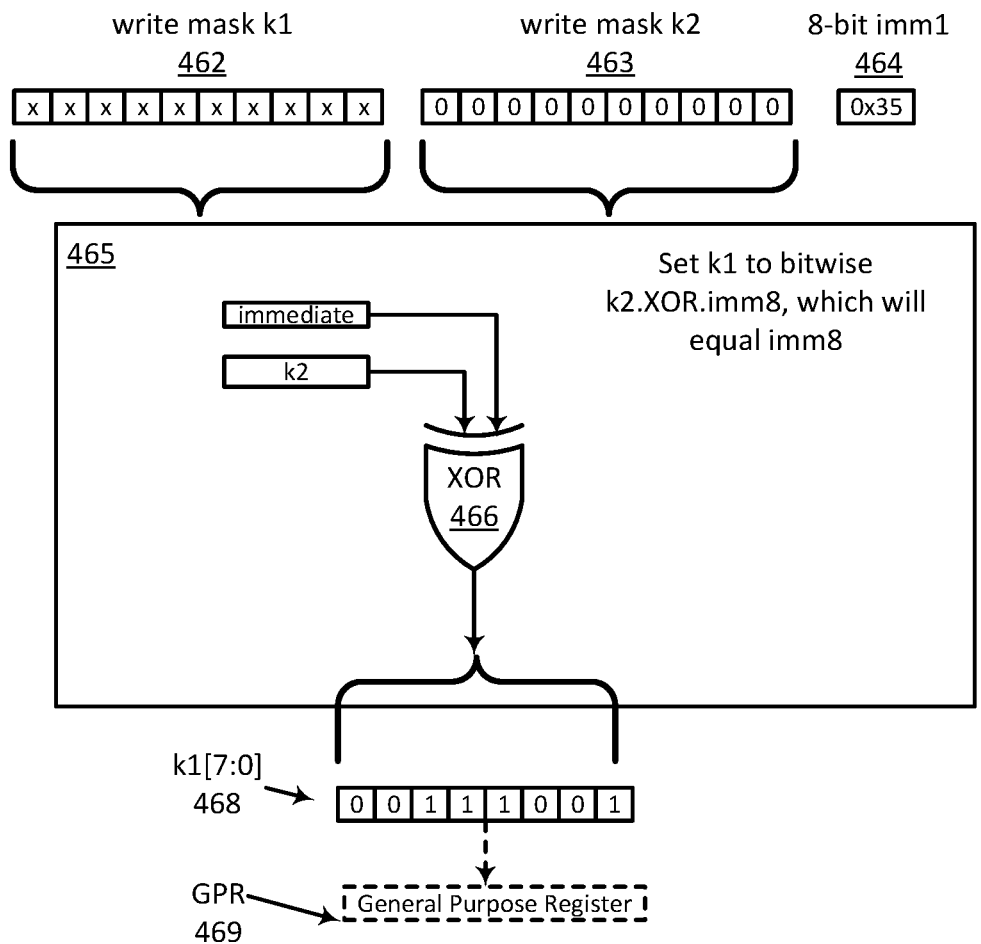
FIG. 4G illustrates an execution of an instruction to set a destination mask register to a result of an operation on an immediate.

FIG. 4G illustrates an execution of an instruction to set a destination mask register to write a result of an operation on an immediate. The instruction 461 includes an opcode (e.g., mnemonic "KXORKREGIMM*"), a destination write mask register (k1), a source write mask register (k2), and an immediate (imm1). The execution of this instruction performs an operation using the immediate imm1 and source mask register k2, and writes the result to destination mask register k1.

Opcode mnemonic KXORKREGIMM* includes an asterisk, "*," which denotes various controls can be added to control the operation of the instruction. For example, the asterisk here could be replaced with one or more suffixes, such as "B," or "W," or "D,", or "Q," to specify the number of least significant bits of destination mask register k1 to write, the size being a Byte, Word, Doubleword, or Quadword.

The example shows write mask k1 as the destination, with elements of write mask k1 before execution 462 illustrated as 'x,' signifying a don't care value. They are not relevant in the discussion of the operation of this instruction. Execution circuit 465, in response to a decoded instruction 461 to set a write mask to results of an operation, uses XOR gate 466 to perform a bit-wise XOR of source write mask k2 463, having a value of 0x00, and 8-bit immediate imm1 464, having an initial value of 0x035, and writes the result, 0x35, to destination write mask register k1 468.

The embodiment of FIG. 4G illustrates a benefit of the embodiment: using a register file location to store an immediate, while avoiding using general purpose registers and vector registers of the register file. In some embodiments, the immediate imm1, as stored in k1 468, is used directly by execution hardware. In other embodiments, an instruction, for example KMOV, is used to move the contents of k1 to a general purpose register 469 for use in execution.

Figure 4H:
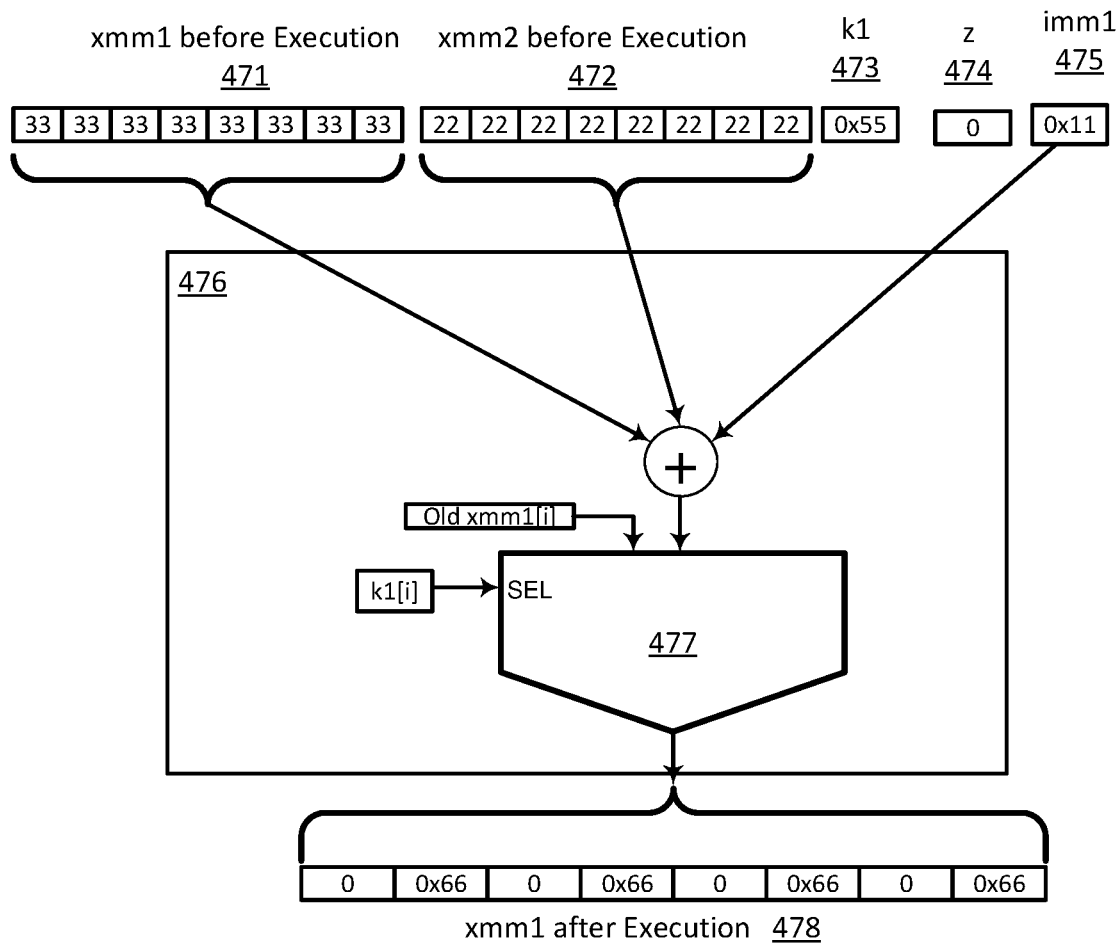
FIG. 4H illustrates an execution of an instruction to broadcast a result of an operation on an immediate.

FIG. 4H illustrates an execution of an instruction to broadcast a result of an operation on an immediate. The instruction 470 includes an opcode (e.g., mnemonic "VPADD3OPR*"), a destination vector (SIMD, packed data) register (zmm1/ymm1/xmm1), a write mask (k1), a masked element control field (z), a source vector (SIMD, packed data) register (zmm2/ymm2/xmm2), and an immediate (imm1). The execution of this instruction uses write mask k1 to identify unmasked elements of the destination vector register (zmm1/ymm1/xmm1), generates a sum of each element of the destination vector (SIMD, packed data) register (zmm1/ymm1/xmm1), plus the corresponding element of source vector register (zmm2/ymm2/xmm2), plus the immediate imm1, to broadcasts the sum to each unmasked element of the destination vector register (zmm1/ymm1/xmm1).

Opcode mnemonic VPADD3OPR* includes an asterisk, "*," which denotes various controls can be added to control the operation of the instruction. For example, the asterisk here could be replaced with one or more suffixes, such as "B," or "W," or "D,", or "Q," to specify the size of the vector elements of zmm2 as being a Byte, Word, Doubleword, or Quadword.

The example shows xmm1 471, each element of which has an initial value of 0x33, as the destination, xmm2 472, each element of which has a value of 0x22, as the source, immediate imm1, having a value of 0x11, and write mask k1, having a value of 0x55. Execution circuit 476, in response to a decoded instruction to broadcast a result of an operation on an immediate (VPADD3OPR*), generates a sum of xmm1[i], plus xmm2[i], plus the immediate for each element of the xmm1, and uses multiplexer 477, controlled by write mask k1, to broadcast the sum to unmasked elements of destination vector xmm1. Masked element control field, z 474, controls how masked elements of destination vector are to be treated. Masked element control field, z, has a value of zero, which specifies that masked elements of the destination vector register xmm1 478 are to be zeroed. In some embodiments, when z=1, masked elements of the destination vector are to retain their previous values.

Vbroadcastimm Instruction
Exemplary Execution

Detailed herein are embodiments of an VBROADCASTIMM instruction to improve a computer itself. In particular, the execution of the VBROADCASTIMM instruction causes broadcasting an immediate to all of the elements of a destination packed register.

Figure 5:
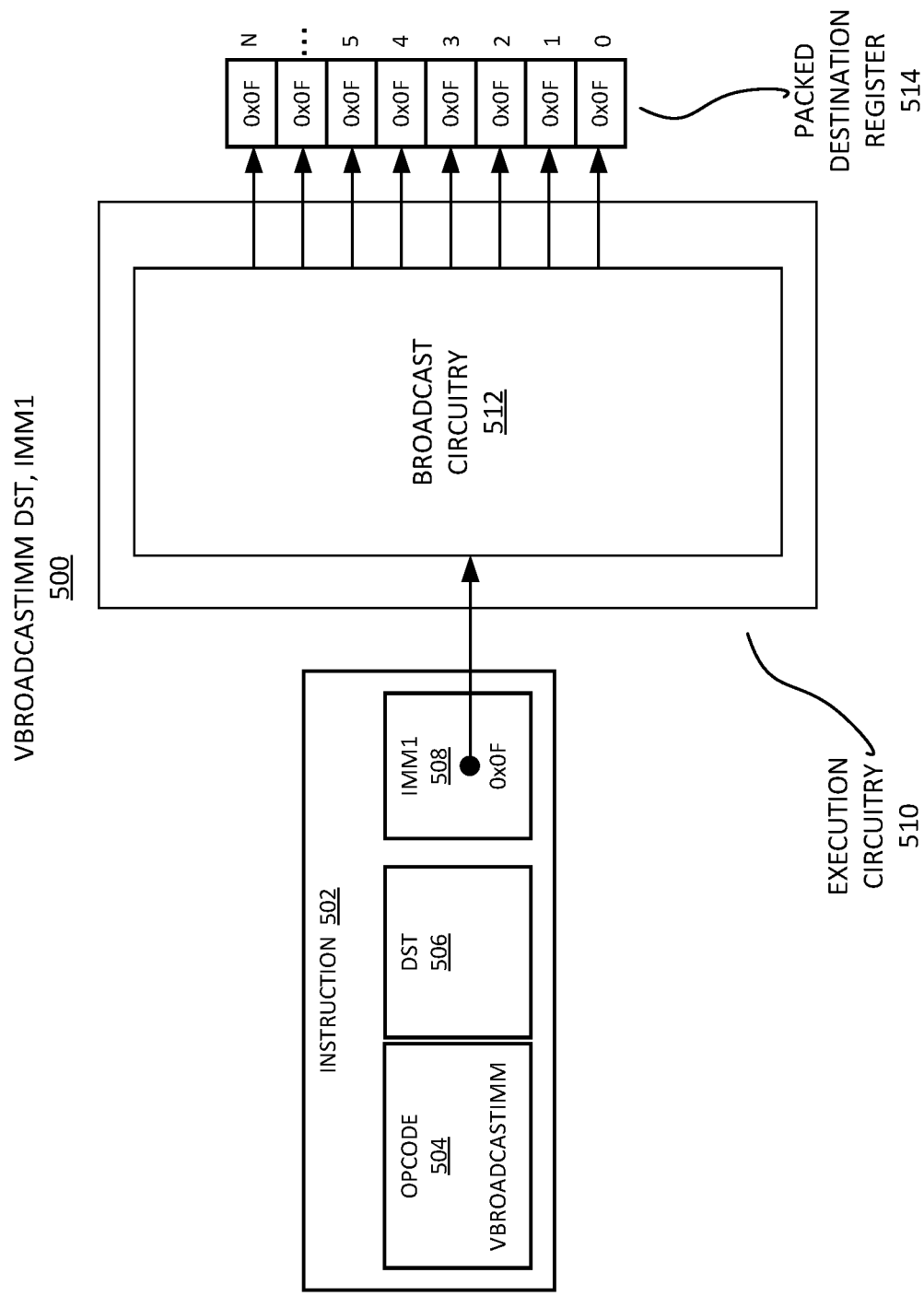
FIG. 5 illustrates an exemplary execution of an instruction having an immediate operand.

FIG. 5 illustrates an exemplary execution of a VBROADCASTIMM instruction. The VBROADCASTIMM instruction 500, 502 format includes fields for an opcode 504 (e.g., mnemonic "VBROADCASTIMM"), a destination identifier 506 to specify the packed destination register 506, and an immediate (imm1 508).

Execution circuitry 510, in response to an instruction having opcode 504 equal to VBROADCASTIMM, uses broadcast circuitry 512 to broadcast imm1 508 to all of the vector (packed data) elements of packed destination register 514. The example has 0xF as imm1 508. 0xF is broadcasted to all of the vector (packed data) elements of packed destination register 514.

Exemplary Hardware to Execute the VBROADCASTIMM Instruction

Figure 6:
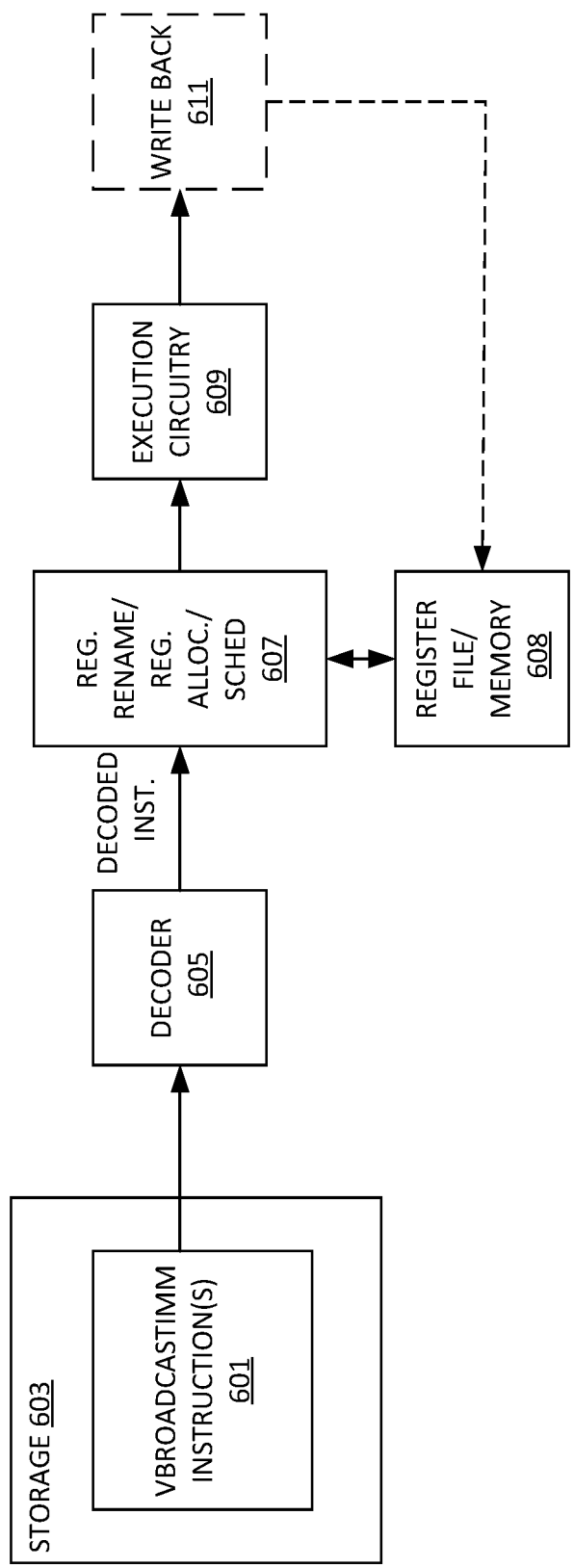
FIG. 6 illustrates an embodiment of hardware to process an instruction having an immediate operand.

FIG. 6 illustrates an embodiment of hardware to process an instruction such as a VBROADCASTIMM instruction. As illustrated, storage 603 stores a VBROADCASTIMM instruction 601 to be executed.

The instruction is received by decode circuitry 605. For example, the decode circuitry 605 receives this instruction from fetch logic/circuitry. The instruction 601 includes fields for an opcode (e.g., mnemonic "VBROADCASTIMM"), a destination identifier to specify a packed destination register, and an immediate. More detailed embodiments of at least one instruction format will be detailed later. The decode circuitry 605 decodes the instruction into one or more operations. In some embodiments, this decoding includes generating a plurality of micro-operations to be performed by execution circuitry (such as execution circuitry 609 or 510). The decode circuitry 605 also decodes instruction prefixes (if used).

In some embodiments, register renaming, register allocation, and/or scheduling circuitry 607 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 608 store data as operands of the instruction to be operated on by execution circuitry. Exemplary register types include packed data registers, general purpose registers, and floating point registers.

Execution circuitry 609 executes the decoded VBROADCASTIMM instruction. An embodiment of execution circuitry 510 was shown in FIG. 5. Write back (retirement) circuitry 611 commits the result of the execution of the decoded VBROADCASTIMM instruction.

Exemplary Formats of the VBROADCASTIMM Instruction

In some embodiments, retirement/write back circuitry architecturally commits the destination register into the registers or memory and retires the instruction.

An embodiment of a format for a VBROADCASTIMM instruction is OPCODE DSTREG, IMM1. In some embodiments, VBROADCASTIMM {B/W/D/Q} is the opcode mnemonic of the instruction. DSTREG is a field for the packed destination register operand. IMM1 is a field for an immediate to be broadcasted to the packed destination register.

In some embodiments, the OPCODE field is a full opcode field (such as 2974 or a real opcode field (such as 2930), the DSTREG field is a Reg field (such as 2944), and the IMM1 field is an IMM8 field (such as 2972).

In some embodiments, the VBROADCASTIMM instruction includes a field for a write mask register operand (k) (e.g., VBROADCASTIMM{k} DSTREG, SRC1, SRC2). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword (int32), double-precision floating-point (float64), integer quadword (int64). The length of a opmask register, MAX_KL, is sufficient to handle up to 64 elements with one bit per element, i.e., 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding write mask bit is not set; instead, the destination element value must be preserved (merging-masking) or it must be zeroed out (zeroing-masking); and 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the VBROADCASTIMM Instruction

Figure 7:
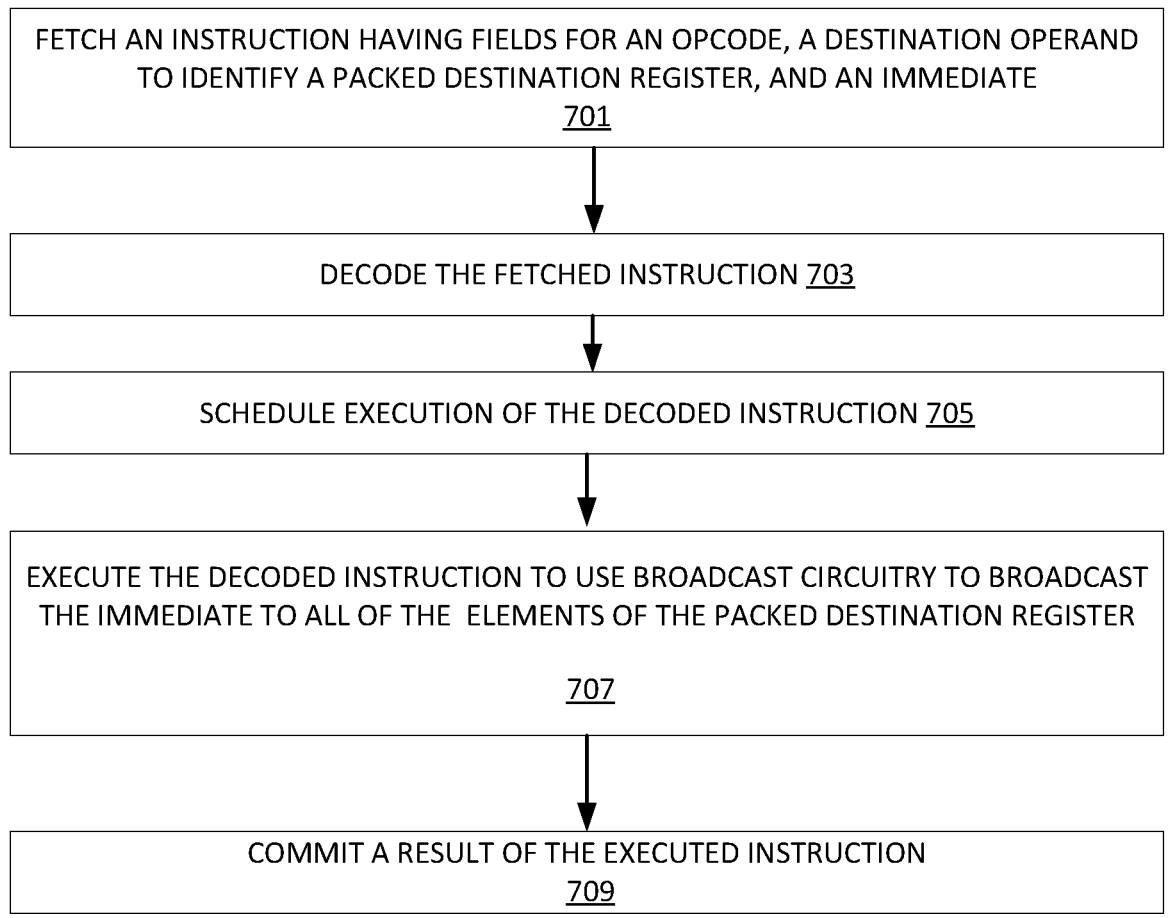
FIG. 7 illustrates an embodiment of a method performed by a processor to process an instruction having an immediate operand.

FIG. 7 illustrates an embodiment of method performed by a processor to process a VBROADCASTIMM instruction. For example, the processor components of FIG. 6, a pipeline as detailed below, etc. performs this method.

At 701, an instruction is fetched. For example, a VBROADCASTIMM instruction is fetched. The VBROADCASTIMM instruction includes fields for an opcode, an immediate, and a destination operand. In some embodiments, the instruction further includes a field for a write mask. In some embodiments, the instruction is fetched from an instruction cache. The destination operand specifies a packed data vector register. The opcode of the VBROADCASTIMM instruction indicates an IMMediate is BROADCASTed.

The fetched instruction is decoded at 703. For example, the fetched VBROADCASTIMM instruction is decoded by decode circuitry such as that detailed herein.

At 705, the decoded instruction is scheduled (as needed).

At 707, the scheduled instruction is executed by execution circuitry (hardware) such as execution circuitry 510. For the VBROADCASTIMM instruction, the execution will cause execution circuitry 510 to use broadcast circuitry (such as 512) to broadcast imm1 (such as 508) to all of the vector (packed data) elements of the packed destination register 514.

In some embodiments, the instruction is committed or retired at 709.

Vbroadcastvreg Instruction

Exemplary Execution

Detailed herein are embodiments of an VBROADCASTVREG instruction to improve a computer itself. In particular, the execution of the VBROADCASTVREG instruction causes select an immediate stored in a packed source register, and to broadcast the selected element to all of the elements of a packed destination register.

Figure 8:
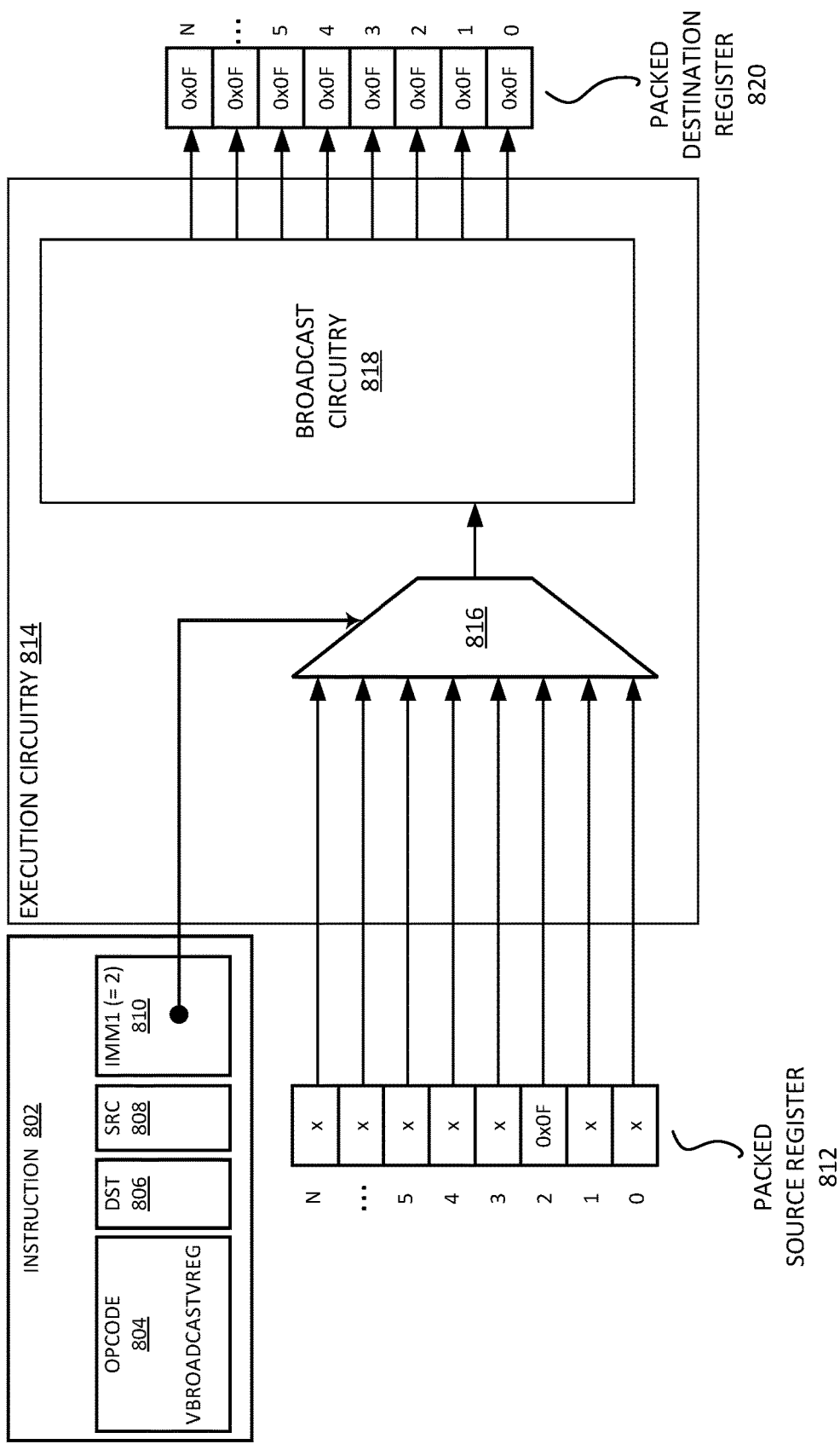
FIG. 8 illustrates an exemplary execution of an instruction having an immediate operand.

FIG. 8 illustrates an exemplary execution of a VBROADCASTVREG instruction. The VBROADCASTVREG instruction 800, 802 format includes fields for an opcode 804 (e.g., mnemonic "VBROADCASTVREG"), a destination identifier 806 to specify a packed destination register 806, a source vector (SIMD, packed data) register 808, and an immediate (imm1 810).

Execution circuitry 814, in response to an instruction having opcode 804 equal to VBROADCASTVREG, uses multiplexer 816, controlled by imm1 810, to select an element of packed source register 812, and uses broadcast circuitry 818 to broadcast the selected element to all of the vector (packed data) elements of the packed destination register 820. The example has 2 as imm1 810, and 0x0F as the third element of packed source 812; 0x0F is selected from the source packed data register and is broadcasted to all of the vector (packed data) elements of the packed destination register 820.

Some vector elements of FIG. 8 are illustrated as 'x,' signifying a don't care value. They are not relevant in the discussion of the operation of this instruction.

Exemplary Hardware to Execute the VBROADCASTVREG Instruction

Figure 9:
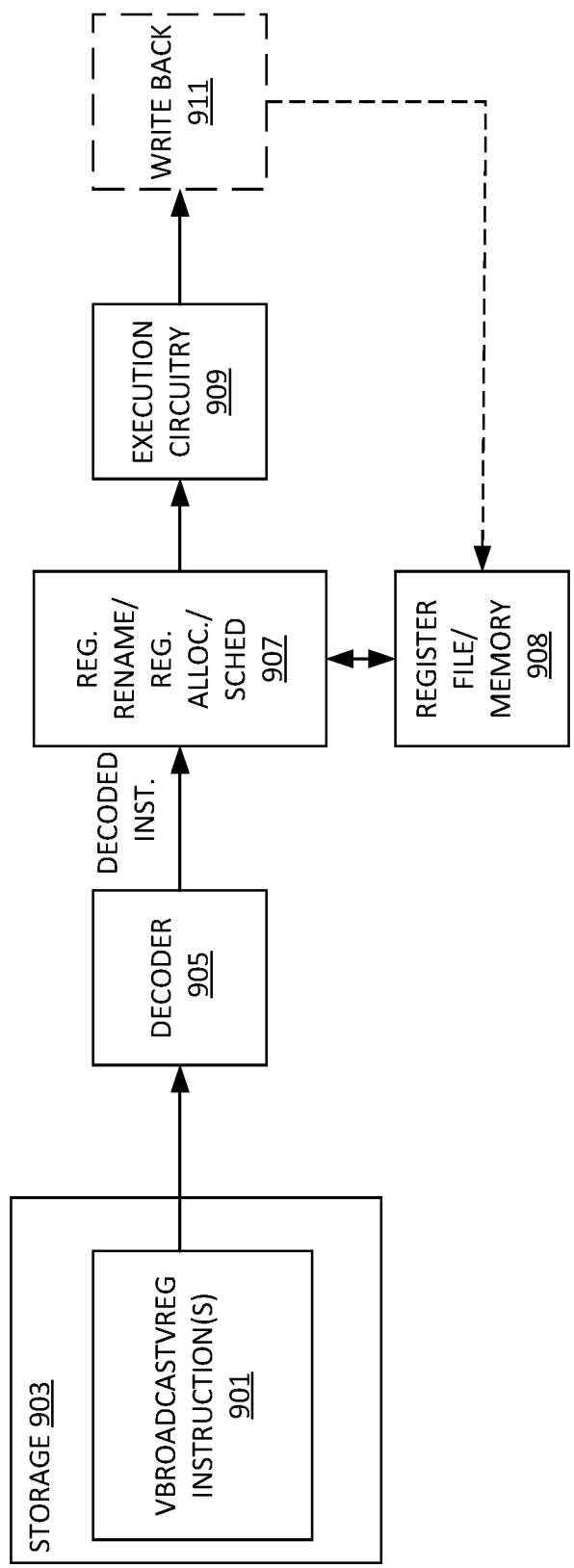
FIG. 9 illustrates an embodiment of hardware to process an instruction having an immediate operand.

FIG. 9 illustrates an embodiment of hardware to process an instruction such as an arithmetic recurrence instruction. As illustrated, storage 903 stores a VBROADCASTVREG instruction 901 to be executed.

The instruction is received by decode circuitry 905. For example, the decode circuitry 905 receives this instruction from fetch logic/circuitry. The decode circuitry 905 decodes the instruction into one or more operations. In some embodiments, this decoding includes generating a plurality of micro-operations to be performed by execution circuitry (such as execution circuitry 909 or 814). The decode circuitry 905 also decodes instruction prefixes (if used).

In some embodiments, register renaming, register allocation, and/or scheduling circuitry 907 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 908 store data as operands of the instruction to be operated on by execution circuitry. Exemplary register types include packed data registers, general purpose registers, and floating point registers.

Execution circuitry 909 executes the decoded VBROADCASTVREG instruction. An embodiment of execution circuitry 814 was shown in FIG. 8. Write back (retirement) circuitry 911 commits the result of the execution of the decoded VBROADCASTVREG instruction.

Exemplary Formats of the VBROADCASTVREG Instruction

In some embodiments, retirement/write back circuitry architecturally commits the destination register into the registers or memory and retires the instruction.

An embodiment of a format for a VBROADCASTVREG instruction is OPCODE DSTREG, DSRCREG, IMM1. In some embodiments, VBROADCASTVREG {B/W/D/Q} is the opcode mnemonic of the instruction. SRCREG is a field to identify the packed source register operand DSTREG is a field to identify the packed destination register operand. IMM1 is a field for an immediate to be used to select an element of the source vector register.

In some embodiments, the OPCODE field is a full opcode field (such as 2974 or a real opcode field (such as 2930), the SRCREG field is a Reg filed (such as 2944), the DSTREG field is a R/M field (such as 2946), and the IMM1 field is an IMM8 field (such as 2972 in FIG. 29A).

In some embodiments, the VBROADCASTVREG instruction includes a field for a write mask register operand (k) (e.g., VBROADCASTVREG{k} DSTREG, SRC1, SRC2). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e., 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding write mask bit is not set; instead, the destination element value must be preserved (merging-masking) or it must be zeroed out (zeroing-masking); and 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the VBROADCASTVREG Instruction

Figure 10:
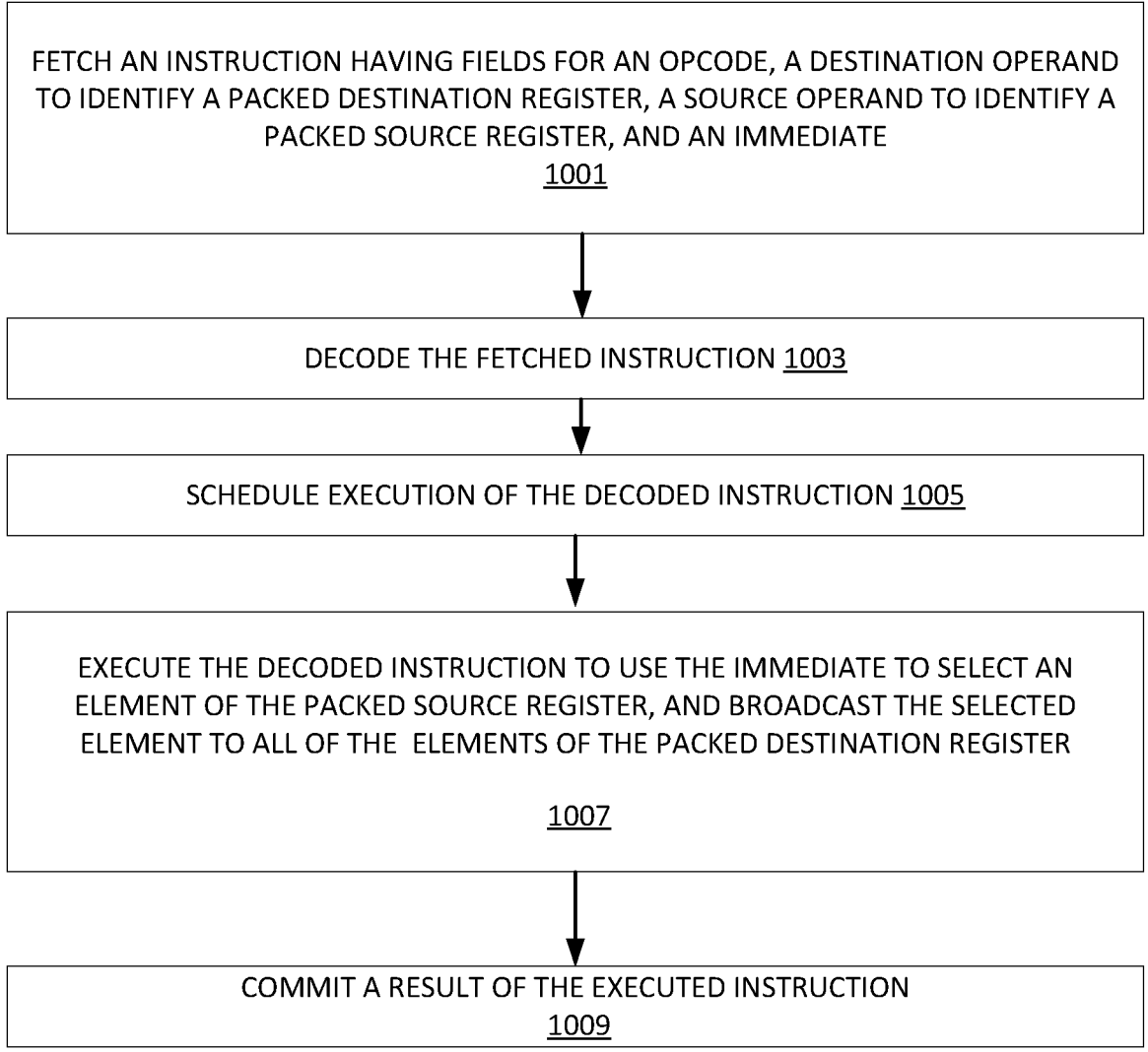
FIG. 10 illustrates an embodiment of a method performed by a processor to process an instruction having an immediate operand.

FIG. 10 illustrates an embodiment of method performed by a processor to process a VBROADCASTVREG instruction. For example, the processor components of FIG. 9, a pipeline as detailed below, etc. performs this method.

At 1001, an instruction is fetched. For example, a VBROADCASTVREG instruction is fetched. The VBROADCASTVREG instruction includes fields for an opcode, a destination operand, a source operand, and an immediate. In some embodiments, the instruction further includes a field for a write mask. In some embodiments, the instruction is fetched from an instruction cache. The destination operand specifies a packed data vector register. The opcode of the VBROADCASTVREG instruction indicates a Vector REGister element is BROADCASTed.

The fetched instruction is decoded at 1003. For example, the fetched VBROADCASTVREG instruction is decoded by decode circuitry such as that detailed herein.

At 1005, the decoded instruction is scheduled (as needed).

At 1007, the scheduled instruction is executed by execution circuitry (hardware) such as 810. For the VBROADCASTVREG instruction, the execution will cause execution circuitry (such as 814) to use a multiplexer (such as 816), controlled by imm1 (such as imm1 810), to select an element of packed source register (such as 812), use broadcast circuitry (such as 818) to broadcast the selected element to all of the vector (packed data) elements of the packed destination register (such as 820).

In some embodiments, the instruction is committed or retired at 1009.

Vbroadcaststrimm Instruction
Exemplary Execution

Detailed herein are embodiments of a VBROADCASTSTRIMM instruction to improve a computer itself. In particular, the execution of the VBROADCASTSTRIMM instruction set a first element of a packed destination register to a value stored in a register, and to add a stride value specified by an immediate to the second and subsequent elements of the packed destination vector.

Figure 11:
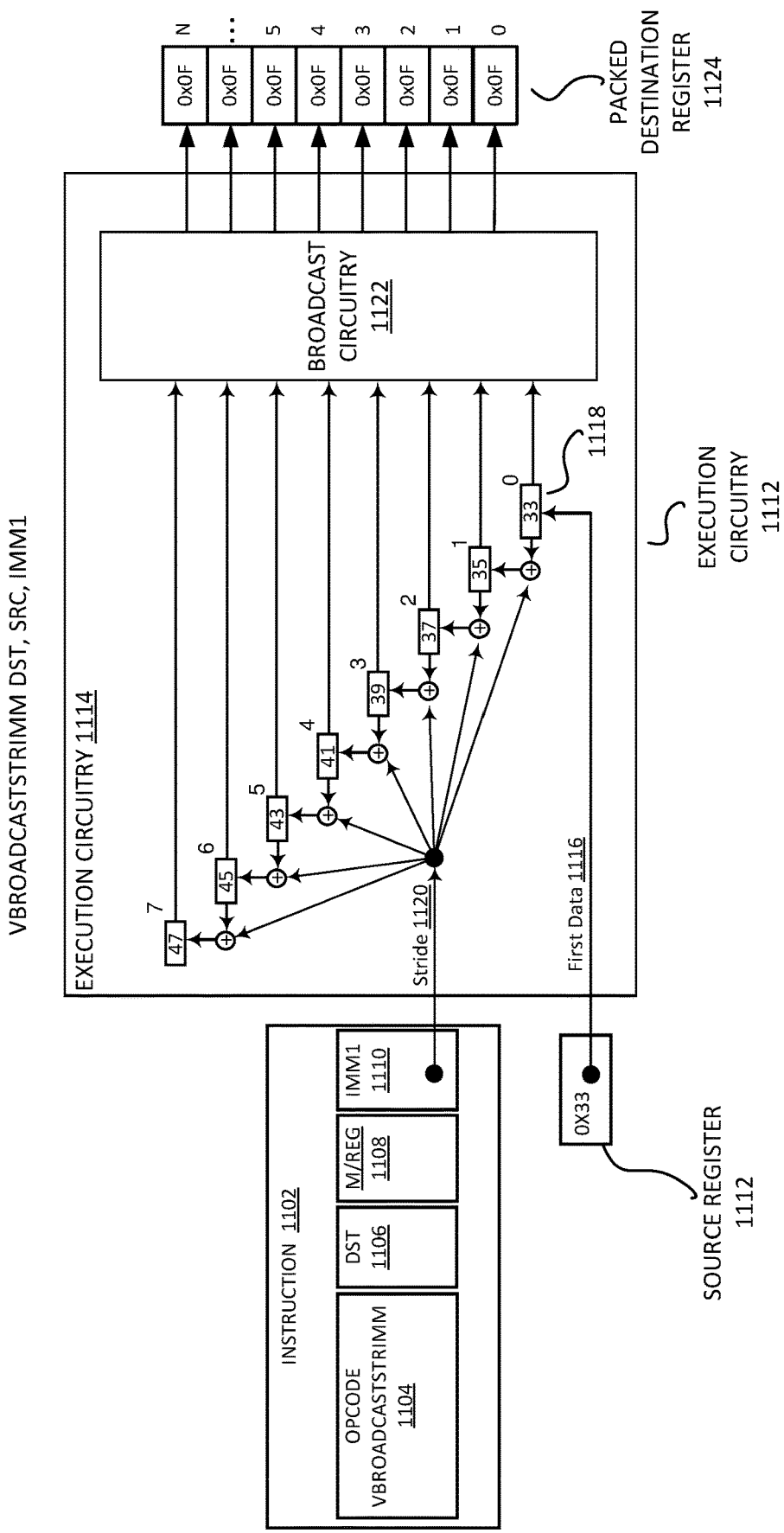
FIG. 11 illustrates an exemplary execution of an instruction having an immediate operand.

FIG. 11 illustrates an exemplary execution of the VBROADCASTSTRIMM instruction. The VBROADCASTSTRIMM instruction 1102 format includes fields for an opcode 1104 (e.g., mnemonic "VBROADCAST-STRIMM"), a destination identifier 1106 to specify the packed destination register, a source register identifier 1108, and an immediate (imm1 1110).

Execution circuit 1114, in response to an instruction having opcode 1104 equal to VBROADCASTSTRIMM, uses the contents of source register 1112 identified by the source register identifier 1108 as first data 1116 to write to the first element 1118 of a vector, and uses the immediate (imm1) 1110 as a stride 1120 that is successively added to the second and subsequent elements of the vector. The example has 0x33 stored in source register 1112; and execution circuit 1114 writes 0x33 as first data 1116 to first element 1118 of the vector. Execution circuit 1114 further successively adds the stride 1120 of 2, specified by imm1 1110, to the second and subsequent elements of the vector. Execution circuit 1114 further uses broadcast circuitry 1122 to broadcast results of the operation to packed destination register 1124.

Exemplary Hardware to Execute the VBROADCASTSTRIMM Instruction

Figure 12:
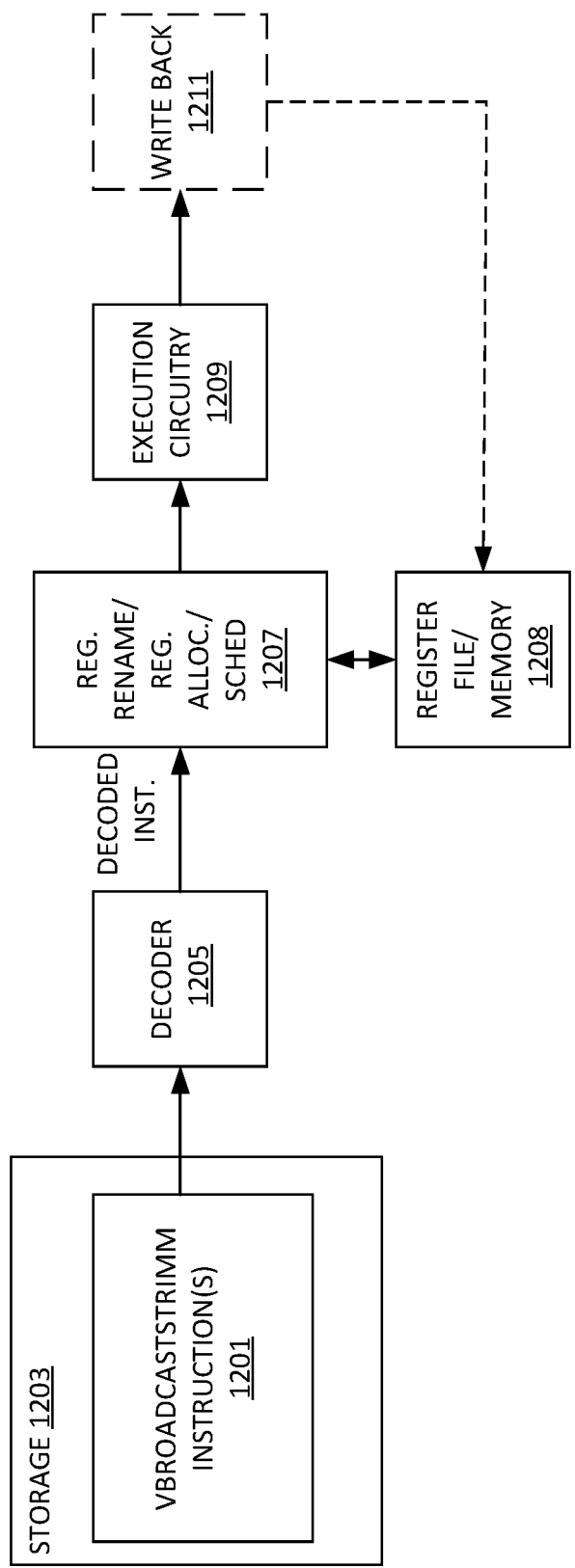
FIG. 12 illustrates an embodiment of hardware to process an instruction having an immediate operand.

FIG. 12 illustrates an embodiment of hardware to process an instruction such as an arithmetic recurrence instruction. As illustrated, storage 1203 stores a VBROADCASTSTRIMM instruction 1201 to be executed.

The instruction is received by decode circuitry 1205. For example, the decode circuitry 1205 receives this instruction from fetch logic/circuitry. TAs described above, the instruction includes fields for an opcode (e.g., mnemonic "VBROADCASTSTRIMM"), a destination identifier to specify a packed destination register, a source operand to specify a source register, and an immediate. In some embodiments, the source[s] and destination are registers, and in other embodiments one or more are memory locations. More detailed embodiments of at least one instruction format will be detailed later. The decode circuitry 1205 decodes the instruction into one or more operations. In some embodiments, this decoding includes generating a plurality of micro-operations to be performed by execution circuitry (such as execution circuitry 1209). The decode circuitry 1205 also decodes instruction prefixes (if used).

In some embodiments, register renaming, register allocation, and/or scheduling circuitry 1207 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 1208 store data as operands of the instruction to be operated on by execution circuitry. Exemplary register types include packed data registers, general purpose registers, and floating point registers.

Execution circuitry 1209 executes the decoded VBROADCASTSTRIMM instruction. An embodiment of execution circuit 1114, which is similar to 1209, was shown in FIG. 11. Write back (retirement) circuitry 1211 commits the result of the execution of the decoded VBROADCASTSTRIMM instruction.

Exemplary Formats of the VBROADCASTSTRIMM Instruction

In some embodiments, retirement/write back circuitry architecturally commits the destination register into the registers or memory and retires the instruction.

An embodiment of a format for a VBROADCASTSTRIMM instruction is OPCODE DSTREG, SRCREG, IMM1. In some embodiments, VBROADCASTSTRIMM {B/W/D/Q} is the opcode mnemonic of the instruction. SRCREG is a field to identify the source register. In some embodiments, the source register is a general purpose register. In some embodiments, the source register is an element of a packed data vector register. DSTREG is a field to identify the packed destination register operand. IMM1 is a field for an immediate to be used as a stride value.

In some embodiments, the OPCODE field is a full opcode field (such as 2974 or a real opcode field (such as 2930), the SRCREG field is a Reg filed (such as 2944), the DSTREG field is a R/M field (such as 2946), and the IMM1 field is an IMM8 field (such as 2972 in FIG. 29A).

In some embodiments, the VBROADCASTSTRIMM instruction includes a field for a write mask register operand (k) (e.g., VBROADCASTSTRIMM{k} DSTREG, SRC1, SRC2). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e., 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding write mask bit is not set; instead, the destination element value must be preserved (merging-masking) or it must be zeroed out (zeroing-masking); and 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the VBROADCASTSTRIMM Instruction

Figure 13:
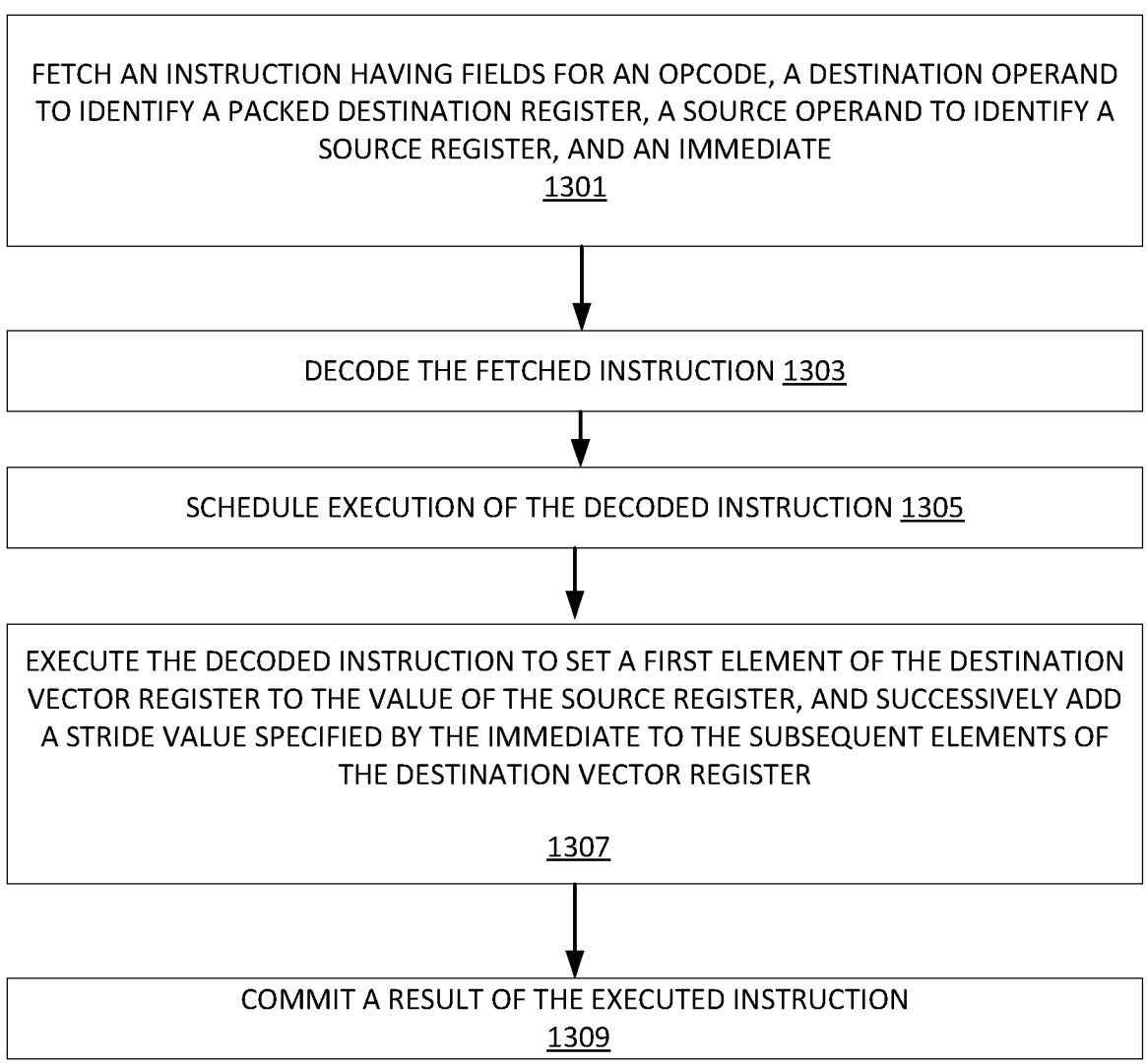
FIG. 13 illustrates an embodiment of a method performed by a processor to process an instruction having an immediate operand.

FIG. 13 illustrates an embodiment of method performed by a processor to process a VBROADCASTSTRIMM instruction. For example, the processor components of FIG. 12, a pipeline as detailed below, etc. performs this method.

At 1301, an instruction is fetched. For example, a VBROADCASTSTRIMM instruction is fetched. The VBROADCASTSTRIMM instruction includes fields for an opcode, a destination operand, a source operand, and an immediate. In some embodiments, the instruction further includes a field for a write mask. In some embodiments, the instruction is fetched from an instruction cache. The destination operand specifies a packed data vector register. The opcode of the VBROADCASTSTRIMM instruction indicates a strided broadcast to a vector register, using an immediate as the stride value.

The fetched instruction is decoded at 1303. For example, the fetched VBROADCASTSTRIMM instruction is decoded by decode circuitry such as that detailed herein.

At 1305, the decoded instruction is scheduled (as needed).

At 1307, the scheduled instruction is executed by execution circuitry (hardware) such as 1114. For the VBROAD- CASTSTRIMM instruction, the execution will cause AN execution circuit (such as 1114) to use the contents of source register 1112 as first data 1116 written to the first element 1118 of a vector, and to use the immediate (imm1 1110) as a stride 1120 that is successively added to the second and subsequent elements of the vector.

In some embodiments, the instruction is committed or retired at 1309.

Vbroadcaststrvreg Instruction

Exemplary Execution

Detailed herein are embodiments of an VBROADCASTSTRVREG instruction to improve a computer itself. In particular, the execution of the VBROADCASTSTRVREG instruction causes execution circuitry, in response to receiving the instruction, to use a first immediate to select an element of a packed source register, set a first element of a packed destination register to the selected value, and successively add a stride value specified by a second immediate to the second and subsequent elements of the packed destination register.

Figure 14:
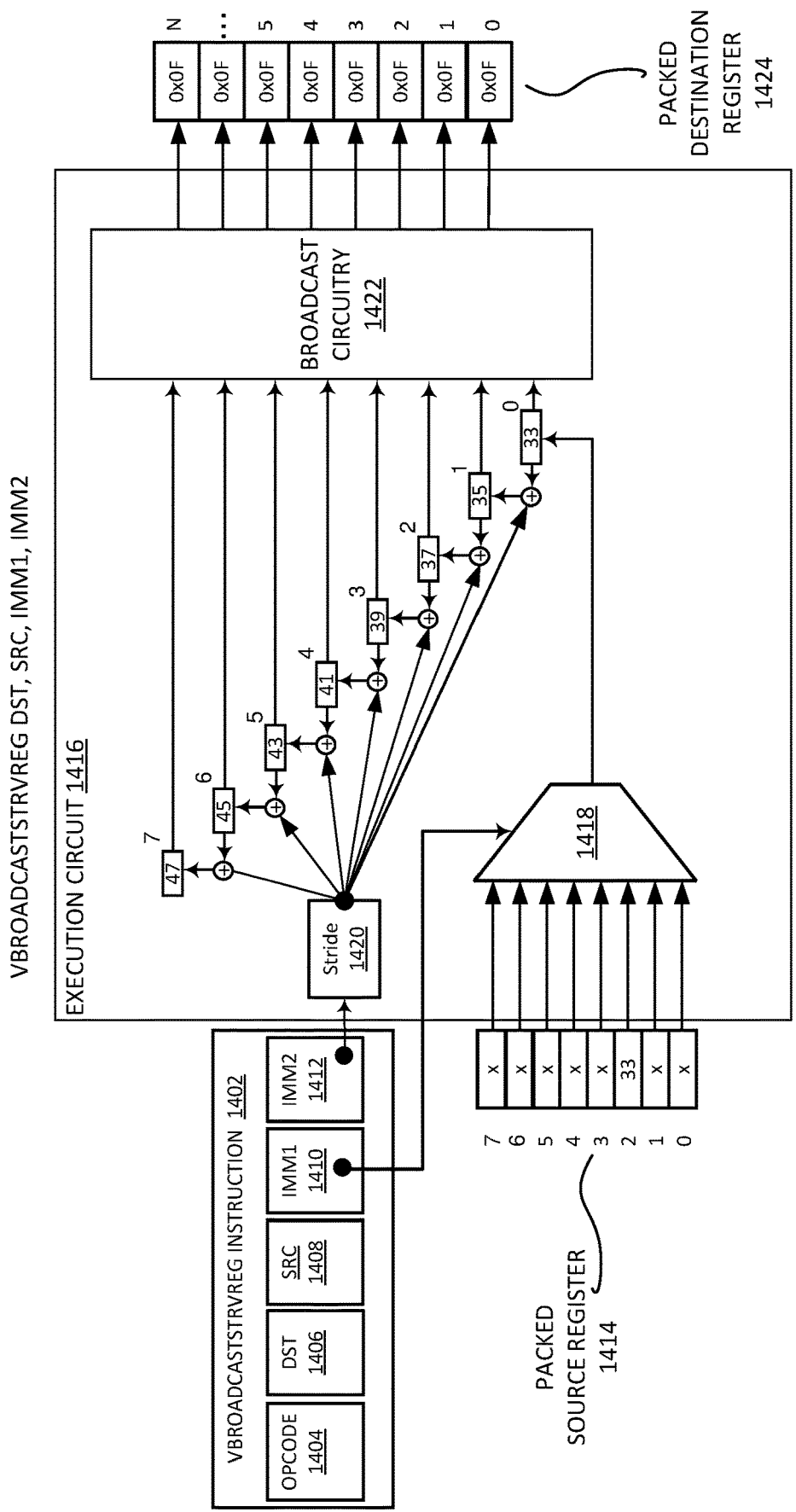
FIG. 14 illustrates an exemplary execution of an instruction having an immediate operand.

FIG. 14 illustrates an exemplary execution of a VBROADCASTSTRVREG instruction. The VBROADCASTSTRVREG instruction 1402 format includes fields for an opcode 1404 (e.g., mnemonic "VBROADCASTSTRVREG"), a destination identifier 1406 to specify a packed destination register 1424, a source identifier 1408 to specify a packed source register 1414, a first immediate (imm1 1410), and a second immediate (imm2 1412).

Execution circuit 1416, in response to an instruction having opcode 1404 equal to VBROADCASTSTRVREG, uses imm1 1410 to control a multiplexer 1418 to select an element from packed source register 1414. Execution circuit 1416 sets the first element of a vector to the value stored in the selected element. Execution circuit 1416 further successively adds a stride 1420 of 2, specified by imm2 1412, to the second and subsequent elements of the vector. Execution circuit 1416 further uses broadcast circuitry 1422 to broadcast results of the operation to packed destination register 1424.

Some vector elements of FIG. 14 are illustrated as 'x,' signifying a don't care value. They are not relevant in the discussion of the operation of this instruction.

Exemplary Hardware to Execute the VBROADCASTSTRVREG Instruction

Figure 15:
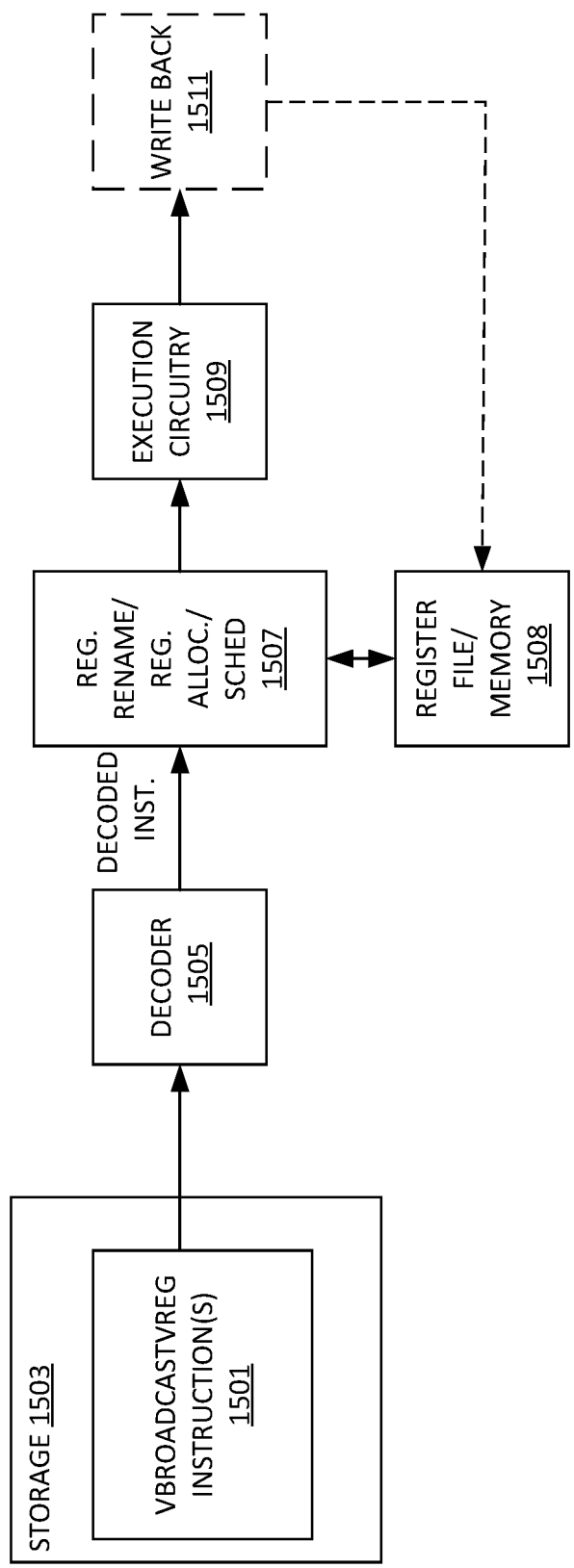
FIG. 15 illustrates an embodiment of hardware to process an instruction having an immediate operand.

FIG. 15 illustrates an embodiment of hardware to process an instruction such as an arithmetic recurrence instruction. As illustrated, storage 1503 stores a VBROADCASTSTRVREG instruction 1501 to be executed.

The instruction is received by decode circuitry 1505. For example, the decode circuitry 1505 receives this instruction from fetch logic/circuitry. The instruction 1501 includes fields for an opcode (e.g., mnemonic "VBROADCASTSTRVREG"), a destination identifier 1106 to specify a packed destination register, and an immediate. More detailed embodiments of at least one instruction format will be detailed later. The decode circuitry 1505 decodes the instruction into one or more operations. In some embodiments, this decoding includes generating a plurality of micro-operations to be performed by execution circuitry (such as execution circuit 1416 or execution circuitry 1509). The decode circuitry 1505 also decodes instruction prefixes (if used).

In some embodiments, register renaming, register allocation, and/or scheduling circuitry 1507 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 1508 store data as operands of the instruction to be operated on by execution circuitry. Exemplary register types include packed data registers, general purpose registers, and floating point registers.

Execution circuitry 1509 executes the decoded VBROADCASTSTRVREG instruction. Execution circuit 1416, which in some embodiments is similar to execution circuitry 1509, was shown in FIG. 14. Write back (retirement) circuitry 1511 commits the result of the execution of the decoded VBROADCASTSTRVREG instruction.

Exemplary Formats of the VBROADCASTSTRVREG Instruction

In some embodiments, retirement/write back circuitry architecturally commits the destination register into the registers or memory and retires the instruction.

An embodiment of a format for a VBROADCASTSTRVREG instruction is OPCODE DSTREG, SRCREG, IMM1, IMM2. In some embodiments, VBROADCASTSTRVREG {B/W/D/Q} is the opcode mnemonic of the instruction. SRCREG is a field to identify the source register. In some embodiments, the source register is a general purpose register. In some embodiments, the source register is an element of a packed data vector register. DSTREG is a field to identify the packed destination register operand. IMM1 is a field for an immediate to be used to select a data element among a plurality of elements of packed source register 1414.

In some embodiments, the OPCODE field is a full opcode field (such as 2974 or a real opcode field (such as 2930), the SRCREG field is a Reg filed (such as 2944), the DSTREG field is a R/M field (such as 2946), and the IMM1 field is an IMM8 field (such as 2972 in FIG. 29A).

In some embodiments, the VBROADCASTSTRVREG instruction includes a field for a write mask register operand (k) (e.g., VBROADCASTSTRVREG{k} DSTREG, SRC1, SRC2). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e., 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding write mask bit is not set; instead, the destination element value must be preserved (merging-masking) or it must be zeroed out (zeroing-masking); 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the VBROADCASTSTRVREG Instruction

Figure 16:
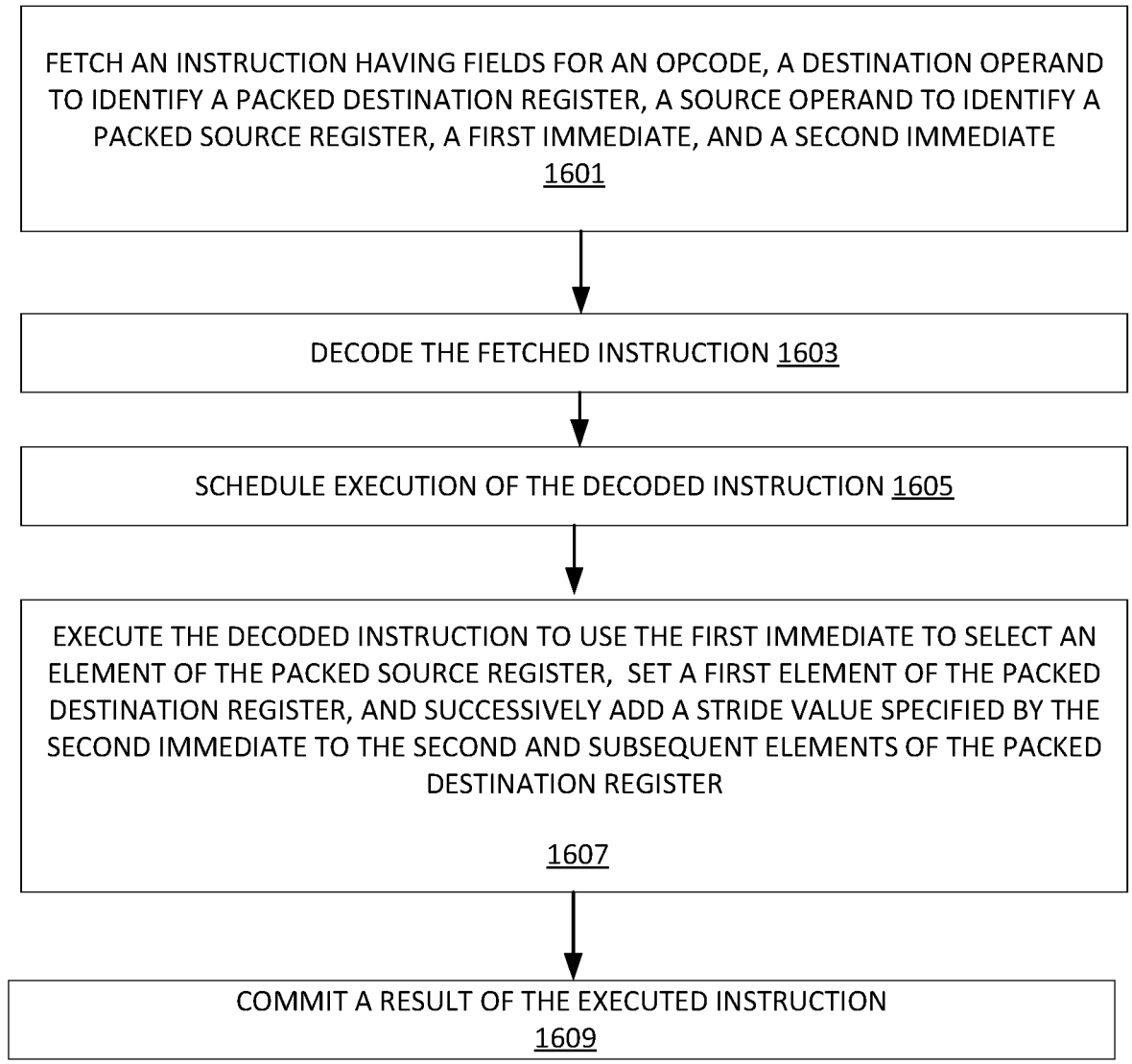
FIG. 16 illustrates an embodiment of a method performed by a processor to process an instruction having an immediate operand.

FIG. 16 illustrates an embodiment of method performed by a processor to process a VBROADCASTSTRVREG instruction. For example, the processor components of FIG. 15, a pipeline as detailed below, etc. performs this method.

At 1601, an instruction is fetched. For example, a VBROADCASTSTRVREG instruction is fetched. The VBROADCASTSTRVREG instruction includes fields for an opcode, a destination operand, a source operand, an immediate, and a second immediate. In some embodiments, the instruction further includes a field for a write mask. In some embodiments, the instruction is fetched from an instruction cache. The destination operand specifies a packed data vector register. The opcode of the VBROADCASTSTRVREG instruction indicates a strided broadcast to a vector register, using an immediate as the stride value.

The fetched instruction is decoded at 1603. For example, the fetched VBROADCASTSTRVREG instruction is decoded by decode circuitry such as that detailed herein.

At 1605, the decoded instruction is scheduled (as needed).

At 1607, the scheduled instruction is executed by execution circuitry (hardware) such as execution circuit 1416. For the VBROADCASTSTRVREG instruction, the execution causes an execution circuit to use the contents of packed source register (such as 1414) as first data \written to the first element of a vector, and to use the second immediate (imm2) as a stride 1420 that is successively added to the second and subsequent elements of the vector.

In some embodiments, the instruction is committed or retired at 1609.

VBROADCASTSTRIMMMSKED Instruction

Exemplary Execution

Detailed herein are embodiments of an VBROADCASTSTRIMMMSKED instruction to improve a computer itself. In particular, the execution of the VBROADCASTSTRIMMMSKED instruction causes execution circuitry to use a first immediate to set a first unmasked element of a packed destination register, and successively add a stride value specified by a second immediate to the second and subsequent elements of the packed destination register.

Figure 17:
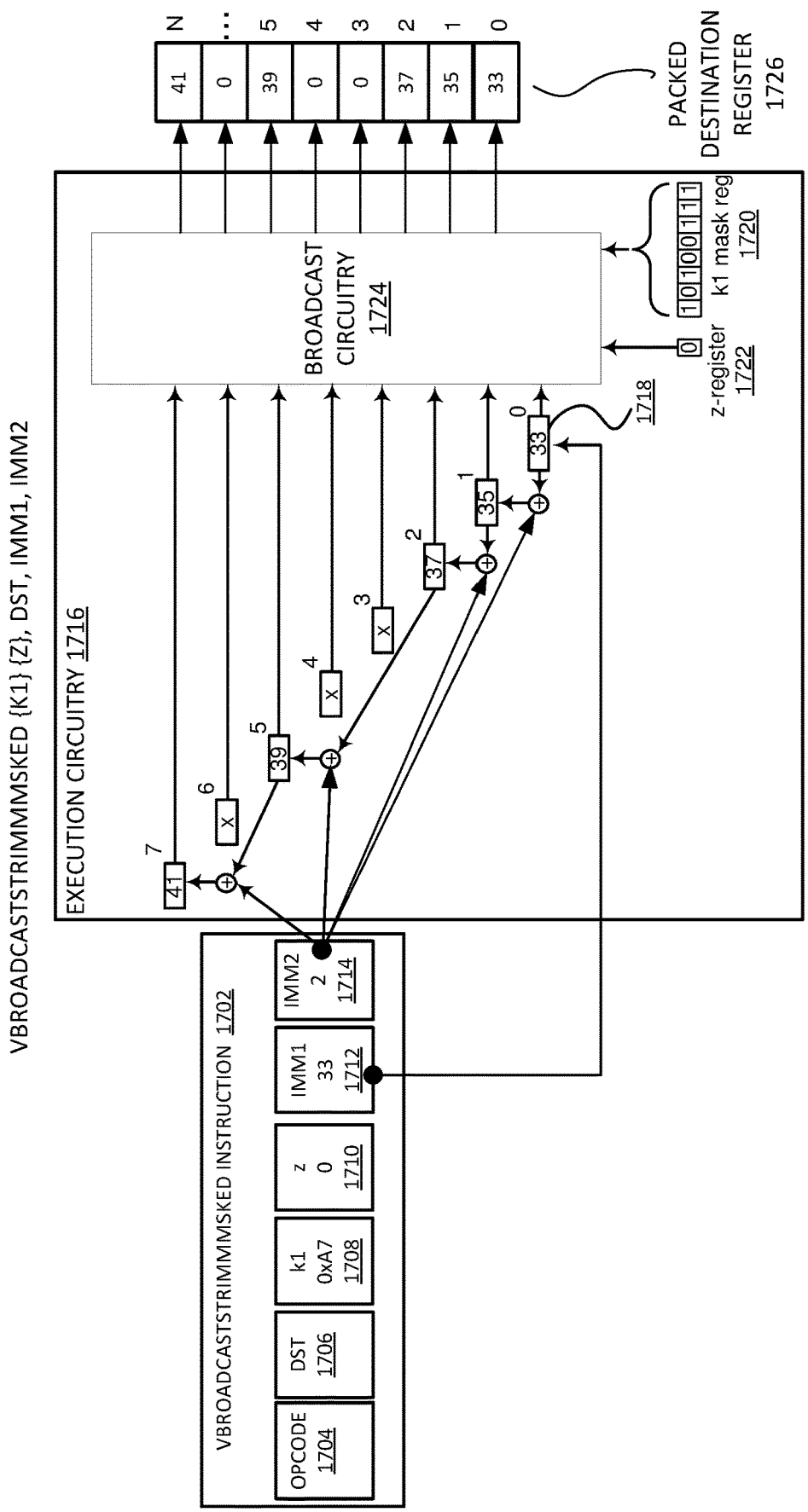
FIG. 17 illustrates an exemplary execution of an instruction having an immediate operand.

FIG. 17 illustrates an exemplary execution of a VBROADCASTSTRIMMMSKED instruction. The VBROADCASTSTRIMMMSKED instruction includes fields including OPCODE {k1} {Z}, DST, IMM1, and IMM2. k1 is a write mask to specify whether elements of the packed destination register are masked or unmasked. Masked element control field z specifies whether to zero masked data elements, or allow them to retain their previous values. In some embodiments, VBROADCASTSTRIMMMSKED {B/W/D/Q} is the opcode mnemonic of the instruction, in which DST is a field to identify the packed destination register operand, k1 identifies k1 mask register 1720. The instruction further includes masked element control field z 1710, a first immediate (imm1) 1712, and a second immediate (imm2) 1714. IMM1 is a field used as a first unmasked data element of an immediate vector. IMM2 is a field for an immediate used to define a stride value to be successively added to the second and subsequent elements of the intermediate vector.

Execution circuitry 1716, in response to an instruction having opcode 1704 equal to VBROADCASTSTRIMMMSKED, uses k1 write mask identifier 1708 to identify k1 mask register 1720, uses k1 mask register 1720 to identify unmasked elements of the packed destination register 1726 and unmasked elements of the intermediate vector formed by the execution circuitry 1716, uses the masked element control field z 1710 to set z-register 1722, sets the first unmasked element 1718 of the intermediate vector to the value of imm1 1712, and successively adds the value of imm2 1714 as a stride value to the second and subsequent unmasked data elements of the intermediate vector. Execution circuitry 1716 uses broadcast circuitry 1724 to write the intermediate vector to the packed destination register 1726.

The example has 33 as imm1 1712, which is written to the first unmasked element 1718 of the intermediate vector. Execution circuitry, 1716, further successively adds the stride value, 2, specified by IMM2 1714, to the second and subsequent elements. Execution circuitry, 1716, further uses broadcast circuitry 1724 to broadcast the intermediate vector to the packed destination register 1726.

Exemplary Hardware to Execute the VBROADCAST-STRIMMMSKED Instruction

Figure 18:
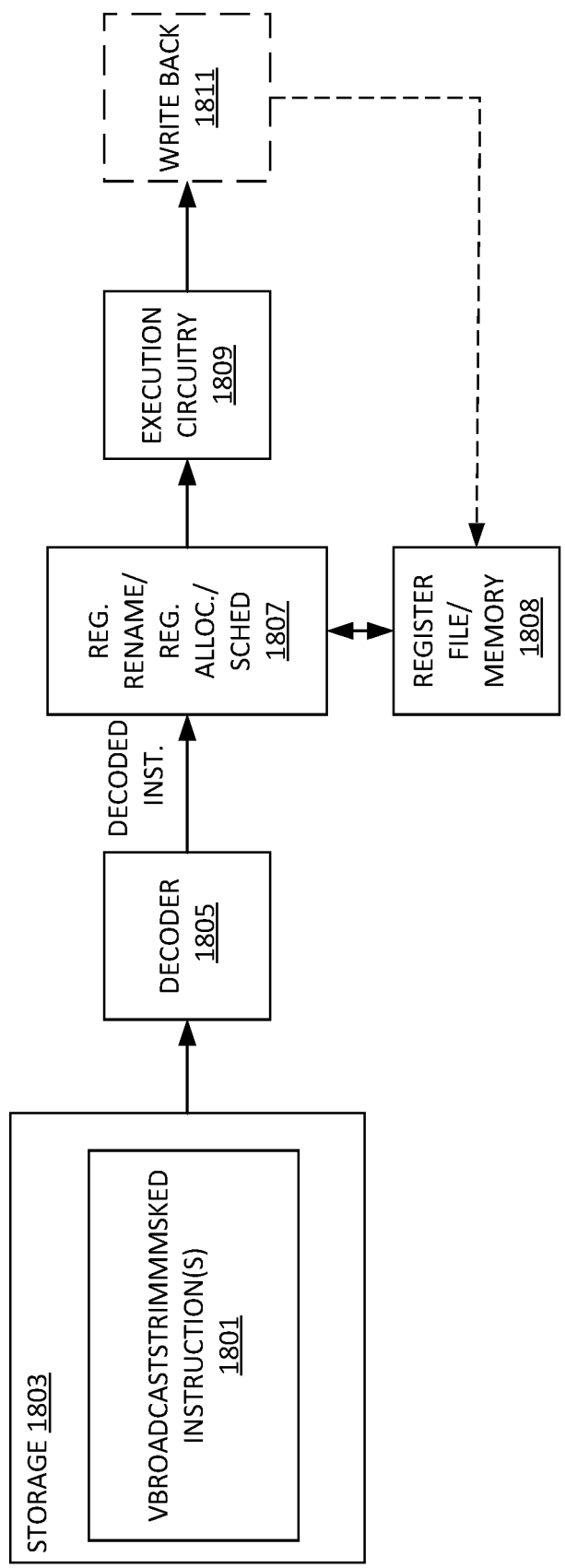
FIG. 18 illustrates an embodiment of hardware to process an instruction having an immediate operand.

FIG. 18 illustrates an embodiment of hardware to process an instruction such as an arithmetic recurrence instruction. As illustrated, storage 1803 stores a VBROADCAST-STRIMMMSKED instruction 1801 to be executed.

The instruction is received by decode circuitry 1805. For example, the decode circuitry 1805 receives this instruction from fetch logic/circuitry. The instruction 1801 includes fields for an opcode (e.g., mnemonic "VBROADCAST-STRIMMMSKED"), a destination identifier 1106 to specify a packed destination register, a write mask, a masked element control field, a first immediate and a second immediate. In some embodiments, the source[s] and destination are registers, and in other embodiments one or more are memory locations. More detailed embodiments of at least one instruction format will be detailed later. The decode circuitry 1805 decodes the instruction into one or more operations. In some embodiments, this decoding includes generating a plurality of micro-operations to be performed by execution circuitry (such as execution circuitry 1809 or 1716). The decode circuitry 1805 also decodes instruction prefixes (if used).

In some embodiments, register renaming, register allocation, and/or scheduling circuitry 1807 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 1808 store data as operands of the instruction to be operated on by execution circuitry. Exemplary register types include packed data registers, general purpose registers, and floating point registers.

Execution circuitry 1809 executes the decoded VBROADCASTSTRIMMMSKED instruction. Execution circuitry 1716 was shown in FIG. 17. The execution of the decoded VBROADCASTSTRIMMMSKED instruction uses the first immediate (imm1) to set a first unmasked element of the packed destination register, and successively adds a stride value specified by the second immediate imm2 to the second and subsequent unmasked elements of the packed destination register. In an embodiment, the masked element control field z, when equal to zero, as here, causes execution of this instruction to zero masked destination vector elements, and when equal to 1, causes execution of this instruction to allow masked destination vector elements to retain their previous values. Write back (retirement) circuitry 1811 commits the result of the execution of the decoded VBROADCASTSTRIMMMSKED instruction.

Exemplary Formats of the VBROADCAST-STRIMMMSKED Instruction

In some embodiments, retirement/write back circuitry architecturally commits the destination register into the registers or memory and retires the instruction.

An embodiment of a format for a VBROADCAST-STRIMMMSKED instruction is OPCODE {k1} {Z}, DST, IMM1, IMM2. k1 is a write mask to specify whether elements of the packed destination register are masked or unmasked. Masked element control field z specifies whether to zero masked data elements, or allow them to retain their previous values. In some embodiments, VBROADCAST-STRIMMMSKED {B/W/D/Q} is the opcode mnemonic of the instruction, in which DST is a field to identify the destination write mask register operand, k1 is a k1 write mask identifier 1708. The instruction further includes masked element control field z 1710, a first immediate (imm1) 1712, and a second immediate (imm2) 1714. IMM1 is a field used as a first unmasked element 1718 of an immediate vector. IMM2 is a field for an immediate used to define a stride value, here that value is 2, to be successively added to the second and subsequent elements of the intermediate vector. Execution circuitry 1716 in some embodiments uses broadcast circuitry 1724 to broadcast the intermediate vector to the packed destination register 1726.

In some embodiments, the OPCODE field is a full opcode field (such as 2974 or a real opcode field (such as 2930), the DSTREG field is a R/M field (such as 2946), the IMM1 field is an IMM8 field (such as 2972 in FIG. 29A), and the IMM2 field is a vvvv field (such as 2920 in FIG. 29A).

In some embodiments, the VBROADCAST-STRIMMMSKED instruction includes a field for a write mask register operand (k) (e.g., VBROADCASTSTRIMMMSKED{k} DSTREG, SRC1, SRC2). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e., 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding write mask bit is not set; instead, the destination element value must be preserved (merging-masking) or it must be zeroed out (zeroing-masking); and 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the VBROADCASTSTRIMMMSKED Instruction

Figure 19:
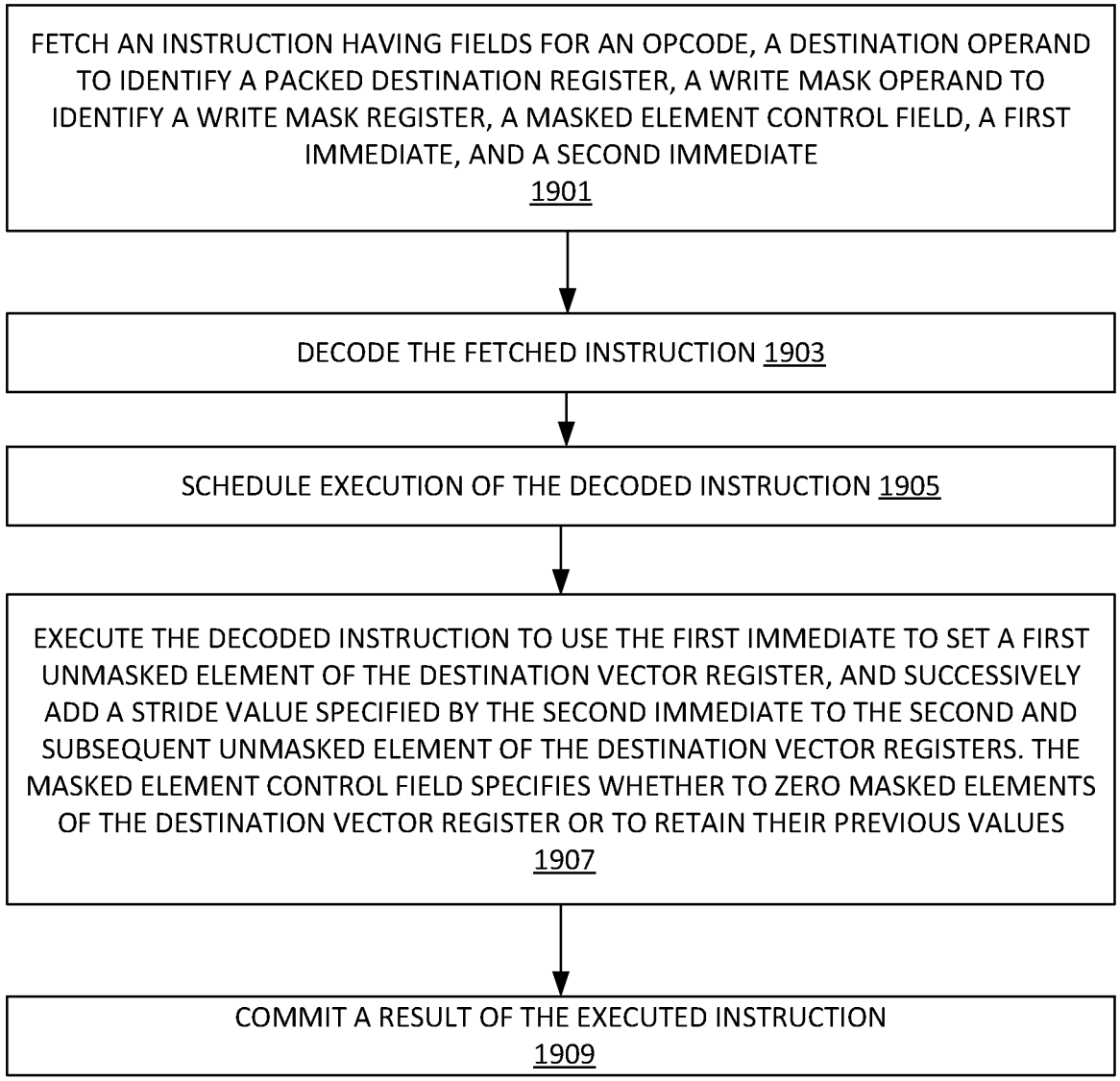
FIG. 19 illustrates an embodiment of a method performed by a processor to process an instruction having an immediate operand.

FIG. 19 illustrates an embodiment of method performed by a processor to process a VBROADCASTSTRIMMMSKED instruction. For example, the processor components of FIG. 18, a pipeline as detailed below, etc. performs this method.

At 1901, an instruction is fetched. For example, a VBROADCASTSTRIMMMSKED instruction is fetched. The VBROADCASTSTRIMMMSKED instruction includes fields for an opcode, a DST field to identify a packed destination register operand, a source write mask operand to identify unmasked elements of the packed destination register, a masked element control field to specify whether to zero masked elements, or allow them to retain their previous values, a first immediate, and a second immediate. In some embodiments, the instruction is fetched from an instruction cache. The destination operand specifies a packed data vector register. The opcode of the VBROADCASTSTRIMMMSKED instruction indicates a vector register element is BROADCASTed under a write mask with an immediate used as a stride value.

In some embodiments, the instruction is fetched from an instruction cache.

The fetched instruction is decoded at 1903. For example, the fetched VBROADCASTSTRIMMMSKED instruction is decoded by decode circuitry such as that detailed herein.

At 1905. the scheduled instruction is scheduled (as needed).

At 1907, the decoded instruction is executed by execution circuitry (hardware) such as 1716. For the VBROADCASTSTRIMMMSKED instruction, the execution uses the k1 write mask identifier 1708 to identify k1 mask register 1720, uses k1 mask register 1720 to identify unmasked elements of the packed destination register 1726 and unmasked elements of an intermediate vector formed by the execution circuitry 1716. Execution circuitry 1716 sets the first unmasked element 1718 of the intermediate vector to the value of imm1 1712, and successively adds the value of imm2 1712, which is two, as a stride value to the second and subsequent data elements of the intermediate vector. Execution circuitry 1716 uses broadcast circuitry 1724 to write the intermediate vector to the packed destination register 1726.

In some embodiments, the instruction is committed or retired at 1909.

KBROADCASTIMM2MSK Instruction

Exemplary Execution

Detailed herein are embodiments of an KBROADCASTIMM2MSK instruction to improve a computer itself. In particular, the execution of the KBROADCASTIMM2MSK instruction causes execution circuitry to logically partition a destination mask register into equal-sized partitions having the same size as an immediate, to use a write mask register to identify unmasked logical partitions of the destination write mask register, and to broadcast the immediate to the unmasked logical partitions.

Figure 20:
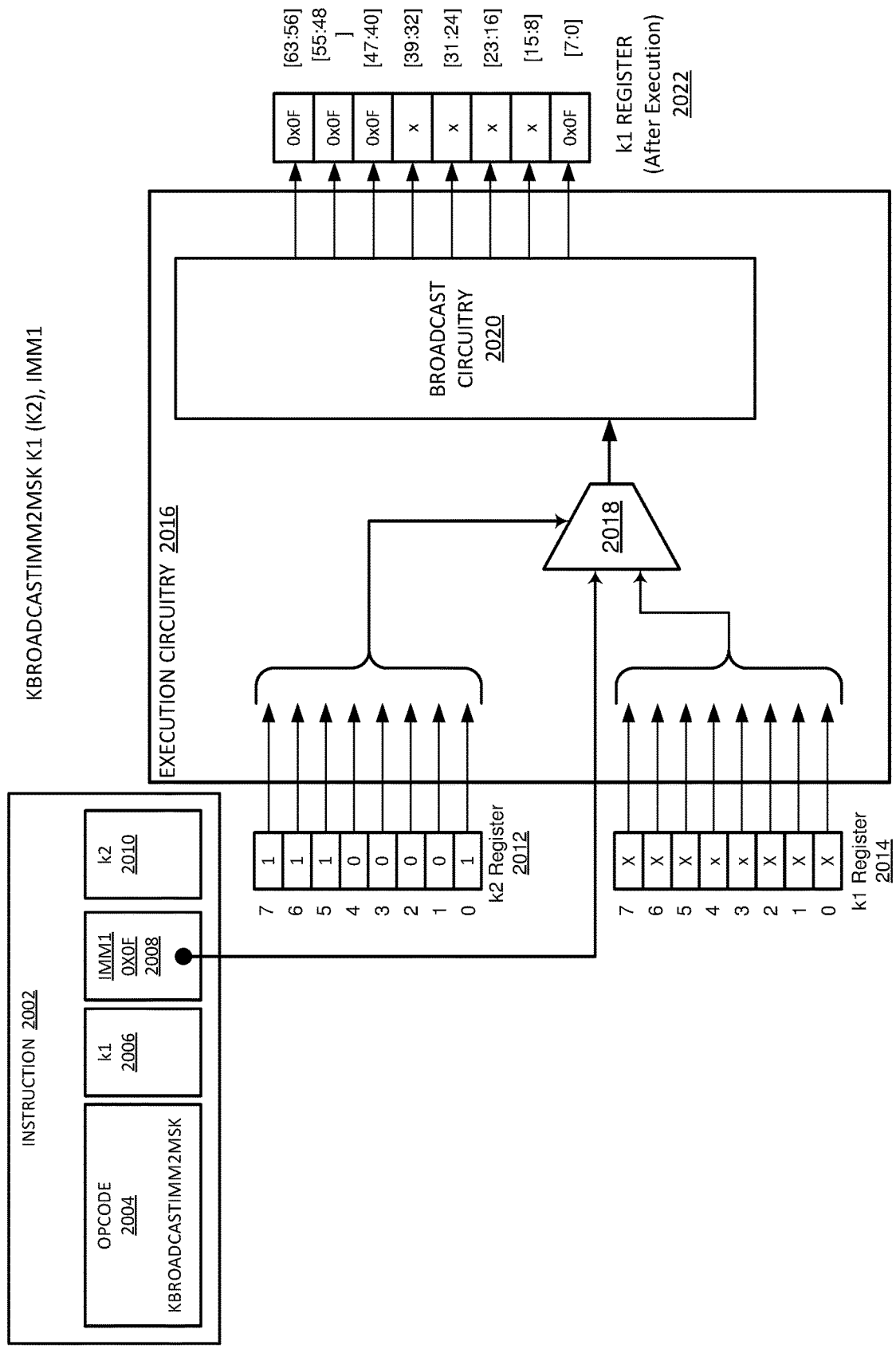
FIG. 20 illustrates an exemplary execution of an instruction having an immediate operand.

FIG. 20 illustrates an exemplary execution of a KBROADCASTIMM2MSK instruction. The KBROADCASTIMM2MSK instruction 2002 format includes fields for an opcode 2004 (e.g., mnemonic "KBROADCASTIMM2MSK"), a destination write mask register (k1) 2006, a source write mask register (k2) 2010, and an immediate (imm1 2008).

Execution circuitry 2016, in response to an instruction having opcode 2004 equal to KBROADCASTIMM2MSK, logically partitions the destination mask register (k1) into equal-sized partitions having the same size as the immediate, uses source write mask register (k2) to identify unmasked logical partitions of the destination write mask register (k1), the source write mask register being used to control multiplexer 2018 to select between the immediate (for unmasked elements (and the previous value (for masked elements). Execution circuitry 2016 further feeds the output of multiplexer 2018 to broadcast circuitry 2020, which in turn writes to the destination mask register k1.

Some vector elements of FIG. 20 are illustrated as 'x,' signifying a don't care value. They are not relevant in the discussion of the operation of this instruction.

Exemplary Hardware to Execute the KBROADCASTIMM2MSK Instruction

Figure 21:
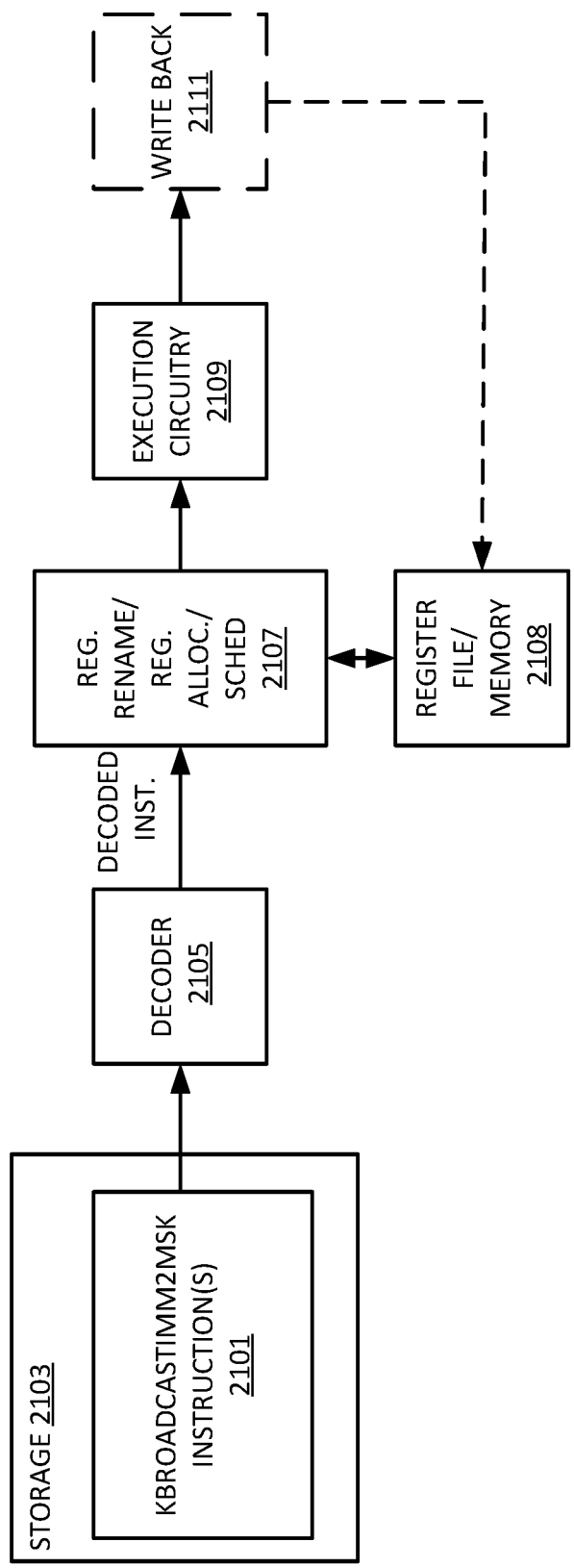
FIG. 21 illustrates an embodiment of hardware to process an instruction having an immediate operand.

FIG. 21 illustrates an embodiment of hardware to process an instruction such as an arithmetic recurrence instruction. As illustrated, storage 2103 stores a KBROADCASTIMM2MSK instruction 2101 to be executed.

The instruction is received by decode circuitry 2105. For example, the decode circuitry 2105 receives this instruction from fetch logic/circuitry. The instruction 2101 includes fields for an opcode (e.g., mnemonic "KBROADCASTIMM2MSK"), a destination identifier 1106 to specify a packed destination register, and an immediate. In some embodiments, the source[s] and destination are registers, and in other embodiments one or more are memory locations. More detailed embodiments of at least one instruction format will be detailed later. The decode circuitry 2105 decodes the instruction into one or more operations. In some embodiments, this decoding includes generating a plurality of micro-operations to be performed by execution circuitry (such as execution circuitry 2109 or 2016). The decode circuitry 2105 also decodes instruction prefixes (if used).

In some embodiments, register renaming, register allocation, and/or scheduling circuitry 2107 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 2108 store data as operands of the instruction to be operated on by execution circuitry. Exemplary register types include packed data registers, general purpose registers, and floating point registers.

Execution circuitry 2109 executes the decoded KBROADCASTIMM2MSK instruction. An embodiment of execution circuitry 2016, which is similar to execution circuitry 2109, was shown in FIG. 20. Write back (retirement) circuitry 2111 commits the result of the execution of the decoded KBROADCASTIMM2MSK instruction.

Exemplary Formats of the KBROADCASTIMM2MSK Instruction

In some embodiments, retirement/write back circuitry architecturally commits the destination register into the registers or memory and retires the instruction.

An embodiment of a format for a KBROADCASTIMM2MSK instruction is OPCODE DSTMASKREG, SRCMASKREG, IMM1. In some embodiments, KBROADCASTIMM2MSK {B/W/D/Q} is the opcode mnemonic of the instruction, wherein the size parameter {B/W/D/Q} specifies the size of the immediate. SRCREG is a field to identify a write mask (such as k2) to select which of the immediate and previous value to broadcast to the destination mask register 2022.

In some embodiments, the OPCODE field is a full opcode field (such as 2974 or a real opcode field (such as 2930), the SRCREG field is a Reg filed (such as 2944), the DSTREG field is a R/M field (such as 2946), and the IMM1 field is an IMM8 field (such as 2972 in FIG. 29A).

In some embodiments, the KBROADCASTIMM2MSK instruction includes a field for a write mask register operand (k) (e.g., KBROADCASTIMM2MSK{k} DSTREG, SRC1, SRC2). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e., 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding write mask bit is not set; instead, the destination element value must be preserved (merging-masking) or it must be zeroed out (zeroing-masking); and 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the KBROADCASTIMM2MSK Instruction

Figure 22:
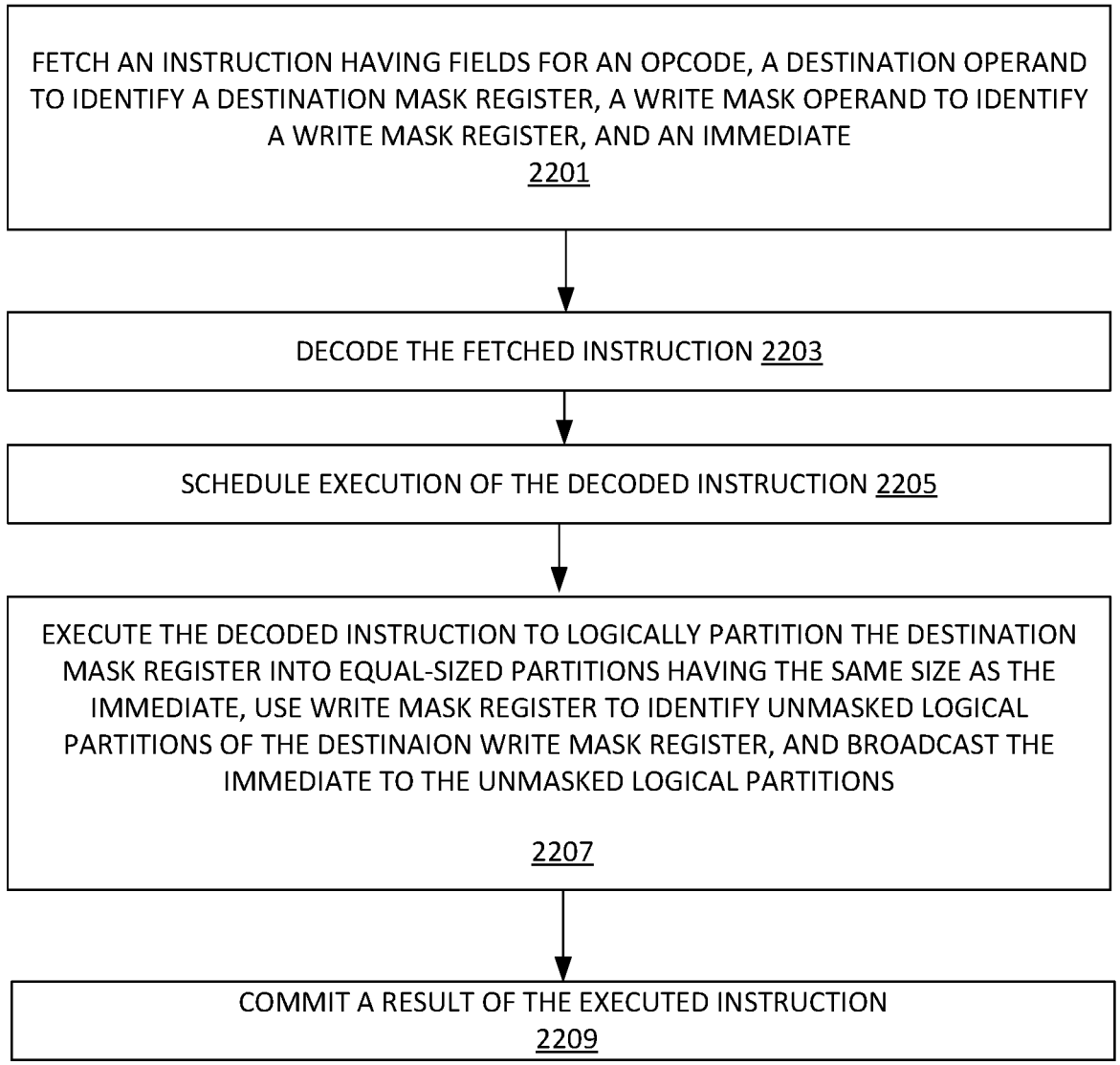
FIG. 22 illustrates an embodiment of a method performed by a processor to process an instruction having an immediate operand.

FIG. 22 illustrates an embodiment of method performed by a processor to process a KBROADCASTIMM2MSK instruction. For example, the processor components of FIG. 21, a pipeline as detailed below, etc. performs this method.

At 2201, an instruction is fetched. For example, a KBROADCASTIMM2MSK instruction is fetched. The KBROADCASTIMM2MSK instruction includes fields for an opcode, a destination write mask operand, a source operand, and an immediate. In some embodiments, the instruction further includes a field for a write mask. In some embodiments, the instruction is fetched from an instruction cache. The destination operand specifies a write mask register. The opcode of the KBROADCASTIMM2MSK instruction indicates an immediate is broadcasted to a mask register.

The fetched instruction is decoded at 2203. For example, the fetched KBROADCASTIMM2MSK instruction is decoded by decode circuitry such as that detailed herein.

At 2205, the decoded instruction is scheduled (as needed).

At 2207, the scheduled instruction is executed by execution circuitry (hardware) such as 2016. For the KBROADCASTIMM2MSK instruction, the execution will cause execution circuitry (such as 2016) to logically partition write mask register k1 into equal-sized logical partitions having the same size as imm1, use write mask register k2 to identify unmasked partitions of destination write mask register k1, and broadcast imm1 to the unmasked partitions.

In some embodiments, the instruction is committed or retired at 2209.

Kxorkregimm Instruction

Exemplary Execution

Figure 23:
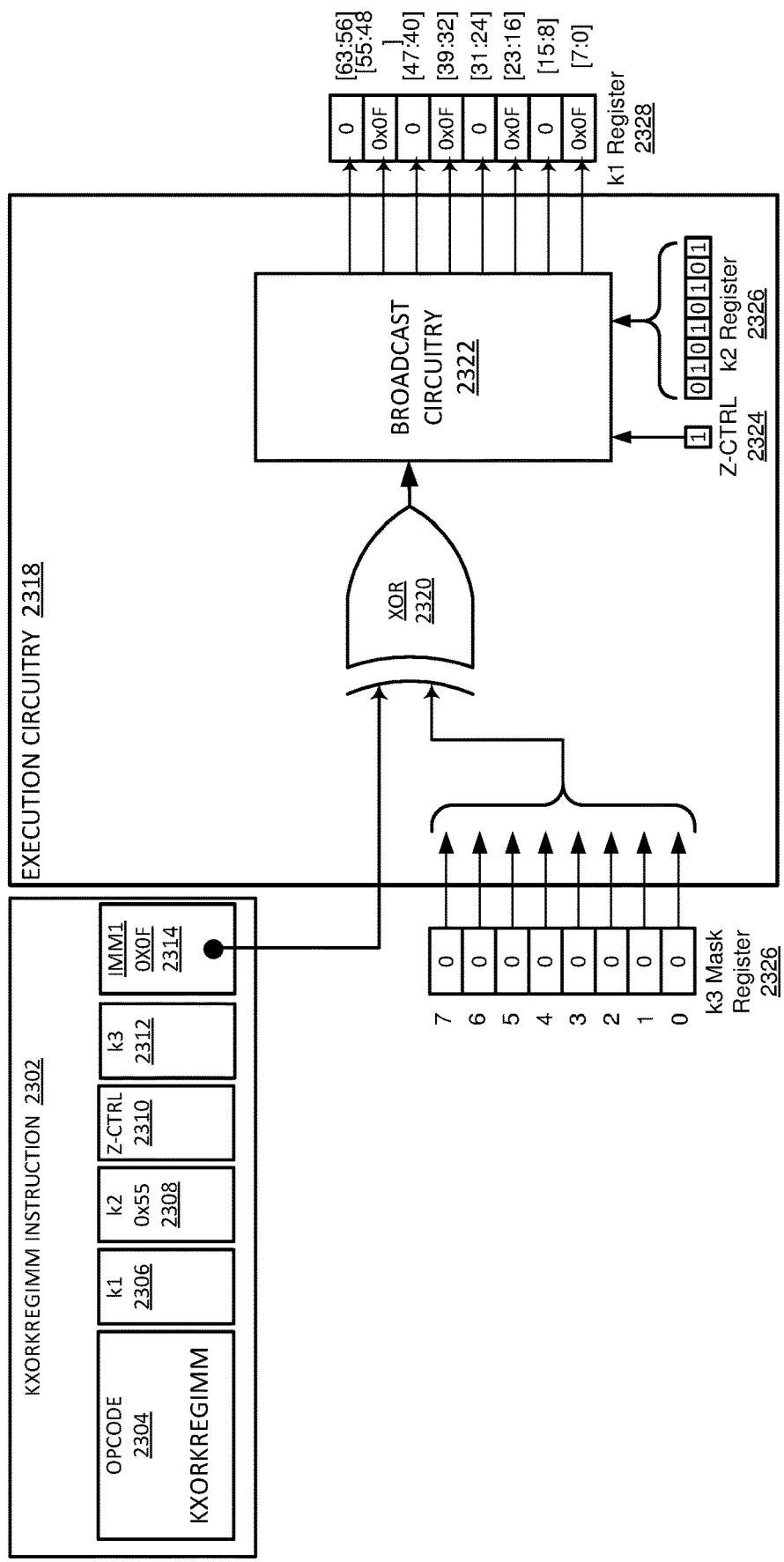
FIG. 23 illustrates an exemplary execution of an instruction having an immediate operand.

Detailed herein are embodiments of an KXORKREGIMM instruction to improve a computer itself. In particular, the execution of the KXORKREGIMM instruction yields an advantage of allowing an immediate value to be used in an instruction, rather than requiring the value to be stored in a register FIG. 23 illustrates an exemplary execution of a KXORKREGIMM instruction. The KXORKREGIMM instruction 2302 format includes fields for an opcode 2304 (e.g., mnemonic "KXORKREGIMM"), a destination write mask register (k1 2306), a source write mask register (k2) 2308, a second source write mask register (k3) 2310, a masked element control field (z 2312), and an immediate (imm1 2314).

Execution circuitry 2318, in response to an instruction having opcode 2304 equal to KXORKREGIMM, logically partitions the destination write mask register (k1 2328) into equal-sized partitions having the same size as the immediate (imm1 2314), uses source write mask register (k2) to identify unmasked logical partitions of the destination write mask register (k1 2328), performs a bitwise XOR on the source write mask register k3 2326 and the immediate (imm1 2314) using XOR gate 2320. Execution circuitry 2318 further feeds the output of XOR gate 2320 to broadcast circuitry 2322, which in turn broadcasts the XOR result to unmasked logical partitions of the destination mask register k1. For masked logical partitions, the execution circuitry 2318 zeroes the logical partition in the destination write mask register 2328 when the masked element control field indicates that masked elements should be zeroed.

Exemplary Hardware to Execute the KXORKREGIMM Instruction

Figure 24:
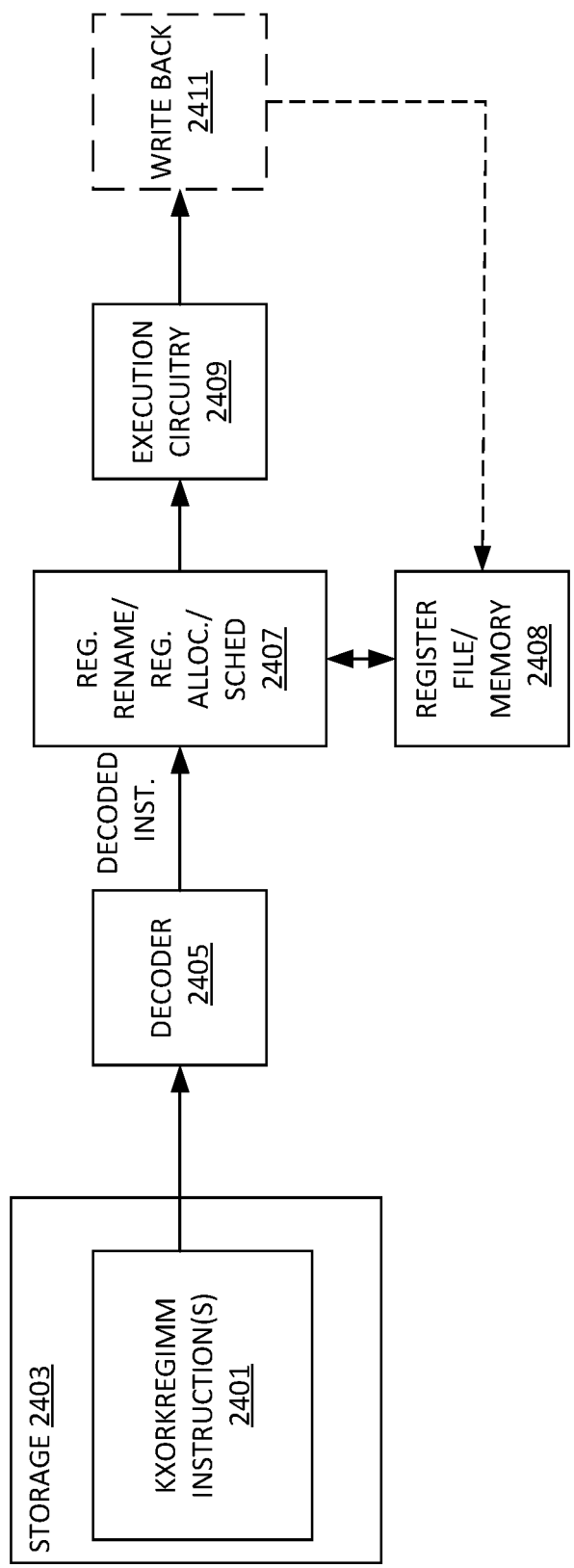
FIG. 24 illustrates an embodiment of hardware to process an instruction having an immediate operand.

FIG. 24 illustrates an embodiment of hardware to process an instruction such as an arithmetic recurrence instruction. As illustrated, storage 2403 stores a KXORKREGIMM instruction 2401 to be executed.

The instruction is received by decode circuitry 2405. For example, the decode circuitry 2405 receives this instruction from fetch logic/circuitry. The instruction 2401 includes fields for an opcode (e.g., mnemonic "KXORKREGIMM"), a destination identifier 1106 to specify a packed destination register, and an immediate. In some embodiments, the source[s] and destination are registers, and in other embodiments one or more are memory locations. More detailed embodiments of at least one instruction format will be detailed later. The decode circuitry 2405 decodes the instruction into one or more operations. In some embodiments, this decoding includes generating a plurality of micro-operations to be performed by execution circuitry (such as execution circuitry 2409 or 2318). The decode circuitry 2405 also decodes instruction prefixes (if used).

In some embodiments, register renaming, register allocation, and/or scheduling circuitry 2407 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 2408 store data as operands of the instruction to be operated on by execution circuitry. Exemplary register types include packed data registers, general purpose registers, and floating point registers.

Execution circuitry 2409 executes the decoded KXORKREGIMM instruction. Execution circuitry 2318 was shown in FIG. 23. The execution of the decoded KXORKREGIMM instruction logically partitions the destination write mask register into equal-sized partitions having the same size as the immediate 2314 and uses the source write mask register k2 2308, 2326 to identify partitions that are unmasked. The execution further performs a bitwise XOR of the immediate second source write mask register k3 2310. The execution further forwards results of the XOR gate 2320 to the broadcast circuitry 2322k, which in turn writes the results to unmasked partitions of the destination register k3 write back (retirement) circuitry 2411 commits the result of the execution of the decoded KXORKREGIMM instruction.

Exemplary Formats of the KXORKREGIMM Instruction

In some embodiments, retirement/write back circuitry architecturally commits the destination register into the registers or memory and retires the instruction.

An embodiment of a format for a KXORKREGIMM instruction 2302 (FIG. 23) is OPCODE (Such as opcode 2304). DSTMASKREG (such as k1 2306), WRITEMASK (Such as k2 2308), masked element control field (such as Z-CTRL 2310), SRCMASKREG (such as k3 2312), and IMM1 (such as IMM1 2314). In some embodiments, KXORKREGIMM {B/W/D/Q} is the opcode mnemonic of the instruction, wherein the size parameter {B/W/D/Q} specifies the size of the immediate. K2 2308 identifies a write mask register (such as k2 mask register 2326) to select which of the immediate and previous value to broadcast to the destination write mask register 2328.

In some embodiments, the OPCODE field is a full opcode field (such as 2974 or a real opcode field (such as 2930), the SRCMASKREG field is a Reg field (such as 2944), the DSTMASKREG field is a R/M field (such as 2946), and the IMM1 field is an IMM8 field (such as 2972 in FIG. 29A).

In some embodiments, the KXORKREGIMM instruction includes a field for a write mask register operand (k) (e.g., KXORKREGIMM{k} DSTREG, SRC1, SRC2). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e., 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding write mask bit is not set; instead, the destination element value must be preserved (merging-masking) or it must be zeroed out (zeroing-masking); and 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the KXORKREGIMM Instruction

Figure 25:
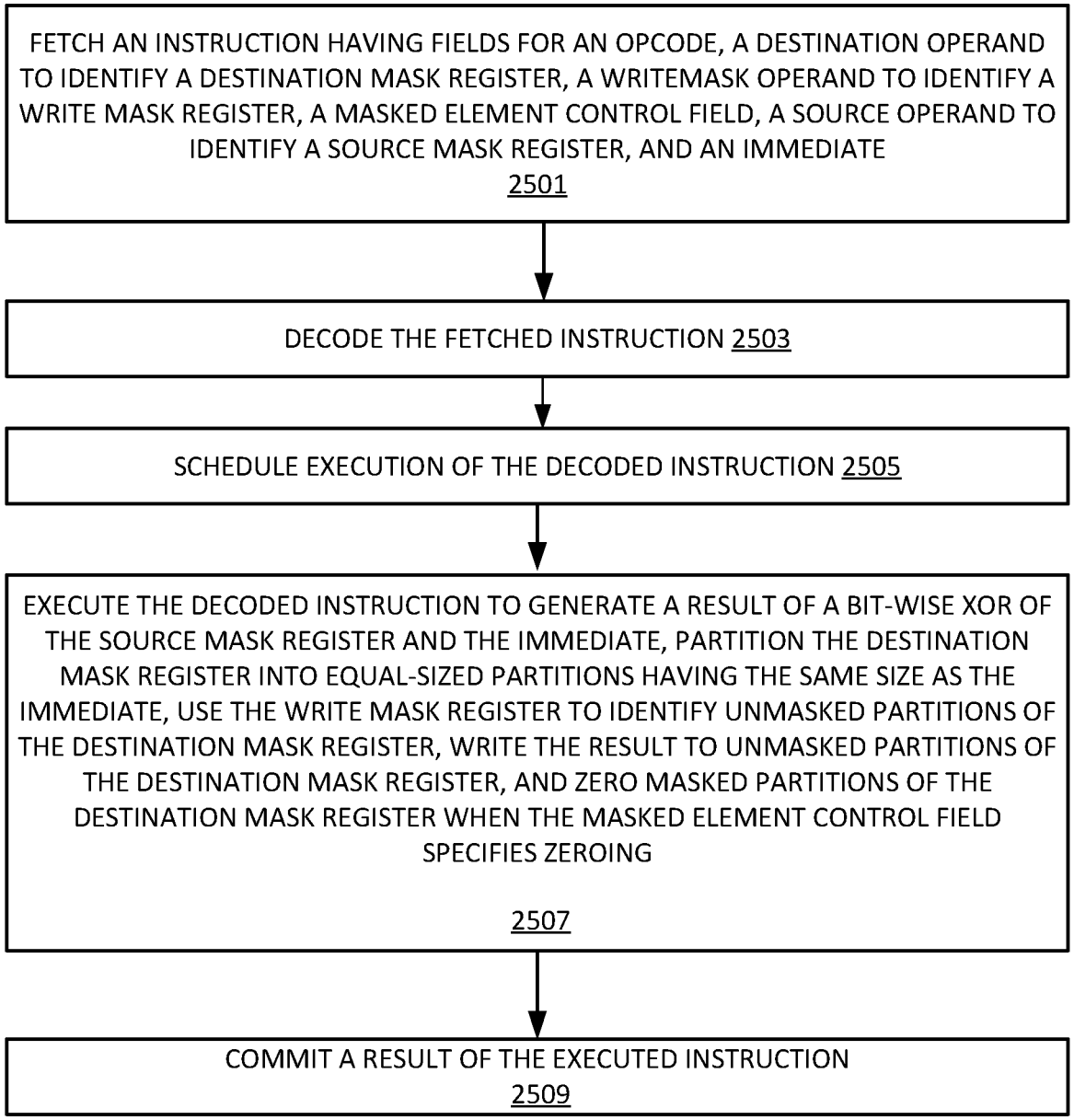
FIG. 25 illustrates an embodiment of a method performed by a processor to process an instruction having an immediate operand.

FIG. 25 illustrates an embodiment of method performed by a processor to process a KXORKREGIMM instruction. For example, the processor components of FIG. 24, a pipeline as detailed below, etc. performs this method.

At 2501, an instruction is fetched. For example, a KXORKREGIMM instruction is fetched. The KXORKREGIMM instruction includes fields for an opcode, a destination operand, a write mask identifier, a masked element control field, a source operand, and an immediate. In some embodiments, the instruction is fetched from an instruction cache. The destination operand specifies a write mask register. The opcode of the KXORKREGIMM instruction indicates a result of an XOR operation involving the immediate (immi 2314) and the source mask register (k3 register 2326) is broadcasted to a write mask register (k1 2328), using broadcast circuitry 2322.

As shown, broadcast circuitry 2322 uses write mask register (k2 2326) and masked element control field (Z-CTRL 2324) to broadcast the result of the XOR operation to each of the unmasked elements of k1 2328, and zeroes the masked elements of k1 2328.

The fetched instruction is decoded at 2503. For example, the fetched KXORKREGIMM instruction is decoded by decode circuitry such as that detailed herein.

At 2505, the decoded instruction is scheduled (as needed).

At 2507, the decoded instruction is executed by execution circuitry (hardware) such as 2318. For the KXORKREGIMM instruction, the execution will cause execution circuitry (such as 2318) to perform an XOR operation (for example by using XOR gate 2320) of the immediate (such as imm1 2314) and a source mask register (such as k3 mask register 2326), and uses broadcast circuitry (such as k2 mask register 2326) and a masked element control field (such as Z-CTRL 2324), to broadcast a result of the XOR operation to unmasked elements of the destination write mask register (such as k1 2328) and zeroes masked elements of the destination register.

In some embodiments, the instruction is committed or retired at 2509.

Vpadd3Opr Instruction
Exemplary Execution

Detailed herein are embodiments of an VPADD3OPR instruction to improve a computer itself. In particular, the execution of the VPADD3OPR instruction yields an advantage of allowing an immediate value to be used in an instruction involving three operands, rather than requiring multiple instructions to achieve the same result.

Figure 26:
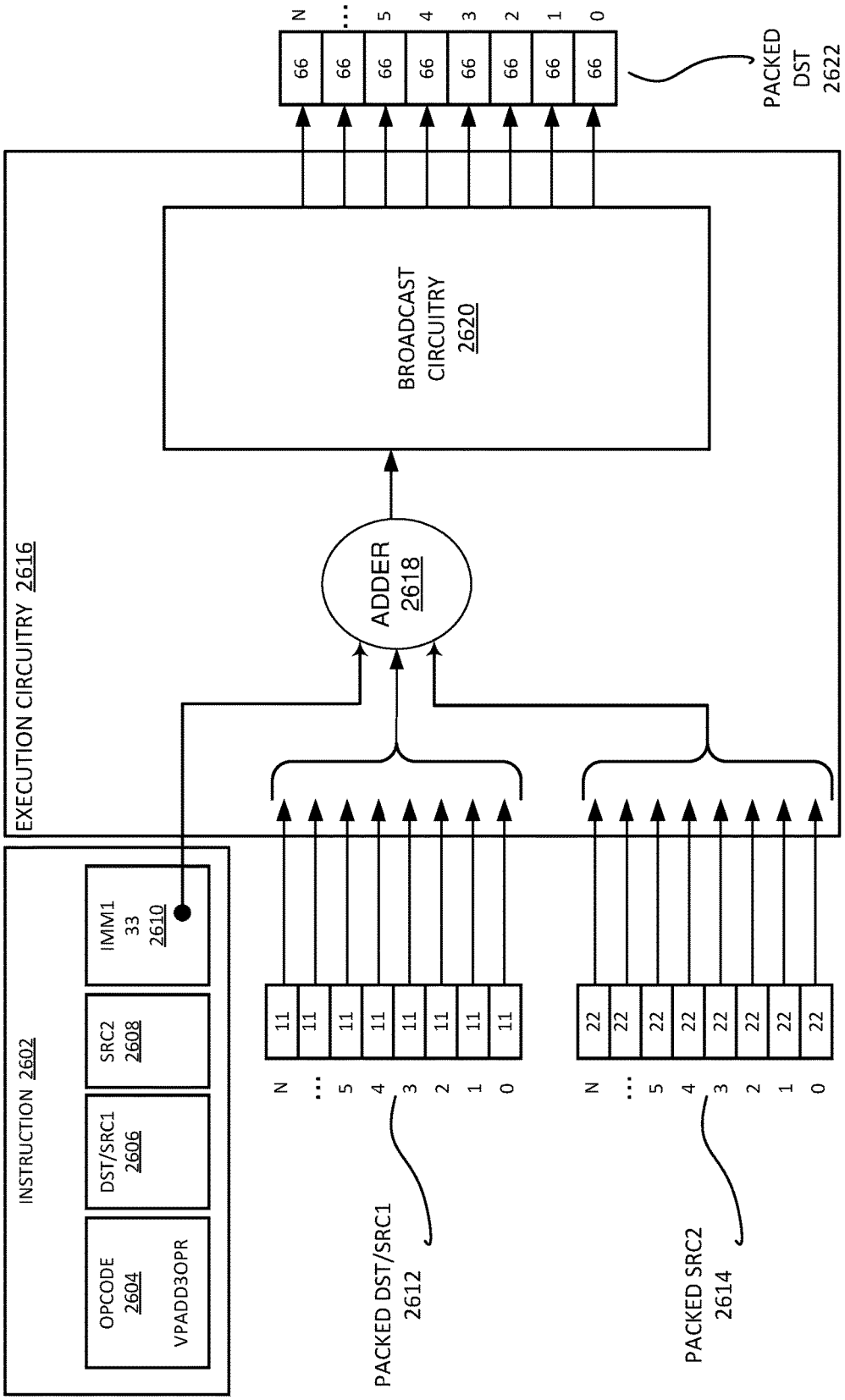
FIG. 26 illustrates an exemplary execution of an instruction having an immediate operand.

FIG. 26 illustrates an exemplary execution of a VPADD3OPR instruction. The VPADD3OPR instruction 2602 format includes fields for an opcode 2604 (e.g., mnemonic "VPADD3OPR"), a packed source/destination identifier (dst/src1 2612 before execution, dst/src1 2622 after execution) (used as both a source and a destination for the operation) to specify packed dst register 2622 to store a result of the operation and to specify packed dst/src1 register, a second packed source identifier (src2 2608) to specify packed src2 register 2614, and an immediate (imm1 2610).

Execution circuitry 2616, in response to an instruction having opcode 2604 equal to VPADD3OPR, uses adder 2618 to add packed dst/src1 2612, plus packed src2 2614, plus immediate imm1 2610, and passes the resulting sum to broadcast circuitry 2620, which broadcasts the sum to packed dst register 2622. In an embodiment, adder 2618 comprises a plurality of adders to add all destination vector elements in parallel.

Exemplary Hardware to Execute the VPADD3OPR Instruction

Figure 27:
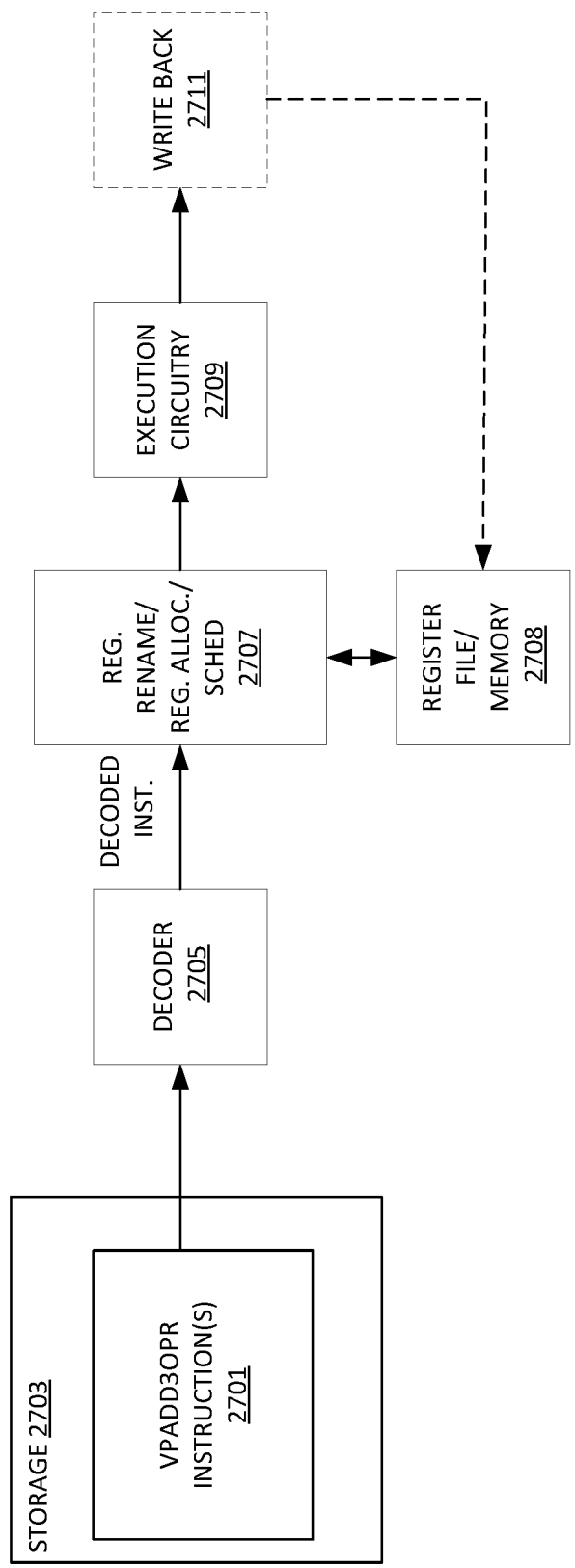
FIG. 27 illustrates an embodiment of hardware to process an instruction having an immediate operand.

FIG. 27 illustrates an embodiment of hardware to process an instruction such as an arithmetic recurrence instruction. As illustrated, storage 2703 stores a VPADD3OPR instruction 2701 to be executed.

The instruction is received by decode circuitry 2705. For example, the decode circuitry 2705 receives this instruction from fetch logic/circuitry. The instruction 2701 includes fields for an opcode (e.g., mnemonic "VPADD3OPR"), a destination identifier 1106 to specify a packed destination register, and an immediate. In some embodiments, the source[s] and destination are registers, and in other embodiments one or more are memory locations. More detailed embodiments of at least one instruction format will be detailed later. The decode circuitry 2705 decodes the instruction into one or more operations. In some embodiments, this decoding includes generating a plurality of micro-operations to be performed by execution circuitry (such as execution circuitry 2709 or 2616). The decode circuitry 2705 also decodes instruction prefixes (if used).

In some embodiments, register renaming, register allocation, and/or scheduling circuitry 2707 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 2708 store data as operands of the instruction to be operated on by execution circuitry. Exemplary register types include packed data registers, general purpose registers, and floating point registers.

Execution circuitry 2709 executes the decoded VPADD3OPR instruction. Execution circuitry 2616 was shown in FIG. 26. Write back (retirement) circuitry 2711 commits the result of the execution of the decoded VPADD3OPR instruction.

Exemplary Formats of the VPADD3OPR Instruction

In some embodiments, retirement/write back circuitry architecturally commits the destination register into the registers or memory and retires the instruction.

An embodiment of a format for a VPADD3OPR instruction 2602 (FIG. 26) is OPCODE (Such as opcode 2604). DST.SRC1 Identifier (such as dst/src1 2606), a second source identifier SRC2 2608, and an immediate (such as IMM1 2614). In some embodiments, VPADD3OPR {B/W/D/Q} is the opcode mnemonic of the instruction, wherein the size parameter {B/W/D/Q} specifies the size of the immediate.

In some embodiments, the OPCODE field is a full opcode field (such as 2974 or a real opcode field (such as 2930), the DST/SRC1 field is a Reg field (such as 2944), the SRC2 field is a R/M field (such as 2946), and the IMM1 field is an IMM8 field (such as 2972 in FIG. 29A).

In some embodiments, the VPADD3OPR instruction includes a field for a write mask register operand (k) (e.g., VPADD3OPR{k} DST/SRC1, SRC2, IMM1). A write mask is used to conditionally control per-element operations and updating of results. Depending upon the implementation, the write mask uses merging or zeroing masking. Instructions encoded with a predicate (writemask, write mask, or k register) operand use that operand to conditionally control per-element computational operation and updating of result to the destination operand. The predicate operand is known as the opmask (write mask) register. In some embodiments, the opmask is a set of architectural registers of size 64-bit. Note that from this set of architectural registers, only k1 through k7 can be addressed as predicate operand. k0 can be used as a regular source or destination but cannot be encoded as a predicate operand. Note also that a predicate operand can be used to enable memory fault-suppression for some instructions with a memory operand (source or destination). As a predicate operand, the opmask registers contain one bit to govern the operation/update to each data element of a vector register. In general, opmask registers can support instructions with element sizes: single-precision floating-point (float32), integer doubleword(int32), double-precision floating-point (float64), integer quadword (int64). The length of a opmask register, MAX_KL, is sufficient to handle up to 64 elements with one bit per element, i.e., 64 bits. For a given vector length, each instruction accesses only the number of least significant mask bits that are needed based on its data type.

An opmask register affects an instruction at per-element granularity. So, any numeric or non-numeric operation of each data element and per-element updates of intermediate results to the destination operand are predicated on the corresponding bit of the opmask register. In most embodiments, an opmask serving as a predicate operand obeys the following properties: 1) the instruction's operation is not performed for an element if the corresponding opmask bit is not set (this implies that no exception or violation can be caused by an operation on a masked-off element, and consequently, no exception flag is updated as a result of a masked-off operation); 2) a destination element is not updated with the result of the operation if the corresponding write mask bit is not set. Instead, the destination element value must be preserved (merging-masking) or it must be zeroed out (zeroing-masking); and 3) for some instructions with a memory operand, memory faults are suppressed for elements with a mask bit of 0. Note that this feature provides a versatile construct to implement control-flow predication as the mask in effect provides a merging behavior for vector register destinations. As an alternative, the masking can be used for zeroing instead of merging, so that the masked out elements are updated with 0 instead of preserving the old value. The zeroing behavior is provided to remove the implicit dependency on the old value when it is not needed.

In embodiments, encodings of the instruction include a scale-index-base (SIB) type memory addressing operand that indirectly identifies multiple indexed destination locations in memory. In one embodiment, an SIB type memory operand may include an encoding identifying a base address register. The contents of the base address register may represent a base address in memory from which the addresses of the particular destination locations in memory are calculated. For example, the base address may be the address of the first location in a block of potential destination locations for an extended vector instruction. In one embodiment, an SIB type memory operand may include an encoding identifying an index register. Each element of the index register may specify an index or offset value usable to compute, from the base address, an address of a respective destination location within a block of potential destination locations. In one embodiment, an SIB type memory operand may include an encoding specifying a scaling factor to be applied to each index value when computing a respective destination address. For example, if a scaling factor value of four is encoded in the SIB type memory operand, each index value obtained from an element of the index register may be multiplied by four and then added to the base address to compute a destination address.

In one embodiment, an SIB type memory operand of the form vm32{x, y, z} may identify a vector array of memory operands specified using SIB type memory addressing. In this example, the array of memory addresses is specified using a common base register, a constant scaling factor, and a vector index register containing individual elements, each of which is a 32-bit index value. The vector index register may be a 128-bit register (e.g., XMM) register (vm32x), a 256-bit (e.g., YMM) register (vm32y), or a 512-bit (e.g., ZMM) register (vm32z). In another embodiment, an SIB type memory operand of the form vm64{x, y, z} may identify a vector array of memory operands specified using SIB type memory addressing. In this example, the array of memory addresses is specified using a common base register, a constant scaling factor, and a vector index register containing individual elements, each of which is a 64-bit index value. The vector index register may be a 128-bit register (e.g., XMM) register (vm64x), a 256-bit (e.g., YMM) register (vm64y) or a 512-bit (e.g., ZMM) register (vm64z).

Exemplary Method of Execution of the VPADD3OPR Instruction

Figure 28:
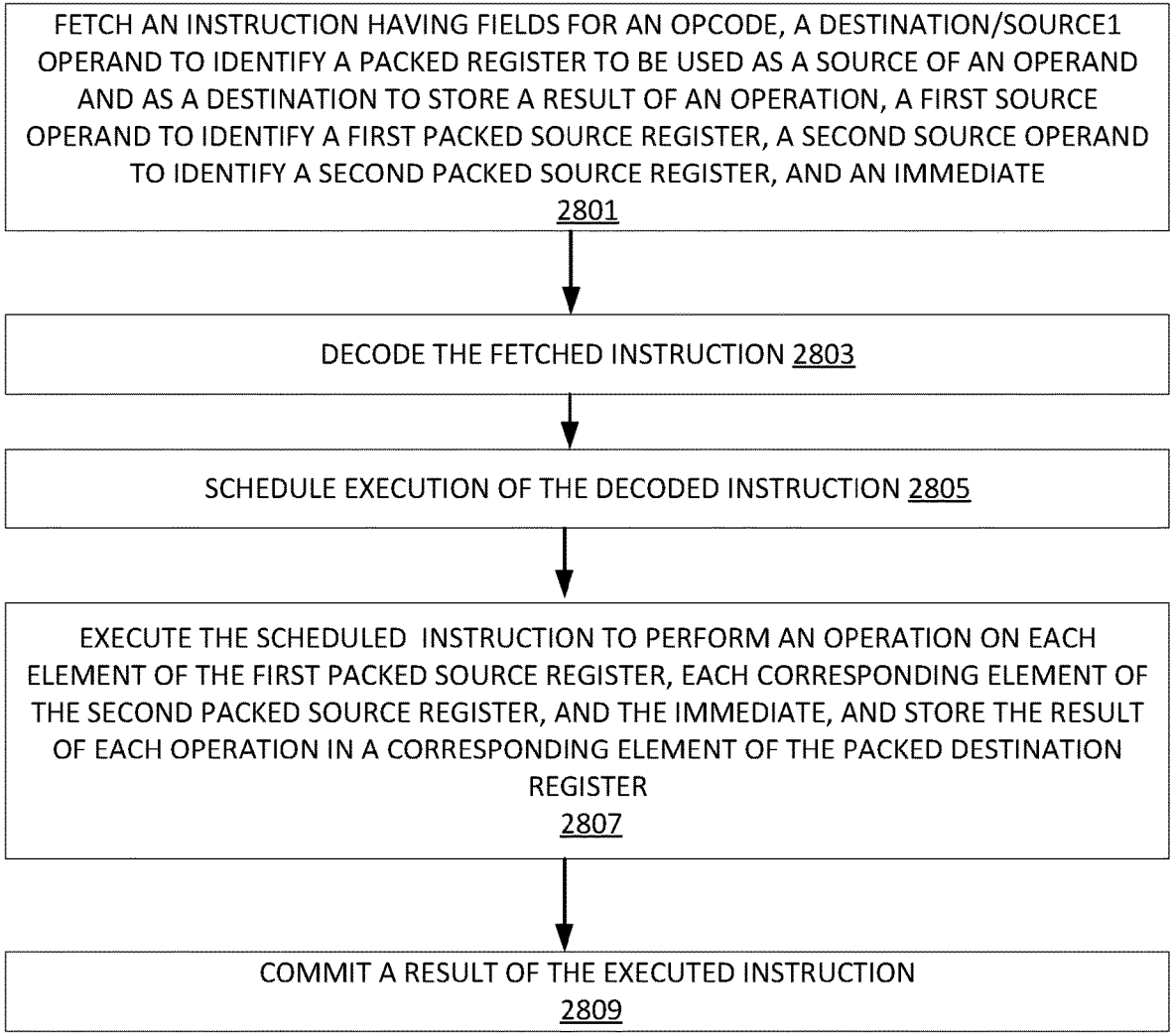
FIG. 28 illustrates an embodiment of a method performed by a processor to process an instruction having an immediate operand.

FIG. 28 illustrates an embodiment of method performed by a processor to process a VPADD3OPR instruction. For example, the processor components of FIG. 27, a pipeline as detailed below, etc. performs this method.

At 2801, an instruction is fetched. For example, a VPADD3OPR instruction is fetched. The VPADD3OPR instruction includes fields for an opcode, a first source/destination operand (the packed data register that stores the first source is also used to store a result of the operation), a second source operand, and an immediate. In some embodiments, the instruction is fetched from an instruction cache. The source/destination operand specifies a packed data vector register, sometimes referred to herein as a packed destination register. The opcode of the VPADD3OPR instruction indicates ADD operation having three addends: a first source, a second source, and an immediate. In an embodiment, the ADD operation is destructive insofar as the resulting sum is written into the first source register, thereby destroying the previous contents of the source register. Broadcast circuitry.

The fetched instruction is decoded at 2803. For example, the fetched VPADD3OPR instruction is decoded by decode circuitry such as that detailed herein.

At 2805, the decoded instruction is scheduled (as needed).

At 2807, the scheduled instruction is executed by execution circuitry (hardware) such as 2616. For the VPADD3OPR instruction, the execution will cause execution circuitry (such as 2616) to perform an ADD operation (for example by using ADDER 2618)] of the immediate (such as imm1 2610) a first packed source (such as packed dst/src 2612) and a second packed source register (such as packed src2 2614). The resulting sum is routed to broadcast circuitry 2620, which broadcasts the result to packed destination register 2622, which, in some embodiments is the same packed destination register used by the packed dst/src1 2612.

In some embodiments, the instruction is committed or retired at 2809.

Instruction Sets

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

VEX Instruction Format

VEX encoding allows instructions to have more than two operands, and allows SIMD vector registers to be longer than 298 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 29A illustrates an exemplary AVX instruction format including a VEX prefix 2902, real opcode field 2930, Mod R/M byte 2940, SIB byte 2950, displacement field 2962, and IMM8 2972. FIG. 29B illustrates which fields from FIG. 29A make up a full opcode field 2974 and a base operation field 2942. FIG. 29C illustrates which fields from FIG. 29A make up a register index field 2944.

VEX Prefix (Bytes 0-2) 2902 is encoded in a three-byte form. The first byte is the Format Field 2940 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 2905 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit [5]–B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 2932 (VEX byte 1, bits [4:0]-mmmmm) includes content to encode an implied leading opcode byte. W Field 2964 (VEX byte 2, bit [7]-W)—is represented by the notation VEX.W, and provides different functions depending on the instruction. The role of VEX.vvvv 2920 (VEX Byte 2, bits [6:3]-vvvv) may include the following: 1) VEX.vvvv encodes the first source register operand, specified in inverted (1s complement) form and is valid for instructions with 2 or more source operands; 2) VEX.vvvv encodes the destination register operand, specified in 1s complement form for certain vector shifts; or 3) VEX.vvvv does not encode any operand, the field is reserved and should contain 1111b. If VEX.L 2968 Size field (VEX byte 2, bit [2]-L)=0, it indicates 298 bit vector; if VEX.L=1, it indicates 256 bit vector. Prefix encoding field 2925 (VEX byte 2, bits [1:0]-pp) provides additional bits for the base operation field.

Real Opcode Field 2930 (Byte 3) is also known as the opcode byte. Part of the opcode is specified in this field.

MOD R/M Field 2940 (Byte 4) includes MOD field 2942 (bits [7-6]), Reg field 2944 (bits [5-3]), and R/M field 2946 (bits [2-0]). The role of Reg field 2944 may include the following: encoding either the destination register operand or a source register operand (the rrr of Rrrr), or be treated as an opcode extension and not used to encode any instruction operand. The role of R/M field 2946 may include the following: encoding the instruction operand that references a memory address, or encoding either the destination register operand or a source register operand.

Scale, Index, Base (SIB)—The content of Scale field 2950 (Byte 5) includes SS2952 (bits [7-6]), which is used for memory address generation. The contents of SIB.xxx 2954 (bits [5-3]) and SIB.bbb 2956 (bits [2-0]) have been previously referred to with regard to the register indexes Xxxx and Bbbb.

The Displacement Field 2962 and the immediate field (IMM8) 2972 contain data.

Exemplary Register Architecture

FIG. 30 is a block diagram of a register architecture 3000 according to one embodiment of the invention. In the embodiment illustrated, there are 32 vector registers 3010 that are 512 bits wide; these registers are referenced as zmm0 through zmm31. The lower order 256 bits of the lower 33 zmm registers are overlaid on registers ymm0-15. The lower order 128 bits of the lower 33 zmm registers (the lower order 128 bits of the ymm registers) are overlaid on registers xmm0-15.

General-purpose registers 3025—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R32.

Scalar floating point stack register file (x87 stack) 3045, on which is aliased the MMX packed integer flat register file 3050—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures
In-Order and Out-of-Order Core Block Diagram

FIG. 31A is a block diagram illustrating both an exemplary in-order pipeline and an exemplary register renaming, out-of-order issue/execution pipeline according to embodiments of the invention. FIG. 31B is a block diagram illustrating both an exemplary embodiment of an in-order architecture core and an exemplary register renaming, out-of-order issue/execution architecture core to be included in a processor according to embodiments of the invention. The solid lined boxes in FIGS. 31A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 31A, a processor pipeline 3100 includes a fetch stage 3102, a length-decode stage 3104, a decode stage 3106, an allocation stage 3108, a renaming stage 3110, a scheduling (also known as a dispatch or issue) stage 3112, a register read/memory read stage 3114, an execute stage 3116, a write back/memory write stage 3118, an exception handling stage 3122, and a commit stage 3124.

FIG. 31B shows processor core 3190 including a front end unit 3130 coupled to an execution engine unit 3150, and both are coupled to a memory unit 3170. The core 3190 may be a reduced instruction set computing (RISC) core, a complex instruction set computing (CISC) core, a very long instruction word (VLIW) core, or a hybrid or alternative core type. As yet another option, the core 3190 may be a special-purpose core, such as, for example, a network or communication core, compression engine, coprocessor core, general purpose computing graphics processing unit (GPGPU) core, graphics core, or the like.

The front end unit 3130 includes a branch prediction unit 3132 coupled to an instruction cache unit 3134, which is coupled to an instruction translation lookaside buffer (TLB) 3136, which is coupled to an instruction fetch unit 3138, which is coupled to a decode unit 3140. The decode unit 3140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 3140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 3190 includes a microcode ROM or other medium that stores microcode for certain macroinstructions (e.g., in decode unit 3140 or otherwise within the front end unit 3130). The decode unit 3140 is coupled to a rename/allocator unit 3152 in the execution engine unit 3150.

The execution engine unit 3150 includes the rename/allocator unit 3152 coupled to a retirement unit 3154 and a set of one or more scheduler unit(s) 3156. The scheduler unit(s) 3156 represents any number of different schedulers, including reservations stations, central instruction window, etc. The scheduler unit(s) 3156 is coupled to the physical register file(s) unit(s) 3158. Each of the physical register file(s) units 3158 represents one or more physical register files, different ones of which store one or more different data types, such as scalar integer, scalar floating point, packed integer, packed floating point, vector integer, vector floating point status (e.g., an instruction pointer that is the address of the next instruction to be executed), etc. In one embodiment, the physical register file(s) unit 3158 comprises a vector registers unit, a write mask registers unit, and a scalar registers unit. These register units may provide architectural vector registers, vector mask registers, and general purpose registers. The physical register file(s) unit(s) 3158 is overlapped by the retirement unit 3154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 3154 and the physical register file(s) unit(s) 3158 are coupled to the execution cluster(s) 3160. The execution cluster(s) 3160 includes a set of one or more execution units 3162 and a set of one or more memory access units 3164. The execution units 3162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 3156, physical register file(s) unit(s) 3158, and execution cluster(s) 3160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 3164). It should also be understood that where separate pipelines are used, one or more of these pipelines may be out-of-order issue/execution and the rest in-order.

The set of memory access units 3164 is coupled to the memory unit 3170, which includes a data TLB unit 3172 coupled to a data cache unit 3174 coupled to a level 2 (L2) cache unit 3176. In one exemplary embodiment, the memory access units 3164 may include a load unit, a store address unit, and a store data unit, each of which is coupled to the data TLB unit 3172 in the memory unit 3170. The instruction cache unit 3134 is further coupled to a level 2 (L2) cache unit 3176 in the memory unit 3170. The L2 cache unit 3176 is coupled to one or more other levels of cache and eventually to a main memory.

By way of example, the exemplary register renaming, out-of-order issue/execution core architecture may implement the pipeline 3100 as follows: 1) the instruction fetch 3138 performs the fetch and length decoding stages 3102 and 3104; 2) the decode unit 3140 performs the decode stage 3106; 3) the rename/allocator unit 3152 performs the allocation stage 3108 and renaming stage 3110; 4) the scheduler unit(s) 3156 performs the schedule stage 3112; 5) the physical register file(s) unit(s) 3158 and the memory unit 3170 perform the register read/memory read stage 3114; the execution cluster 3160 perform the execute stage 3116; 6) the memory unit 3170 and the physical register file(s) unit(s) 3158 perform the write back/memory write stage 3118; 7) various units may be involved in the exception handling stage 3122; and 8) the retirement unit 3154 and the physical register file(s) unit(s) 3158 perform the commit stage 3124.

The core 3190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 3190 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 3134/3174 and a shared L2 cache unit 3176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 32B:
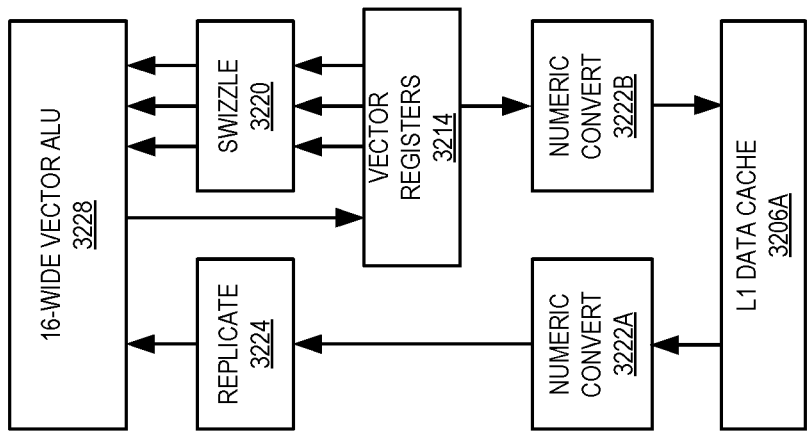
FIGS. 32A-B illustrate a block diagram of a more specific exemplary in-order core architecture, which core would be one of several logic blocks (including other cores of the same type and/or different types) in a chip.
Figure 32A:
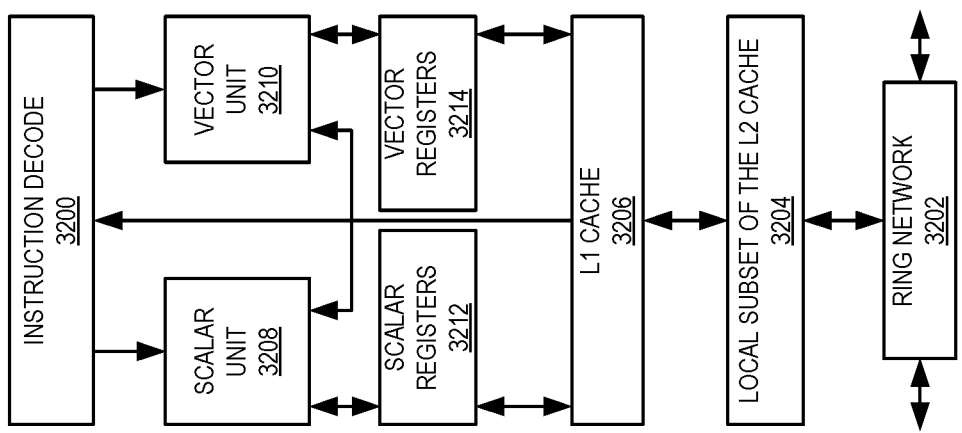

FIGS. 32A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 32A is a block diagram of a single processor core, along with its connection to the ring network 3202 (e.g., an on-die interconnect network) and with its local subset of the Level 2 (L2) cache 3204, according to embodiments of the invention. In one embodiment, an instruction decoder 3200 supports the x86 instruction set with a packed data instruction set extension. An L1 cache 3206 allows low-latency accesses to cache memory into the scalar and vector units. While in one embodiment (to simplify the design), a scalar unit 3208 and a vector unit 3210 use separate register sets (respectively, scalar registers 3212 and vector registers 3214) and data transferred between them is written to memory and then read back in from a level 1 (L1) cache 3206, alternative embodiments of the invention may use a different approach (e.g., use a single register set or include a communication path that allow data to be transferred between the two register files without being written and read back).

The local subset of the L2 cache 3204 is part of a global L2 cache that is divided into separate local subsets, one per processor core. Each processor core has a direct access path to its own local subset of the L2 cache 3204. Data read by a processor core is stored in its L2 cache subset 3204 and can be accessed quickly, in parallel with other processor cores accessing their own local L2 cache subsets. Data written by a processor core is stored in its own L2 cache subset 3204 and is flushed from other subsets, if necessary. The ring network 3202 ensures coherency for shared data. The ring network 3202 is bi-directional to allow agents such as processor cores, L2 caches and other logic blocks to communicate with each other within the chip. Each ring data-path is 1024-bits wide per direction in some embodiments.

FIG. 32B is an expanded view of part of the processor core in FIG. 32A according to embodiments of the invention. FIG. 32B includes an L1 data cache 3206A part of the L1 cache 3204, as well as more detail regarding the vector unit 3210 and the vector registers 3214. Specifically, the vector unit 3210 is a 33-wide vector processing unit (VPU) (see the 16-wide ALU 3228), which executes one or more of integer, single-precision float, and double-precision float instructions. The VPU supports swizzling the register inputs with swizzle unit 3220, numeric conversion with numeric convert units 3222A-B, and replication with replication unit 3224 on the memory input.

Processor with Integrated Memory Controller and Graphics

Figure 33:
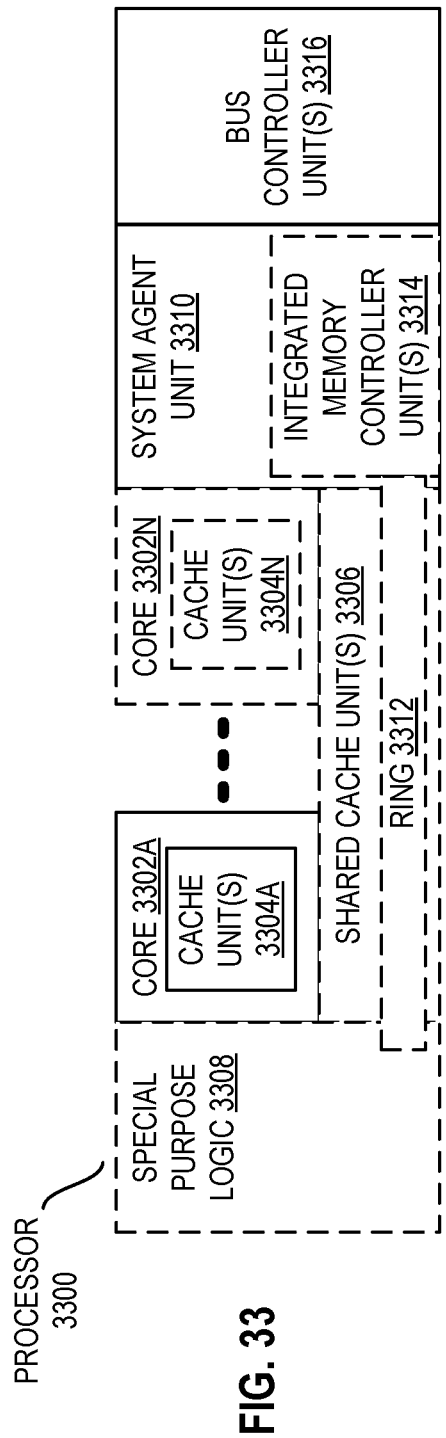
FIG. 33 is a block diagram of a processor that may have more than one core, may have an integrated memory controller, and may have integrated graphics according to embodiments of the invention.

FIG. 33 is a block diagram of a processor 3300 that may have more than one core, may have an integrated memory controller, and may have integrated graphics according to embodiments of the invention. The solid lined boxes in FIG. 33 illustrate a processor 3300 with a single core 3302A, a system agent 3310, a set of one or more bus controller units 3316, while the optional addition of the dashed lined boxes illustrates an alternative processor 3300 with multiple cores 3302A-N, a set of one or more integrated memory controller unit(s) 3331 in the system agent unit 3310, and special purpose logic 3308.

Thus, different implementations of the processor 3300 may include: 1) a CPU with the special purpose logic 3308 being integrated graphics and/or scientific (throughput) logic (which may include one or more cores), and the cores 3302A-N being one or more general purpose cores (e.g., general purpose in-order cores, general purpose out-of-order cores, a combination of the two); 2) a coprocessor with the cores 3302A-N being a large number of special purpose cores intended primarily for graphics and/or scientific (throughput); and 3) a coprocessor with the cores 3302A-N being a large number of general purpose in-order cores. Thus, the processor 3300 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 3300 may be a part of and/or may be implemented on one or more substrates using any of a number of process technologies, such as, for example, BiCMOS, CMOS, or NMOS.

The memory hierarchy includes one or more levels of cache within the cores 3304A-N, a set or one or more shared cache units 3306, and external memory (not shown) coupled to the set of integrated memory controller units 3331. The set of shared cache units 3306 may include one or more mid-level caches, such as level 2 (L2), level 3 (L3), level 4 (L4), or other levels of cache, a last level cache (LLC), and/or combinations thereof. While in one embodiment a ring based interconnect unit 3312 interconnects the integrated graphics logic 3308, the set of shared cache units 3306, and the system agent unit 3310/integrated memory controller unit(s) 3331, alternative embodiments may use any number of well-known techniques for interconnecting such units. In one embodiment, coherency is maintained between one or more cache units 3306 and cores 3302-A-N.

In some embodiments, one or more of the cores 3302A-N are capable of multi-threading. The system agent 3310 includes those components coordinating and operating cores 3302A-N. The system agent unit 3310 may include for example a power control unit (PCU) and a display unit. The PCU may be or include logic and components needed for regulating the power state of the cores 3302A-N and the integrated graphics logic 3308. The display unit is for driving one or more externally connected displays.

The cores 3302A-N may be homogenous or heterogeneous in terms of architecture instruction set; that is, two or more of the cores 3302A-N may be capable of execution the same instruction set, while others may be capable of executing only a subset of that instruction set or a different instruction set.

Exemplary Computer Architectures

FIGS. 34-37 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 34:
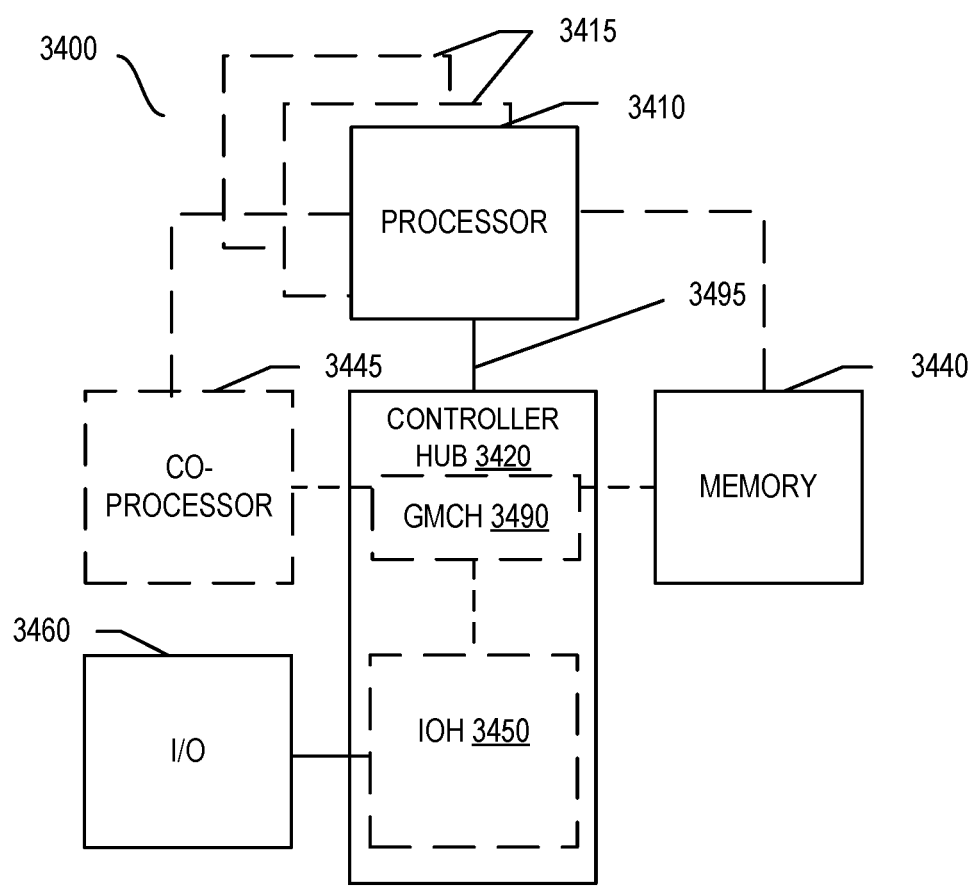
FIG. 34 shown a block diagram of a system in accordance with one embodiment of the present invention.

Referring now to FIG. 34, shown is a block diagram of a system 3400 in accordance with one embodiment of the present invention. The system 3400 may include one or more processors 3410, 3415, which are coupled to a controller hub 3420. In one embodiment, the controller hub 3420 includes a graphics memory controller hub (GMCH) 3490 and an Input/Output Hub (IOH) 3450 (which may be on separate chips); the GMCH 3490 includes memory and graphics controllers to which are coupled memory 3440 and a coprocessor 3445; the IOH 3450 is couples input/output (I/O) devices 3460 to the GMCH 3490. Alternatively, one or both of the memory and graphics controllers are integrated within the processor (as described herein), the memory 3440 and the coprocessor 3445 are coupled directly to the processor 3410, and the controller hub 3420 in a single chip with the IOH 3450.

The optional nature of additional processors 3415 is denoted in FIG. 34 with broken lines. Each processor 3410, 3415 may include one or more of the processing cores described herein and may be some version of the processor 3300.

The memory 3440 may be, for example, dynamic random access memory (DRAM), phase change memory (PCM), or a combination of the two. For at least one embodiment, the controller hub 3437 communicates with the processor(s) 3410, 3415 via a multi-drop bus, such as a frontside bus (FSB), point-to-point interface, or similar connection 3495.

In one embodiment, the coprocessor 3445 is a special-purpose processor, such as, for example, a high-throughput MIC processor, a network or communication processor, compression engine, graphics processor, GPGPU, embedded processor, or the like. In one embodiment, controller hub 3420 may include an integrated graphics accelerator.

There can be a variety of differences between the physical resources 3410, 34155 in terms of a spectrum of metrics of merit including architectural, microarchitectural, thermal, power consumption characteristics, and the like.

In one embodiment, the processor 3410 executes instructions that control data processing operations of a general type. Embedded within the instructions may be coprocessor instructions. The processor 3410 recognizes these coprocessor instructions as being of a type that should be executed by the attached coprocessor 3445. Accordingly, the processor 3410 issues these coprocessor instructions (or control signals representing coprocessor instructions) on a coprocessor bus or other interconnect, to coprocessor 3445. Coprocessor(s) 3445 accept and execute the received coprocessor instructions.

Figure 35:
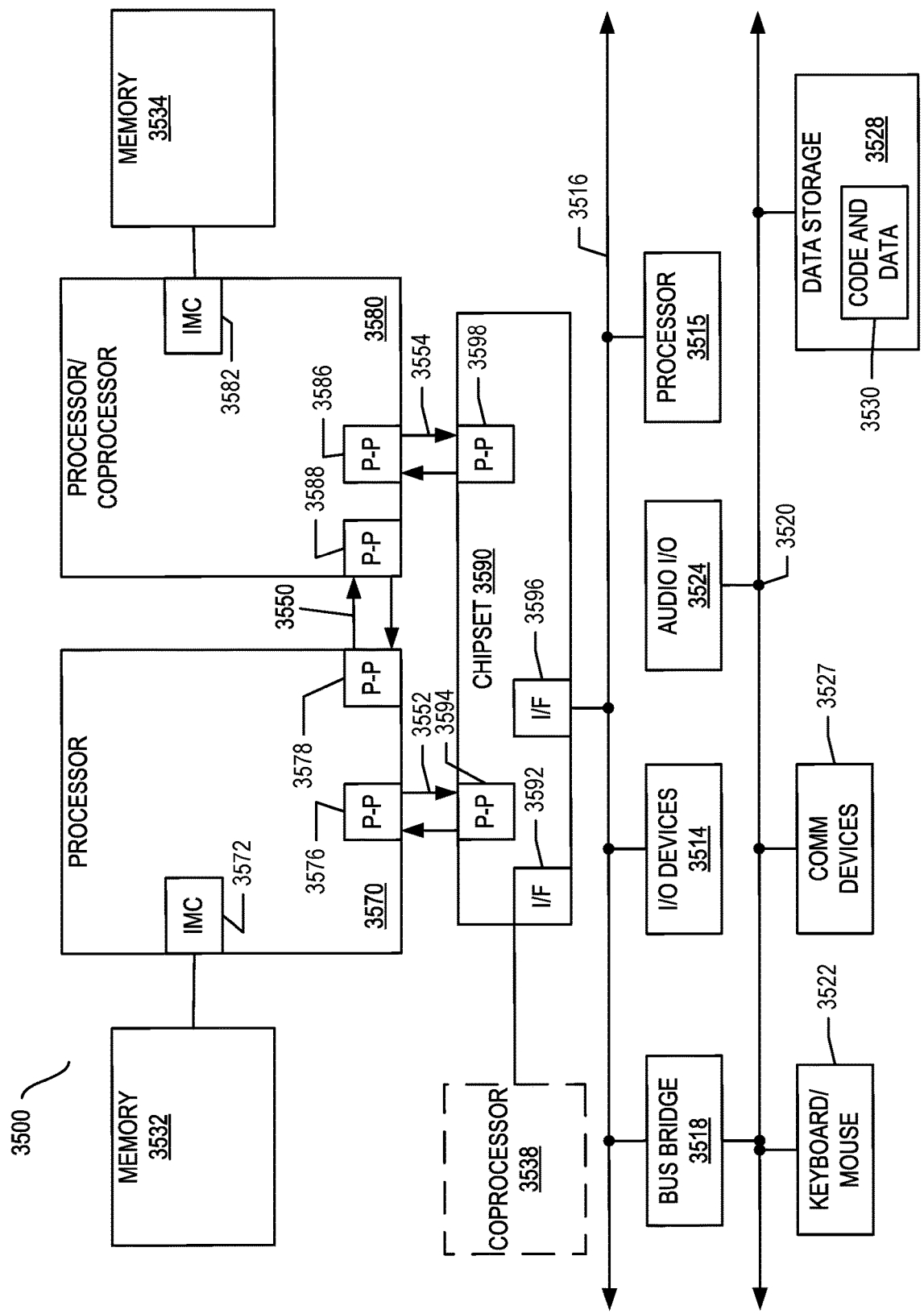
FIG. 35 is a block diagram of a first more specific exemplary system in accordance with an embodiment of the present invention.

Referring now to FIG. 35, shown is a block diagram of a first more specific exemplary system 3500 in accordance with an embodiment of the present invention. As shown in FIG. 35, multiprocessor system 3500 is a point-to-point interconnect system, and includes a first processor 3570 and a second processor 3580 coupled via a point-to-point interconnect 3550. Each of processors 3570 and 3580 may be some version of the processor 3300. In one embodiment of the invention, processors 3570 and 3580 are respectively processors 3410 and 3432, while coprocessor 3538 is coprocessor 3445. In another embodiment, processors 3570 and 3580 are respectively processor 3410 coprocessor 3445.

Processors 3570 and 3580 are shown including integrated memory controller (IMC) units 3572 and 3582, respectively. Processor 3570 also includes as part of its bus-controller unit's point-to-point (P-P) interfaces 3576 and 3578; similarly, second processor 3580 includes P-P interfaces 3586 and 3588. Processors 3570, 3580 may exchange information via a point-to-point (P-P) interface 3550 using P-P interface circuits 3578, 3588. As shown in FIG. 35, IMCs 3572 and 3582 couple the processors to respective memories, namely a memory 3532 and a memory 3534, which may be portions of main memory locally attached to the respective processors.

Processors 3570, 3580 may each exchange information with a chipset 3590 via individual P-P interfaces 3552, 3554 using point to point interface circuits 3576, 3594, 3586, 3598. Chipset 3590 may optionally exchange information with the coprocessor 3538 via a high-performance interface 3592. In one embodiment, the coprocessor 3538 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 3590 may be coupled to a first bus 3516 via an interface 3596. In one embodiment, first bus 3516 may be a Peripheral Component Interconnect (PCI) bus, or a bus such as a PCI Express bus or another I/O interconnect bus, although the scope of the present invention is not so limited.

As shown in FIG. 35, various I/O devices 3514 may be coupled to first bus 3516, along with a bus bridge 3518 which couples first bus 3516 to a second bus 3520. In one embodiment, one or more additional processor(s) 3515, such as coprocessors, high-throughput MIC processors, GPGPU's, accelerators (such as, e.g., graphics accelerators or digital signal processing (DSP) units), field programmable gate arrays, or any other processor, are coupled to first bus 3533. In one embodiment, second bus 3520 may be a low pin count (LPC) bus. Various devices may be coupled to a second bus 3520 including, for example, a keyboard and/or mouse 3522, communication devices 3527 and a storage unit 3528 such as a disk drive or other mass storage device which may include instructions/code and data 3530, in one embodiment. Further, an audio I/O 3524 may be coupled to the second bus 3516. Note that other architectures are possible. For example, instead of the point-to-point architecture of FIG. 35, a system may implement a multi-drop bus or other such architecture.

Figure 36:
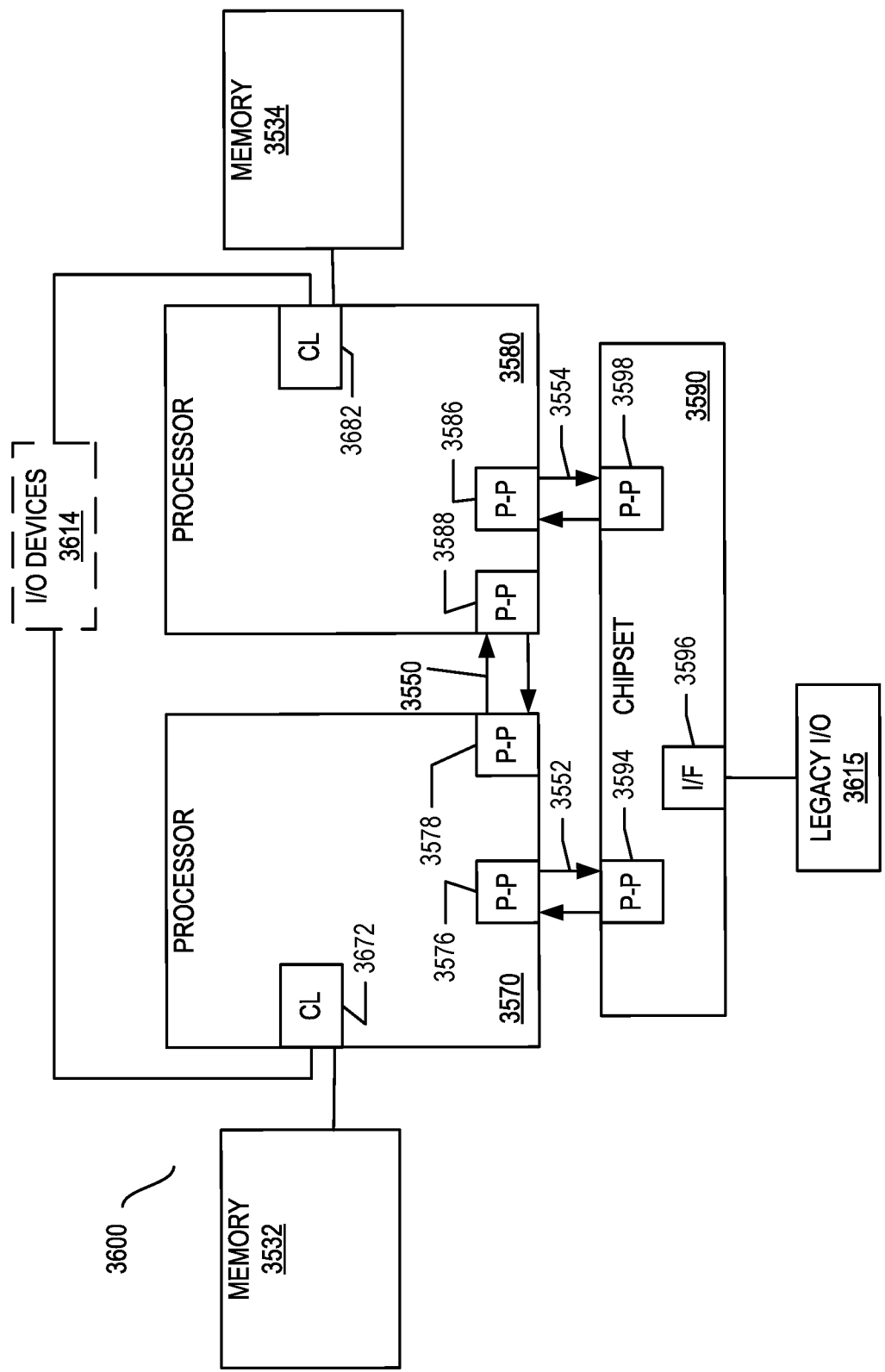
FIG. 36 is a block diagram of a second more specific exemplary system in accordance with an embodiment of the present invention.

Referring now to FIG. 36, shown is a block diagram of a second more specific exemplary system 3600 in accordance with an embodiment of the present invention. Like elements in FIGS. 35 and 36 bear like reference numerals, and certain aspects of FIG. 35 have been omitted from FIG. 36 in order to avoid obscuring other aspects of FIG. 36.

FIG. 36 illustrates that the processors 3570, 3580 may include integrated memory and I/O control logic ("CL") 3672 and 3682, respectively. Thus, the CL 3672, 3682 include integrated memory controller units and include I/O control logic. FIG. 36 illustrates that not only are the memories 3532, 3534 coupled to the CL 3572, 3582, but also that I/O devices 3614 are also coupled to the control logic 3572, 3582. Legacy I/O devices 3615 are coupled to the chipset 3590.

Figure 37:
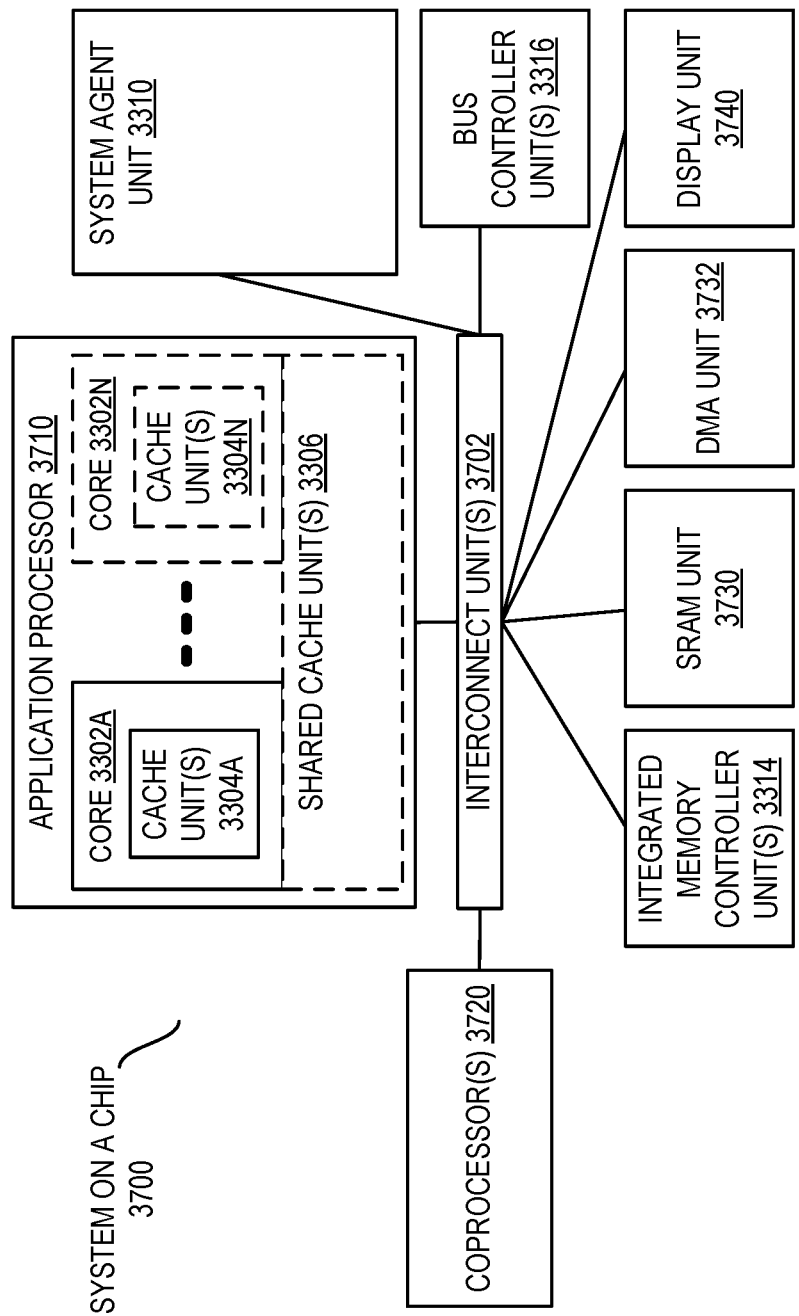
FIG. 37 is a block diagram of a System-on-a-Chip (SoC) in accordance with an embodiment of the present invention.

Referring now to FIG. 37, shown is a block diagram of a SoC 3700 in accordance with an embodiment of the present invention. Similar elements in FIG. 33 bear like reference numerals. Also, dashed lined boxes are optional features on more advanced SoCs. In FIG. 37, an interconnect unit(s) 3702 is coupled to: an application processor 3710 which includes a set of one or more cores 372A-N, cache units 3304A-N, and shared cache unit(s) 3306; a system agent unit 3310; a bus controller unit(s) 3316; an integrated memory controller unit(s) 3314; a set or one or more coprocessors 3720 which may include integrated graphics logic, an image processor, an audio processor, and a video processor; an static random access memory (SRAM) unit 3730; a direct memory access (DMA) unit 3732; and a display unit 3740 for coupling to one or more external displays. In one embodiment, the coprocessor(s) 3720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 3530 illustrated in FIG. 35, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 38:
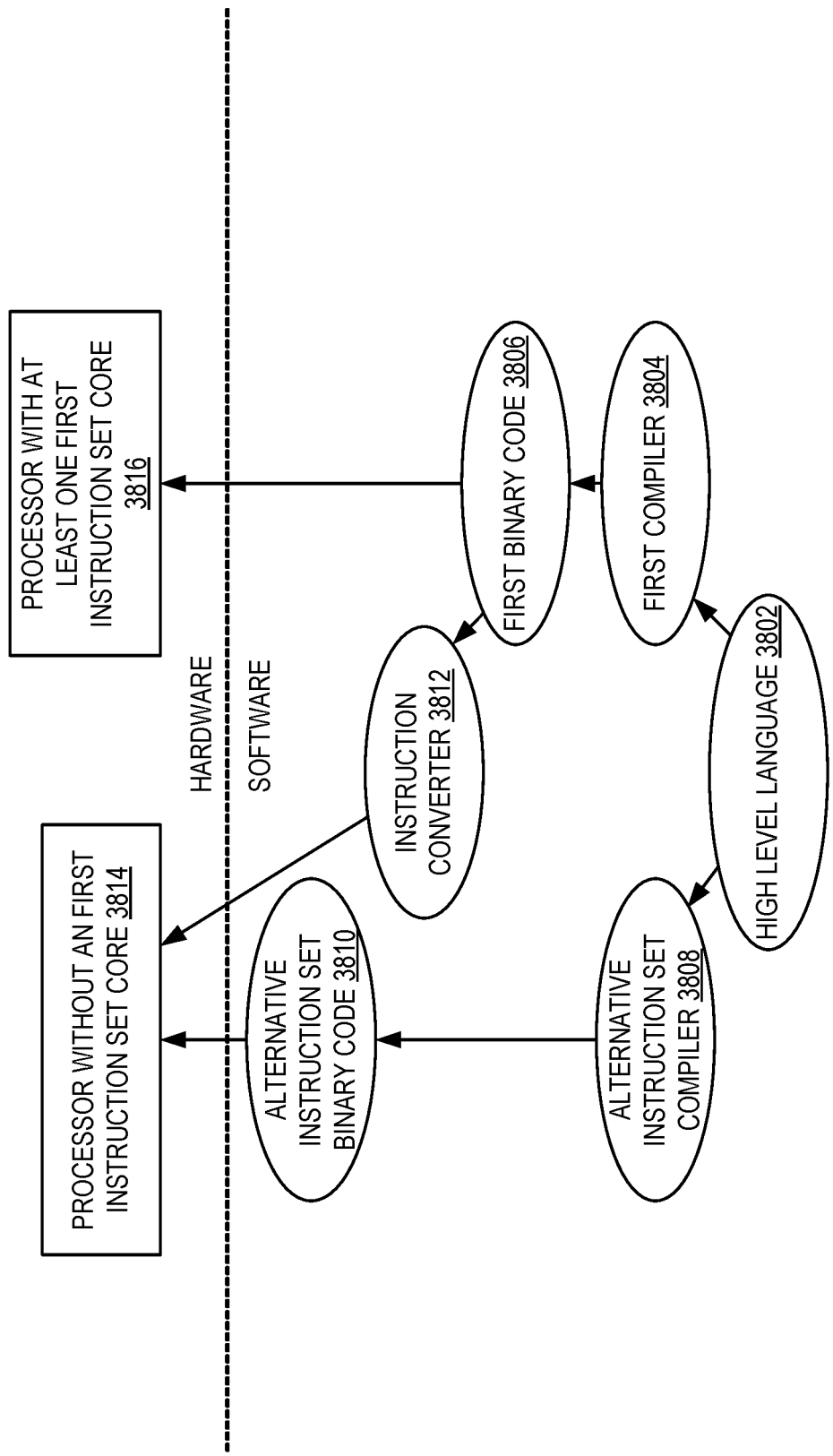
FIG. 38 is a block diagram contrasting the use of a software instruction converter to convert binary instructions in a source instruction set to binary instructions in a target instruction set according to embodiments of the invention.

FIG. 38 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 38 shows a program in a high level language 3802 may be compiled using a first compiler 3804 to generate a first binary code (e.g., x86) 3806 that may be natively executed by a processor with at least one first instruction set core 3816. In some embodiments, the processor with at least one first instruction set core 3816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 3804 represents a compiler that is operable to generate binary code of the first instruction set 3806 (e.g., object code) that can, with or without additional linkage processing, be executed on the processor with at least one first instruction set core 3816. Similarly, FIG. 38 shows the program in the high level language 3802 may be compiled using an alternative instruction set compiler 3808 to generate alternative instruction set binary code 3810 that may be natively executed by a processor without at least one first instruction set core 3814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 3812 is used to convert the first binary code 3806 into code that may be natively executed by the processor without a first instruction set core 3814. This converted code is not likely to be the same as the alternative instruction set binary code 3810 because an instruction converter capable of this is difficult to make; however, the converted code will accomplish the general operation and be made up of instructions from the alternative instruction set. Thus, the instruction converter 3812 represents software, firmware, hardware, or a combination thereof that, through emulation, simulation or any other process, allows a processor or other electronic device that does not have a first instruction set processor or core to execute the first binary code 3806.

FURTHER EXAMPLES

Example 1 provides a method of executing a vector instruction, the method including: fetching, by fetch circuitry, the vector instruction from a code storage, the vector instruction including an opcode, a destination identifier to specify a packed destination register, a first immediate, and a second immediate, decoding, by decode circuitry, the fetched vector instruction, and executing, by execution circuitry, the decoded vector instruction, to: when the opcode specifies to broadcast, broadcast the first immediate to every vector element of the packed destination register, and when the opcode specifies to stride, store the first immediate to a first vector element of the packed destination register, and, successively, for each subsequent vector element within the packed destination register, generate and store a value of an immediately preceding vector element plus the second immediate.

Example 2 includes the substance of the exemplary method of Example 1, wherein, when the opcode specifies to stride, values of successive vector elements written to by the execution circuitry differ by the value of the second immediate.

Example 3 includes the substance of the exemplary method of Example 2, wherein the vector instruction further includes a write mask identifier to select a vector write mask register including a plurality of one bit vector write mask elements that each controls whether an execution result is written to a corresponding vector element within the packed destination register, the corresponding vector element to occupy a same relative position within the packed destination register as a relative position occupied by the vector write mask element within the write mask register, wherein results of the executing are to be written only to unmasked vector elements of the packed destination register.

Example 4 includes the substance of the exemplary method of Example 3, wherein the executing the vector instruction further includes zeroing masked vector elements of the packed destination register.

Example 5 includes the substance of the exemplary method of Example 3, wherein the executing the vector instruction further includes not writing new values to masked vector elements of the packed destination register.

Example 6 includes the substance of the exemplary method of Example 3, wherein the vector instruction further includes a masked element control field to specify whether masked vector elements of the packed destination register are to retain their value or to be zeroed.

Example 7 includes the substance of the exemplary method of Example 6, wherein the masked element control field is to be derived from the opcode.

Example 8 includes the substance of the exemplary method of any one of Examples 1-7, wherein the vector instruction further includes an element size identifier to specify a size of the vector elements of the packed destination register.

Example 9 includes the substance of the exemplary method of Example 8, wherein the element size identifier is included in the opcode.

Example 10 includes the substance of the exemplary method of Example 1, wherein the packed destination register includes one of a 128-bit vector register, a 256-bit vector register, and a 512-bit vector register, the packed destination register including a plurality of fixed-size vector elements.

Example 11 provides a processor to execute a vector instruction, the processor including: fetch circuitry to fetch the vector instruction from a code storage, the vector instruction including an opcode, a destination identifier to specify a packed destination register, a first immediate, and a second immediate, decode circuitry to decode the fetched vector instruction, and execution circuitry to execute the decoded vector instruction, to: when the opcode specifies to broadcast, broadcast the first immediate to every vector element of the packed destination register, and when the opcode specifies to stride, store the first immediate to a first vector element of the packed destination register, and, successively, for each subsequent vector element within the packed destination register, generate and store a value of an immediately preceding vector element plus the second immediate.

Example 12 includes the substance of the exemplary processor of Example 11, wherein, when the opcode specifies to stride, values of successive vector elements written to the packed destination register by the execution circuitry are to differ by the value of the second immediate.

Example 13 includes the substance of the exemplary processor of Example 12, wherein the vector instruction further includes a write mask identifier to select a vector write mask register including a plurality of one bit vector write mask elements that each controls whether an execution result is written to a corresponding vector element within the packed destination register, the corresponding vector element to occupy a same relative position within the packed destination register as a relative position occupied by the vector write mask element within the write mask register, wherein results of the executing are to be written only to unmasked vector elements of the packed destination register.

Example 14 includes the substance of the exemplary processor of Example 13, wherein the executing the vector instruction further includes zeroing masked vector elements of the packed destination register.

Example 15 includes the substance of the exemplary processor of Example 13, wherein the executing the vector instruction further includes not writing new values to masked vector elements of the packed destination register.

Example 16 includes the substance of the exemplary processor of Example 13, wherein the vector instruction further includes a masked element control field to specify whether masked vector elements of the packed destination register are to retain their value or to be zeroed.

Example 17 includes the substance of the exemplary processor of Example 16, wherein the masked element control field is to be derived from the opcode.

Example 18 includes the substance of the exemplary processor of any one of Examples 11-17, wherein the vector instruction further includes an element size identifier to specify a size of the vector elements of the packed destination register.

Example 19 includes the substance of the exemplary processor of Example 18, wherein the element size identifier is one of a prefix and a suffix to the opcode.

Example 20 includes the substance of the exemplary processor of Example 11, wherein the packed destination register includes one of a 128-bit vector register, a 256-bit vector register, and a 512-bit vector register, the packed destination register including a plurality of fixed-size vector elements.

Example 21 provides a system to execute a vector instruction, the system including: a memory, and a processor, including: fetch circuitry to fetch the vector instruction from a code storage, the vector instruction including an opcode, a destination identifier to specify a packed destination register, a first immediate, and a second immediate, decode circuitry to decode the fetched vector instruction, and execution circuitry to execute the decoded vector instruction, to: when the opcode specifies to broadcast, broadcast the first immediate to every vector element of the packed destination register, and when the opcode specifies to stride, store the first immediate to a first vector element of the packed destination register, and, successively, for each subsequent vector element within the packed destination register, generate and store a value of an immediately preceding vector element plus the second immediate.

Example 22 includes the substance of the exemplary system of Example 21, wherein, when the opcode specifies to stride, after the executing, values of successive vector elements written to by the execution circuitry differ by the value of the second immediate.

Example 23 includes the substance of the exemplary system of Example 22, wherein the vector instruction further includes a write mask identifier to select a vector write mask register including a plurality of one bit vector write mask elements that each controls whether an execution result is written to a corresponding vector element within the packed destination register, the corresponding vector element to occupy a same relative position within the packed destination register as a relative position occupied by the vector write mask element within the write mask register, wherein results of the executing are to be written only to unmasked vector elements of the packed destination register.

Example 24 includes the substance of the exemplary system of Example 23, wherein the executing the vector instruction further includes zeroing masked vector elements of the packed destination register.

Example 25 includes the substance of the exemplary system of Example 23, wherein the executing the vector instruction further includes not writing new values to masked vector elements of the packed destination register.

Example 26 includes the substance of the exemplary system of Example 23, wherein the vector instruction further includes a masked element control field to specify whether masked vector elements of the packed destination register are to retain their value or to be zeroed.

Example 27 includes the substance of the exemplary system of Example 26, wherein the masked element control field is to be derived from the opcode.

Example 28 includes the substance of the exemplary system of any one of Examples 21-27, wherein the vector instruction further includes an element size identifier to specify a size of the vector elements of the packed destination register.

Example 29 includes the substance of the exemplary system of Example 28, wherein the element size identifier is one of a prefix and a suffix to the opcode.

Example 30 includes the substance of the exemplary system of Example 21, wherein the packed destination register includes one of a 128-bit vector register, a 256-bit vector register, and a 512-bit vector register, the packed destination register including a plurality of fixed-size vector elements.

Example 31 provides a method of executing a vector instruction, the method including: fetching, by fetch circuitry, the vector instruction from a code storage, the vector instruction including an opcode, a destination identifier to specify a packed destination register, a write mask identifier to specify a write mask register, and first and second immediates, decoding, by decode circuitry, the fetched vector instruction, and executing, by execution circuitry, the decoded vector instruction to: use the first immediate to derive a data value, use the second immediate to derive a stride value, use the write mask register to identify unmasked packed destination register elements, when the opcode specifies to broadcast, broadcast the data value to every unmasked packed destination register element, and when the opcode specifies to stride, store the data value to a first unmasked packed destination register element, and, successively, for each subsequent unmasked packed destination register element, generate and store a value of an immediately preceding unmasked packed destination register element plus the stride value.

Example 32 includes the substance of the exemplary method of Example 31, wherein the vector instruction further includes a source identifier to specify a source vector register, and wherein deriving the broadcast data value includes one of using the first immediate as the broadcast data value, and using the first immediate to select a vector element within the source vector register and using the selected source vector register element as the broadcast data value.

Example 33 includes the substance of the exemplary method of Example 31, wherein the vector instruction further includes a source identifier to specify a source vector register, and wherein deriving the stride data value includes one of using the second immediate as the stride data value, and using the second immediate to select a vector element within the source vector register and using the selected source vector register element as the stride data value.

Example 34 includes the substance of the exemplary method of Example 31, wherein the write mask register includes a plurality of one bit vector write mask elements that each controls whether an execution result is written to a corresponding vector element within the packed destination register, the corresponding vector element to occupy a same relative position within the packed destination register as a relative position occupied by the vector write mask element within the write mask register, wherein results of the executing are to be written only to unmasked vector elements of the packed destination register.

Example 35 includes the substance of the exemplary method of Example 34, wherein the executing the vector instruction further includes zeroing masked vector elements of the packed destination register.

Example 36 includes the substance of the exemplary method of Example 34, wherein the executing the vector instruction further includes not writing new values to masked vector elements of the packed destination register.

Example 37 includes the substance of the exemplary method of Example 33, wherein the vector instruction further includes a masked element control field to specify whether masked vector elements of the packed destination register are to retain their value or to be zeroed.

Example 38 includes the substance of the exemplary method of Example 37, wherein the masked element control field is to be derived from the opcode.

Example 39 includes the substance of the exemplary method of Example 38, wherein the masked element control field is one of a suffix and a prefix of the opcode.

Example 40 includes the substance of the exemplary method of any one of Examples 31-39, wherein the vector instruction further includes an element size identifier to specify a size of the vector elements of the packed destination register.

Example 41 provides a processor to execute a vector instruction, the processor including: fetch circuitry to fetch the vector instruction from a code storage, the vector instruction including an opcode, a destination identifier to specify a packed destination register, a write mask identifier to specify a write mask register, and first and second immediates, decode circuitry to decode the fetched vector instruction, and execution circuitry to execute the decoded vector instruction to: use the first immediate to derive a data value, use the second immediate to derive a stride value, and use the write mask register to identify unmasked destination vector register.

Example 42 includes the substance of the exemplary processor of Example 41, wherein the vector instruction further includes a source identifier to specify a source vector register, and wherein deriving the broadcast data value includes one of using the first immediate as the broadcast data value, and using the first immediate to select a vector element within the source vector register and using the selected source vector register element as the broadcast data value.

Example 43 includes the substance of the exemplary processor of Example 41, wherein the vector instruction further includes a source identifier to specify a source vector register, and wherein deriving the stride data value includes one of using the second immediate as the stride data value, and using the second immediate to select a vector element within the source vector register and using the selected source vector register element as the stride data value.

Example 44 includes the substance of the exemplary processor of Example 41, wherein the write mask register includes a plurality of one bit vector write mask elements that each controls whether an execution result is written to a corresponding vector element within the destination vector register, the corresponding vector element to occupy a same relative position within the destination vector register as a relative position occupied by the vector write mask element within the write mask register, wherein results of the executing are to be written only to unmasked vector elements of the destination vector register.

Example 45 includes the substance of the exemplary processor of Example 44, wherein the executing the vector instruction further includes zeroing masked vector elements of the destination vector register.

Example 46 includes the substance of the exemplary processor of Example 44, wherein the executing the vector instruction further includes not writing new values to masked vector elements of the destination vector register.

Example 47 includes the substance of the exemplary processor of Example 43, wherein the vector instruction further includes a masked element control field to specify whether masked vector elements of the destination vector register are to retain their value or to be zeroed.

Example 48 includes the substance of the exemplary processor of Example 47, wherein the masked element control field is to be derived from the opcode.

Example 49 includes the substance of the exemplary processor of Example 48, wherein the masked element control field is one of a prefix and a suffix of the opcode.

Example 50 includes the substance of the exemplary processor of any one of Examples 41-49, wherein the vector instruction further includes an element size identifier to specify a size of the vector elements of the destination vector register.

Example 51 provides a system to execute a vector instruction, the system including: a memory, and a processor, including: fetch circuitry to fetch the vector instruction from a code storage, the vector instruction including an opcode, a destination identifier to specify a destination vector register, a write mask identifier to specify a write mask register, and first and second immediates, decode circuitry to decode the fetched vector instruction, and execution circuitry to execute the decoded vector instruction to: use the first immediate to derive a broadcast data value, use the second immediate to derive a stride value, use the write mask register to identify unmasked destination vector register elements, when the opcode specifies to broadcast, broadcast the broadcast data value to every unmasked destination vector register element, and when the opcode specifies to stride, store the broadcast data value to a first unmasked destination vector register element, and, successively, for each subsequent unmasked destination vector register element, generate and store a value of an immediately preceding unmasked destination vector register element plus the stride value.

Example 52 includes the substance of the exemplary system of Example 51, wherein the vector instruction further includes a source identifier to specify a source vector register, and wherein deriving the broadcast data value includes one of using the first immediate as the broadcast data value, and using the first immediate to select a vector element within the source vector register and using the selected source vector register element as the broadcast data value.

Example 53 includes the substance of the exemplary system of Example 51, wherein the vector instruction further includes a source identifier to specify a source vector register, and wherein deriving the stride data value includes one of using the second immediate as the stride data value, and using the second immediate to select a vector element within the source vector register and using the selected source vector register element as the stride data value.

Example 54 includes the substance of the exemplary system of Example 51, wherein the write mask register includes a plurality of one bit vector write mask elements that each controls whether an execution result is written to a corresponding vector element within the destination vector register, the corresponding vector element to occupy a same relative position within the destination vector register as a relative position occupied by the vector write mask element within the write mask register, wherein results of the executing are to be written only to unmasked vector elements of the destination vector register.

Example 55 includes the substance of the exemplary system of Example 54, wherein the executing the vector instruction further includes zeroing masked vector elements of the destination vector register.

Example 56 includes the substance of the exemplary system of Example 54, wherein the executing the vector instruction further includes not writing new values to masked vector elements of the destination vector register.

Example 57 includes the substance of the exemplary system of Example 53, wherein the vector instruction further includes a masked element control field to specify whether masked vector elements of the destination vector register are to retain their value or to be zeroed.

Example 58 includes the substance of the exemplary system of Example 57, wherein the masked element control field is to be derived from the opcode.

Example 59 includes the substance of the exemplary system of Example 58, wherein the masked element control field is one of a prefix and a suffix of the opcode.

Example 60 includes the substance of the exemplary system of any one of Examples 51-59, wherein the vector instruction further includes an element size identifier to specify a size of the vector elements of the destination vector register.

Example 61 provides a processor to execute a vector instruction, the processor including: fetch circuitry to fetch the vector instruction from a code storage, the vector instruction including an opcode, a source identifier to specify a source write mask register; a destination identifier to specify a destination write mask register, a write mask identifier to specify a write mask register, an element size identifier to specify a destination vector element size, and an immediate, decode circuitry to decode the fetched vector instruction, and execution circuitry to execute the decoded vector instruction to: use the element size identifier to identify one or more equal partitions of the destination write mask register, perform an operation on the source write mask register and the immediate to generate a result, use the write mask register to determine which of the equal partitions is unmasked, and write the result to each of the unmasked equal partitions.

Example 62 includes the substance of the exemplary processor of Example 61, wherein the source identifier and the destination identifier identify a same write mask register.

Example 63 includes the substance of the exemplary processor of any one of Examples 61 and 62, wherein the vector instruction further includes a second source identifier to specify a second source write mask register, and wherein the execution circuitry is to perform an operation on the source write mask register, the second source write mask generator, and the immediate to generate the result.

Example 64 includes the substance of the exemplary processor of Example 61, wherein the write mask register includes a plurality of one bit vector write mask elements that each controls whether an execution result is written to a corresponding one of the one or more partitions identified within the destination write mask register, wherein each of the plurality of one bit vector write mask elements is to occupy a same relative position within the write mask register as a relative position occupied by the one partition within the destination vector register.

Example 65 includes the substance of the exemplary processor of Example 64, wherein the executing the vector instruction further includes zeroing masked vector elements of the destination write mask register.

Example 66 includes the substance of the exemplary processor of Example 64, wherein the executing the vector instruction further includes not writing new values to masked vector elements of the destination write mask register.

Example 67 includes the substance of the exemplary processor of Example 64, wherein the vector instruction further includes a masked element control field to specify whether masked vector elements of the destination vector register are to retain their value or to be zeroed.

Example 68 includes the substance of the exemplary processor of Example 61, wherein the element size identifier is included in the opcode.

Example 69 includes the substance of the exemplary processor of Example 61, wherein the operation using the source write mask register and the immediate to generate a result is a bitwise binary operation being one of AND, OR, XOR, left shift, and right shift.

Example 70 includes the substance of the exemplary processor of any one of Examples 61, 62, and 64-69, wherein the vector instruction further includes a second destination identifier to specify a general purpose register, and wherein the execution circuitry is further to copy the result from one of the unmasked equal partition of the destination write mask register to the general purpose register.

Example 71 provides a method of executing a vector instruction, the method including: fetching, by fetch circuitry, the vector instruction from a code storage, the vector instruction including an opcode, a source identifier to specify a source write mask register; a destination identifier to specify a destination write mask register, a write mask identifier to specify a write mask register, an element size identifier to specify a destination vector element size, and an immediate, decoding, by decode circuitry, the fetched vector instruction, and executing, by execution circuitry, the decoded vector instruction to: use the element size identifier to identify one or more equal partitions of the destination write mask register, perform an operation on the source write mask register and the immediate to generate a result, use the write mask register to determine which of the equal partitions is unmasked, and write the result to each of the unmasked equal partitions.

Example 72 includes the substance of the exemplary method of Example 71, wherein the source identifier and the destination identifier identify a same write mask register.

Example 73 includes the substance of the exemplary method of any one of Examples 71 and 72, wherein the vector instruction further includes a second source identifier to specify a second source write mask register, and wherein the execution circuitry is to perform an operation on the source write mask register, the second source write mask generator, and the immediate to generate the result.

Example 74 includes the substance of the exemplary method of Example 71, wherein the write mask register includes a plurality of one bit vector write mask elements that each controls whether an execution result is written to a corresponding one of the one or more partitions identified within the destination write mask register, wherein each of the plurality of one bit vector write mask elements is to occupy a same relative position within the write mask register as a relative position occupied by the one partition within the destination vector register.

Example 75 includes the substance of the exemplary method of Example 74, wherein the executing the vector instruction further includes zeroing masked vector elements of the destination write mask register.

Example 76 includes the substance of the exemplary method of Example 74, wherein the executing the vector instruction further includes not writing new values to masked vector elements of the destination write mask register.

Example 77 includes the substance of the exemplary method of Example 74, wherein the vector instruction further includes a masked element control field to specify whether masked vector elements of the destination vector register are to retain their value or to be zeroed.

Example 78 includes the substance of the exemplary method of Example 71, wherein the element size identifier is included in the opcode.

Example 79 includes the substance of the exemplary method of Example 71, wherein the operation using the source write mask register and the immediate to generate a result is a bitwise binary operation being one of AND, OR, XOR, left shift, and right shift.

Example 80 includes the substance of the exemplary method of any one of Examples 71, 72, and 74-79, wherein the vector instruction further includes a second destination identifier to specify a general purpose register, and wherein the execution circuitry is further to copy the result from one of the unmasked equal partition of the destination write mask register to the general purpose register.

Example 81 provides a system to execute a vector instruction, the system including: a memory, and a processor, including: fetch circuitry to fetch the vector instruction from a code storage, the vector instruction including an opcode, a source identifier to specify a source write mask register; a destination identifier to specify a destination write mask register, a write mask identifier to specify a write mask register, an element size identifier to specify a destination vector element size, and an immediate, and decode circuitry to decode the fetched vector instruction, and execution circuitry to execute the decoded vector instruction to: use the element size identifier to identify one or more equal partitions of the destination write mask register, perform an operation on the source write mask register and the immediate to generate a result, use the write mask register to determine which of the equal partitions is unmasked, and write the result to each of the unmasked equal partitions.

Example 82 includes the substance of the exemplary system of Example 81, wherein the source identifier and the destination identifier identify a same write mask register.

Example 83 includes the substance of the exemplary system of any one of Examples 81 and 82, wherein the vector instruction further includes a second source identifier to specify a second source write mask register, and wherein the execution circuitry is to perform an operation on the source write mask register, the second source write mask generator, and the immediate to generate the result.

Example 84 includes the substance of the exemplary system of Example 81, wherein the write mask register includes a plurality of one bit vector write mask elements that each controls whether an execution result is written to a corresponding one of the one or more partitions identified within the destination write mask register, wherein each of the plurality of one bit vector write mask elements is to occupy a same relative position within the write mask register as a relative position occupied by the one partition within the destination vector register.

Example 85 includes the substance of the exemplary system of Example 84, wherein the executing the vector instruction further includes zeroing masked vector elements of the destination write mask register.

Example 86 includes the substance of the exemplary system of Example 84, wherein the executing the vector instruction further includes not writing new values to masked vector elements of the destination write mask register.

Example 87 includes the substance of the exemplary system of Example 84, wherein the vector instruction further includes a masked element control field to specify whether masked vector elements of the destination vector register are to retain their value or to be zeroed.

Example 88 includes the substance of the exemplary system of Example 81, wherein the element size identifier is included in the opcode.

Example 89 includes the substance of the exemplary system of Example 81, wherein the operation using the source write mask register and the immediate to generate a result is a bitwise binary operation being one of AND, OR, XOR, left shift, and right shift.

Example 90 includes the substance of the exemplary system of Examples 81, wherein the vector instruction further includes a second destination identifier to specify a general purpose register, and wherein the execution circuitry is further to copy the result from one of the unmasked equal partition of the destination write mask register to the general purpose register.

Example 91 provides a processor to execute a vector instruction, the processor including: a fetch circuit to fetch the vector instruction from a code storage, the vector instruction including an opcode, a destination identifier, and an immediate, a decode circuit to decode the fetched vector instruction, and an execution circuit to execute the decoded vector instruction, wherein the execution circuitry, in response to the decoded vector instruction, is to generate a result to be written to each element of a stored destination vector specified by the destination identifier, the result being based on the immediate.

Example 92 includes the substance of the exemplary processor of Example 91, wherein the stored destination vector includes a destination vector register, wherein the vector instruction further includes a source identifier to identify a source vector register, and wherein the execution circuit, in response to the decoded vector instruction, uses the immediate to select an element of the source vector register and to broadcast the selected element to a plurality of elements of the destination vector register.

Example 93 includes the substance of the exemplary processor of Example 91, wherein the stored destination vector includes a destination vector register, and wherein the execution circuit, in response to the decoded vector instruction, broadcasts the immediate to every vector element of the destination vector register.

Example 94 includes the substance of the exemplary processor of Example 91, wherein the stored destination vector includes a destination vector register, wherein the vector instruction further includes a source identifier to identify a source register, wherein the immediate represents a stride value, and wherein the execution circuit, in response to the decoded vector instruction, sets a first element of the destination vector register to a value stored in the source register, and to set each subsequent element of the destination vector register to a value of an immediately preceding element of the destination vector register plus the stride value.

Example 95 includes the substance of the exemplary processor of Example 91, wherein the stored destination vector includes a destination vector register, wherein the vector instruction further includes a second immediate and a source identifier to identify a source vector register, wherein the second immediate represents a stride value, and wherein the execution circuit, in response to the decoded vector instruction, uses the immediate to select an element of the source vector register, to set a first element of the destination vector register to a value stored in the selected source vector register element, and to set each subsequent element of the destination vector register to a value of an immediately preceding element of the destination vector register plus the stride value.

Example 96 includes the substance of the exemplary processor of Example 91, wherein the stored destination vector includes a destination vector register, wherein the vector instruction further includes a second immediate, wherein the second immediate represents a stride value, and wherein the execution circuit, in response to the decoded vector instruction, sets a first element of the destination vector register to a value of the immediate, and to set each subsequent element of the destination vector register to a value of an immediately preceding element of the destination vector register plus the stride value.

Example 97 includes the substance of the exemplary processor of Example 91, wherein the stored destination vector includes a destination vector register, wherein the vector instruction further includes a first source identifier to identify a first source vector register and a second source identifier to identify a second source vector register, and wherein the execution circuit, in response to the decoded vector instruction, sets each element of the destination vector register to a value of a corresponding element of the first source vector register plus a value of a corresponding element of the second source vector register, plus the immediate.

Example 98 includes the substance of the exemplary processor of Example 91, wherein the stored destination vector includes a destination vector register, wherein the vector instruction further includes a write mask identifier to identify a write mask register, wherein the immediate is a short immediate, and wherein the execution circuit, in response to the decoded vector instruction, uses the write mask register to set each unmasked element of the destination vector register to the immediate.

Example 99 includes the substance of the exemplary processor of Example 92, wherein the vector instruction further includes a size identifier to specify an element size of each element of the destination vector register, and wherein the execution circuit, in response to the decoded vector instruction, uses the element size identifier to determine how many elements of the destination vector register to set.

Example 100 includes the substance of the exemplary processor of Example 91, wherein the stored destination vector includes a destination mask register, wherein the vector instruction further includes a write mask identifier to specify a write mask register, and wherein the execution circuit, in response to the decoded vector instruction, uses the write mask register to set unmasked elements of the destination mask register to one, and to set masked elements of the destination mask register to zero, without using the immediate.

Example 101 provides a non-transitory computer readable medium containing instructions that, when executed by a processor, cause the processor, in response to a vector instruction, to: fetch, by fetch circuitry, a vector instruction from a code storage, the vector instruction including an opcode, a destination identifier, and an immediate, decode, by decode circuitry, the fetched vector instruction, and execute, by execution circuitry, the decoded vector instruction, wherein the execution circuitry, in response to the decoded vector instruction, is to generate a result to be written to each element of a stored destination vector specified by the destination identifier, the result being based on the immediate.

Example 102 includes the substance of the exemplary non-transitory computer-readable medium of Example 101, wherein the stored destination vector includes a destination vector register, wherein the vector instruction further includes a source identifier to identify a source vector register, and wherein the executing, by the execution circuitry in response to the decoded vector instruction, includes using the immediate to select an element of the source vector register and broadcasting the selected element to a plurality of elements of the destination vector register.

Example 103 includes the substance of the exemplary non-transitory computer-readable medium of Example 101, wherein the stored destination vector includes a destination vector register, and wherein the executing, by the execution circuitry in response to the decoded vector instruction, includes broadcasting the immediate to every vector element of the destination vector register.

Example 104 includes the substance of the exemplary non-transitory computer-readable medium of Example 101, wherein the stored destination vector includes a destination vector register, wherein the vector instruction further includes a source identifier to identify a source register, wherein the immediate represents a stride value, and wherein the executing, by the execution circuitry in response to the decoded vector instruction, includes setting a first element of the destination vector register to a value stored in the source register, and setting each subsequent element of the destination vector register to a value of an immediately preceding element of the destination vector register plus the stride value.

Example 105 includes the substance of the exemplary non-transitory computer-readable medium of Example 101, wherein the stored destination vector includes a destination vector register, wherein the vector instruction further includes a second immediate and a source identifier to identify a source vector register, wherein the second immediate represents a stride value, and wherein the executing, by the execution circuitry in response to the decoded vector instruction, includes using the immediate to select an element of the source vector register, setting a first element of the destination vector register to a value of the selected source vector register element, and setting each subsequent element of the destination vector register to a value of an immediately preceding element of the destination vector register plus the stride value.

Example 106 provides an apparatus to execute a vector instruction, the apparatus including: means for fetching the vector instruction from a code storage, the vector instruction including an opcode, a destination identifier, and an immediate, means for decoding the fetched vector instruction, and means for executing the decoded vector instruction, wherein the means for executing, in response to the decoded vector instruction, is to generate a result to be written to each element of a stored destination vector specified by the destination identifier, the result being based on the immediate.

Example 107 includes the substance of the exemplary apparatus of Example 106, wherein the stored destination vector includes a destination vector register, wherein the vector instruction further includes a source identifier to identify a source vector register, and wherein the executing, by the means for executing in response to the decoded vector instruction, includes using the immediate to select an element of the source vector register and broadcasting the selected element to a plurality of elements of the destination vector register.

Example 108 includes the substance of the exemplary apparatus of Example 106, wherein the stored destination vector includes a destination vector register, and wherein the executing, by the means for executing in response to the decoded vector instruction, includes broadcasting the immediate to every vector element of the destination vector register.

Example 109 includes the substance of the exemplary apparatus of Example 106, wherein the stored destination vector includes a destination vector register, wherein the vector instruction further includes a source identifier to identify a source register, wherein the immediate represents a stride value, and wherein the executing, by the means for executing in response to the decoded vector instruction, includes setting a first element of the destination vector register to a value stored in the source register, and setting each subsequent element of the destination vector register to a value of an immediately preceding element of the destination vector register plus the stride value.

Example 110 includes the substance of the exemplary apparatus of Example 106, wherein the vector instruction further includes a second immediate and a source identifier to identify a source vector register, wherein the stored destination vector includes a destination vector register, wherein the second immediate represents a stride value, and wherein the executing, by the means for executing in response to the decoded vector instruction, includes using the immediate to select an element of the source vector register, setting a first element of the destination vector register to a value of the selected source vector register element, and setting each subsequent element of the destination vector register to a value of an immediately preceding element of the destination vector register plus the stride value.

Example 111 provides a system to execute a vector instruction, the system including: a memory, and a processor including: a fetch circuit to fetch the vector instruction from a code storage, the vector instruction including an opcode, a destination identifier, and an immediate, a decode circuit to decode the fetched vector instruction, and an execution circuit to execute the decoded vector instruction, wherein the execution circuit, in response to the decoded vector instruction, is to generate a result to be written to each element of a stored destination vector specified by the destination identifier, the result being based on the immediate.

Example 112 includes the substance of the exemplary system of Example 111, wherein the stored destination vector includes a destination vector register, wherein the vector instruction further includes a source identifier to identify a source vector register, and wherein the execution circuit, in response to the decoded vector instruction, uses the immediate to select an element of the source vector register and to broadcast the selected element to a plurality of elements of the destination vector register.

Example 113 includes the substance of the exemplary system of Example 111, wherein the vector instruction further includes a source identifier to identify a source register, wherein the immediate represents a stride value, and wherein the execution circuit, in response to the decoded vector instruction, sets a first element of the destination vector register to a value stored in the source register, and to set each subsequent element of the destination vector register to a value of an immediately preceding element of the destination vector register plus the stride value.

Example 114 includes the substance of the exemplary system of Example 111, wherein the vector instruction further includes a second immediate and a source identifier to identify a source vector register, wherein the second immediate represents a stride value, and wherein the execution circuit, in response to the decoded vector instruction, uses the immediate to select an element of the source vector register, to set a first element of the destination vector register to a value stored in the selected source vector register element, and to set each subsequent element of the destination vector register to a value of an immediately preceding element of the destination vector register plus the stride value.

Example 115 includes the substance of the exemplary system of Example 111, wherein the vector instruction further includes a second immediate, wherein the second immediate represents a stride value, and wherein the execution circuit, in response to the decoded vector instruction, sets a first element of the destination vector register to a value of the immediate, and to set each subsequent element of the destination vector register to a value of an immediately preceding element of the destination vector register plus the stride value.

Example 116 includes the substance of the exemplary system of Example 111, wherein the vector instruction further includes a first source identifier to identify a first source vector register and a second source identifier to identify a second source vector register, and wherein the execution circuit, in response to the decoded vector instruction, sets each element of the destination vector register to a value of a corresponding element of the first source vector register plus a value of a corresponding element of the second source vector register, plus the immediate.

Example 117 includes the substance of the exemplary system of Example 111, wherein the stored destination vector includes a destination vector register, wherein the vector instruction further includes a write mask identifier to identify a write mask register, wherein the immediate is a short immediate, and wherein the execution circuit, in response to the decoded vector instruction, uses the write mask register to set each unmasked element of the destination vector register to the immediate.

Example 118 includes the substance of the exemplary system of Example 112, wherein the vector instruction further includes an element size identifier, and wherein the execution circuit, in response to the decoded vector instruction, is further to use the element size identifier to determine how many elements of the destination vector register to set.

Example 119 includes the substance of the exemplary system of Example 111, wherein the stored destination vector includes a destination mask register, wherein the vector instruction further includes a write mask identifier to specify a write mask register, and wherein the execution circuit, in response to the decoded vector instruction, uses the write mask register to set only unmasked elements of the destination mask register, without using the immediate.

Example 120 includes the substance of the exemplary system of Example 119, wherein the executing, by the execution circuitry in response to the decoded vector instruction, further includes setting masked elements of the destination mask register to zero.

Example 121 provides a non-transitory machine-readable medium containing instructions that, when executed by a processor, cause the processor to: fetch, by fetch circuitry, a vector instruction from a code storage, the vector instruction including an opcode, a destination identifier to specify a destination vector register, a write mask identifier to specify a write mask register, and first and second immediates, decode, by decode circuitry, the fetched vector instruction, and execute, by execution circuitry, the decoded vector instruction to: use the first immediate to derive a data value, use the second immediate to derive a stride value, use the write mask register to identify unmasked destination vector register elements, when the opcode specifies to broadcast, broadcast the data value to every unmasked destination vector register element, and when the opcode specifies to stride, store the data value to a first unmasked destination vector register element, and, successively, for each subsequent unmasked destination vector register element, generate and store a value of an immediately preceding unmasked destination vector register element plus the stride value.

Example 122 includes the substance of the exemplary non-transitory machine-readable medium of Example 121, wherein the vector instruction further includes a source identifier to specify a source vector register, and wherein deriving the broadcast data value includes one of using the first immediate as the broadcast data value, and using the first immediate to select a vector element within the source vector register and using the selected source vector register element as the broadcast data value.

Example 123 includes the substance of the exemplary non-transitory machine-readable medium of Example 121, wherein the vector instruction further includes a source identifier to specify a source vector register, and wherein deriving the stride data value includes one of using the second immediate as the stride data value, and using the second immediate to select a vector element within the source vector register and using the selected source vector register element as the stride data value.

Example 124 includes the substance of the exemplary non-transitory machine-readable medium of Example 121, wherein the write mask register includes a plurality of one bit vector write mask elements that each controls whether an execution result is written to a corresponding vector element within the destination vector register, the corresponding vector element to occupy a same relative position within the destination vector register as a relative position occupied by the vector write mask element within the write mask register, wherein results of the executing are to be written only to unmasked vector elements of the destination vector register.

Example 125 includes the substance of the exemplary non-transitory machine-readable medium of Example 124, wherein the executing the vector instruction further includes zeroing masked vector elements of the destination vector register.

Example 126 includes the substance of the exemplary non-transitory machine-readable medium of Example 124, wherein the executing the vector instruction further includes not writing new values to masked vector elements of the destination vector register.

Example 127 includes the substance of the exemplary non-transitory machine-readable medium of Example 123, wherein the vector instruction further includes a masked element control field to specify whether masked vector elements of the destination vector register are to retain their value or to be zeroed.

Example 128 includes the substance of the exemplary non-transitory machine-readable medium of Example 127, wherein the masked element control field is to be derived from the opcode.

Example 129 includes the substance of the exemplary non-transitory machine-readable medium of Example 127, wherein the masked element control field is one of a prefix and a suffix of the opcode.

Example 130 includes the substance of the exemplary non-transitory machine-readable medium of any one of Examples 121-129, wherein the vector instruction further includes an element size identifier to specify a size of the vector elements of the destination vector register.

Example 131 provides a processor to execute a vector instruction, the processor including: means for fetching the vector instruction from a code storage, the vector instruction including an opcode, a destination identifier to specify a destination vector register, a write mask identifier to specify a write mask register, and first and second immediates, means for decoding the fetched vector instruction, and means for executing the decoded vector instruction to: use the first immediate to derive a data value, use the second immediate to derive a stride value, use the write mask register to identify unmasked destination vector register elements, when the opcode specifies to broadcast, broadcast the data value to every unmasked destination vector register element, and when the opcode specifies to stride, store the data value to a first unmasked destination vector register element, and, successively, for each subsequent unmasked destination vector register element, generate and store a value of an immediately preceding unmasked destination vector register element plus the stride value.

Example 132 includes the substance of the exemplary processor of Example 131, wherein the vector instruction further includes a source identifier to specify a source vector register, and wherein deriving the broadcast data value includes one of using the first immediate as the broadcast data value, and using the first immediate to select a vector element within the source vector register and using the selected source vector register element as the broadcast data value.

Example 133 includes the substance of the exemplary processor of Example 131, wherein the vector instruction further includes a source identifier to specify a source vector register, and wherein deriving the stride data value includes one of using the second immediate as the stride data value, and using the second immediate to select a vector element within the source vector register and using the selected source vector register element as the stride data value.

Example 134 includes the substance of the exemplary processor of Example 131, wherein the write mask register includes a plurality of one bit vector write mask elements that each controls whether an execution result is written to a corresponding vector element within the destination vector register, the corresponding vector element to occupy a same relative position within the destination vector register as a relative position occupied by the vector write mask element within the write mask register, wherein results of the executing are to be written only to unmasked vector elements of the destination vector register.

Example 135 includes the substance of the exemplary processor of Example 134, wherein the executing the vector instruction further includes zeroing masked vector elements of the destination vector register.

Example 136 includes the substance of the exemplary processor of Example 134, wherein the executing the vector instruction further includes not writing new values to masked vector elements of the destination vector register.

Example 137 includes the substance of the exemplary processor of Example 133, wherein the vector instruction further includes a masked element control field to specify whether masked vector elements of the destination vector register are to retain their value or to be zeroed.

Example 138 includes the substance of the exemplary processor of Example 137, wherein the masked element control field is to be derived from the opcode.

Example 139 includes the substance of the exemplary processor of Example 137, wherein the masked element control field is a suffix or prefix of the opcode.

Example 140 includes the substance of the exemplary processor of any one of Examples 131-139, wherein the vector instruction further includes an element size identifier to specify a size of the vector elements of the destination vector register.

What is claimed is:

1. A processor to execute an instruction, the processor comprising:
   fetch circuitry to fetch the instruction;
   decode circuitry to decode the instruction specifying an opcode, a destination vector register, first and second immediates, and a writemask having multiple bits, each bit to specify whether a corresponding element of the destination vector register is masked, the opcode to indicate that execution circuitry is to use the first immediate to derive a data value, use the second immediate to derive a stride value, store the data value to a first unmasked destination vector register element, and for a second and subsequent unmasked destination vector register elements, generate a strided value by successively adding the stride value to an immediately preceding unmasked destination vector register element, and store the strided value to a corresponding unmasked destination vector register element; and
   the execution circuitry to execute the instruction as per the opcode.

2. The processor of claim 1, wherein the execution circuitry is further to zero masked vector elements of the destination vector register.

3. The processor of claim 1, wherein the execution circuitry is further to allow masked vector elements to retain their previous values.

4. The processor of claim 1, wherein the instruction further comprises a masked element control field to specify whether masked vector elements of the destination vector register are to retain their value or to be zeroed, and wherein the execution circuitry is further to use the masked element control field for each masked element of the destination vector register to determine whether to zero the masked element or to allow the masked element to retain its value.

5. The processor of claim 4, wherein the masked element control field is derived from the opcode.

6. The processor of claim 1, wherein the opcode further comprises an element size identifier to specify an element size of the destination vector register elements, wherein the element size identifier is one of a prefix or a suffix to the opcode.

7. The processor of claim 1, wherein the destination vector register comprises one of a 128-bit vector register, a 256-bit vector register, or a 512-bit vector register, the destination vector register comprising a plurality of fixed-size vector elements.

8. A method performed by a processor, the method comprising:
   fetching, by fetch circuitry, an instruction;
   decoding, by decode circuitry, the instruction specifying an opcode, a destination vector register, first and second immediates, and a writemask having multiple bits, each bit to specify whether a corresponding element of the destination vector register is masked, the opcode indicating execution circuitry is to use the first immediate to derive a data value, use the second immediate to derive a stride value, store the data value to a first unmasked destination vector register element, and for a second and subsequent unmasked destination vector register elements, generate a strided value by successively adding the stride value to an immediately preceding unmasked destination vector register element, and store the strided value to a corresponding unmasked destination vector register element; and
   executing, by the execution circuitry, the instruction as per the opcode.

9. The method of claim 8, wherein the executing the instruction further comprises zeroing masked vector elements of the destination vector register.

10. The method of claim 8, wherein the executing the instruction further comprises allowing masked vector elements of the destination vector register to retain their previous values.

11. The method of claim 8, wherein the instruction further comprises a masked element control field to specify whether masked vector elements of the destination vector register retain their value or are zeroed.

12. The method of claim 11, wherein the masked element control field is derived from the opcode.

13. The method of claim 8, wherein the opcode further comprises an element size identifier to specify an element size of the destination vector register elements, wherein the element size identifier is one of a prefix or a suffix to the opcode.

14. The method of claim 8, wherein the destination vector register comprises one of a 128-bit vector register, a 256-bit vector register, or a 512-bit vector register, the destination vector register comprising a plurality of fixed-size vector elements.

15. A non-transitory computer readable medium containing code that, when executed by a processor, causes the processor to perform a method comprising:
   fetching, by fetch circuitry, an instruction;
   decoding, by decode circuitry, the instruction specifying an opcode, a destination vector register, first and second immediates, and a writemask having multiple bits, each bit to specify whether a corresponding element of the destination vector register is masked, the opcode indicating execution circuitry is to use the first immediate to derive a data value, use the second immediate to derive a stride value, store the data value to a first unmasked destination vector register element, and for a second and subsequent unmasked destination vector register elements, generate a strided value by successively adding the stride value to an immediately preceding unmasked destination vector register element, and store the strided value to a corresponding unmasked destination vector register element; and executing, by the execution circuitry, the instruction as per the opcode.

16. The non-transitory computer readable medium of claim 15, wherein the executing the instruction further comprises zeroing masked vector elements of the destination vector register.

17. The non-transitory computer readable medium of claim 15, wherein the executing the instruction further comprises allowing masked vector elements of the destination vector register to retain their previous values.

18. The non-transitory computer readable medium of claim 15, wherein the instruction further comprises a masked element control field to specify whether masked vector elements of the destination vector register retain their value or are zeroed.

19. The non-transitory computer readable medium of claim 18, wherein the masked element control field is derived from the opcode.

20. The non-transitory computer readable medium of claim 15, wherein the opcode further comprises an element size identifier to specify an element size of the destination vector register elements, wherein the element size identifier is one of a prefix or a suffix to the opcode.

21. The non-transitory computer readable medium of claim 15, wherein the destination vector register comprises one of a 128-bit vector register, a 256-bit vector register, or a 512-bit vector register, the destination vector register comprising a plurality of fixed-size vector elements.

\* \* \* \* \*